(12) United States Patent
Suzuki

(10) Patent No.: US 12,736,793 B2
(45) Date of Patent: Sep. 15, 2026

(54) MICROSCOPE SYSTEM

(71) Applicant: Evident Corporation, Tatsuno-machi (JP)

(72) Inventor: Yoshimasa Suzuki, Kawasaki (JP)

(73) Assignee: Evident Corporation, Nagano (JP)

( * ) Notice: Subject to any disclaimer, the term of this patent is extended or adjusted under 35 U.S.C. 154(b) by 461 days.

(21) Appl. No.: 18/464,660

(22) Filed: Sep. 11, 2023

(65) Prior Publication Data

US 2023/0418038 A1 Dec. 28, 2023

Related U.S. Application Data

(63) Continuation of application No. PCT/JP2021/011097, filed on Mar. 18, 2021.

(51) Int. Cl.
*G02B 21/08* (2006.01)
*G02B 21/36* (2006.01)

(52) U.S. Cl.
CPC ......... *G02B 21/084* (2013.01); *G02B 21/365* (2013.01)

(58) Field of Classification Search
CPC G02B 21/084; G02B 21/365; G02B 21/0032; G02B 21/00; G02B 21/06
USPC .......................................................... 359/387
See application file for complete search history.

(56) References Cited

U.S. PATENT DOCUMENTS 10,649,196 B2 5/2020 Osawa
11,867,624 B2 1/2024 Suzuki et al.
2015/0124073 A1 5/2015 Fujishima et al.
2016/0306155 A1* 10/2016 Suzuki .................. G02B 21/14
2017/0329122 A1 11/2017 Osawa
2022/0074854 A1 3/2022 Suzuki et al.

FOREIGN PATENT DOCUMENTS

JP 2014044254 A 3/2014
JP 2014063151 A 4/2014
JP 2015179208 A 10/2015
(Continued)

OTHER PUBLICATIONS

Extended European Search Report (EESR) dated Jan. 23, 2025, issued in counterpart European Patent Application 21931555.3.
(Continued)

*Primary Examiner* — Balram T Parbadia
*Assistant Examiner* — Rahman Abdur
(74) *Attorney, Agent, or Firm* — Holtz, Holtz & Volek PC

(57) ABSTRACT

A microscope system includes an incoherent light source, a detection optical system, and an imager. The incoherent light source is a light source that emits light that is temporally not coherent. In a sample, a plurality of coherent illuminations are performed simultaneously by light emitted from the incoherent light source. The coherent illuminations are illumination by light that is spatially coherent. The direction in which the sample is irradiated with a light beam is different for each coherent illumination. In a pupil plane of the detection optical system, the respective light beams of the coherent illuminations pass through first regions different from each other. Each of the first regions satisfies the following Condition (1). At least one distance among distances between the two adjacent first regions satisfies the following Condition (2).

$$LS<PS\times10^{-3} \quad (1)$$

$$0.05\times T<d \quad (2)$$

24 Claims, 39 Drawing Sheets

(56) References Cited

FOREIGN PATENT DOCUMENTS

| | | | |
|---|---|---|---|
| WO | 2016125281 | A1 | 8/2016 |
| WO | 2021024420 | A1 | 2/2021 |

OTHER PUBLICATIONS

Baek, et al., "Intensity-based holographic imaging via space-domain Kramers-Kronig relations", Nature Photonics, Nature Publishing Group UK, London, vol. 15, No. 5, (Feb. 8, 2021), pp. 354-360.
Kellman, et al., "hysics-based Learned Design: Optimized Coded-Illumination for Quantitative Phase Imaging", arxiv.org, Cornell University Library, (Aug. 10, 2018).
Kellman, Michael, "Motion-resolved quantitative phase imaging", Biomedical Optics Express, vol. 9, No. 11, (Nov. 1, 2018), p. 5456.
Kim, et al., "Solving inverse scattering problems in biological samples by quantitative phase imaging : Solving inverse scattering problems in biological samples by quantitative phase imaging", Laser & Photonics Reviews, vol. 10, No. 1, (Dec. 16, 2015), pp. 13-39.
Li, et al., "Efficient quantitative phase microscopy using programmable annular LED illumination", Biomedical Optics Express, vol. 8, No. 10, (Oct. 1, 2017), p. 4687.
Tian, et al., "3D intensity and phase imaging from light field measurements in an LED array microscope", Optica, vol. 2, No. 2, (Feb. 20, 2015), p. 104.
International Preliminary Report on Patentability (IPRP) (and an English language translation thereof) dated Sep. 28, 2023, issued in International Application No. PCT/JP2021/011097.
International Search Report (ISR) (and an English language translation thereof) dated May 25, 2021, issued in International Application No. PCT/JP2021/011097.
Written Opinion dated May 25, 2021, issued in International Application No. PCT/JP2021/011097.
Chowdhury, et al., "High-resolution 3D refractive index microscopy of multiple-scattering samples from intensity images", Optica, vol. 6, No. 9, pp. 1211-1219 (2019).
Communication Pursuant to Article 94(3) EPC dated Jun. 16, 2026, issued in corresponding European Application No. 21931555.3.

* cited by examiner

FIG.17

3
140a
Z=1
$I_{mea1}(r)$
Fo
140

3
Z=2
$I_{mea2}(r)$
Fo
140

3
Z=3
$I_{mea3}(r)$
140
Fo

3
Z=4
$I_{mea4}(r)$
140
Fo

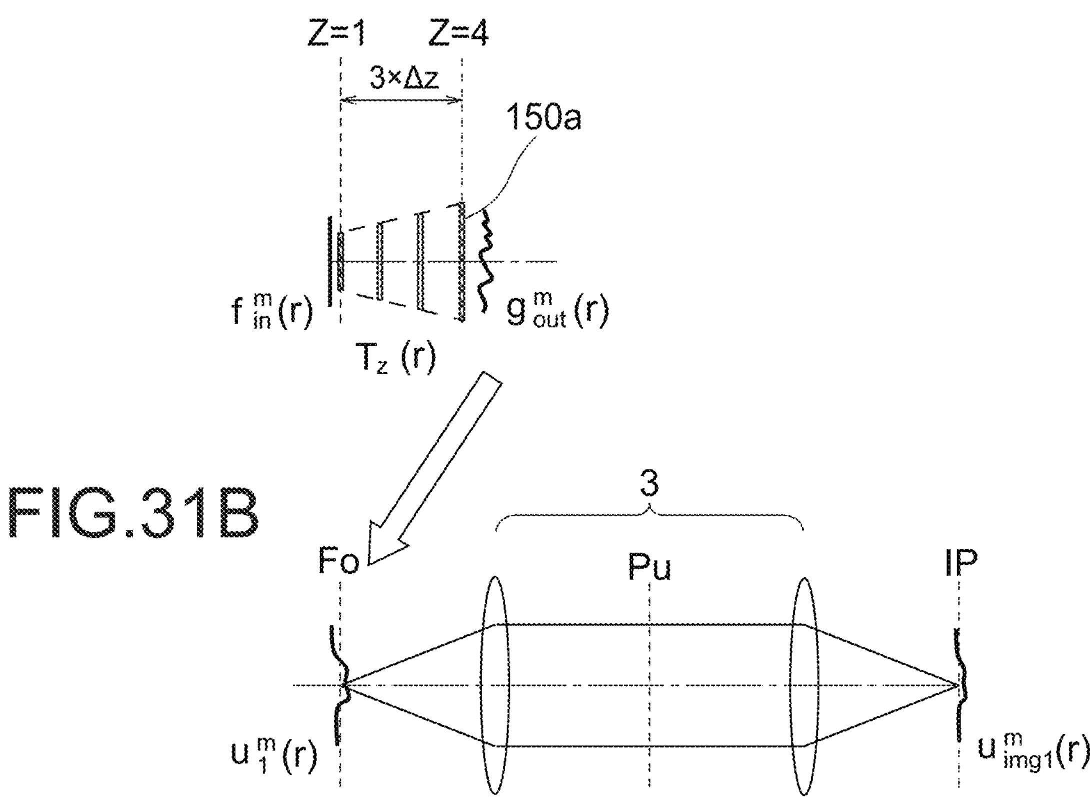
FIG.31A
Z=1
Z=4
3×Δz
150a
$f_{in}^{m}(r)$
$g_{out}^{m}(r)$
$T_z\ (r)$
FIG.31B
3
Fo
Pu
IP
$u_{1}^{m}(r)$
$u_{img1}^{m}(r)$
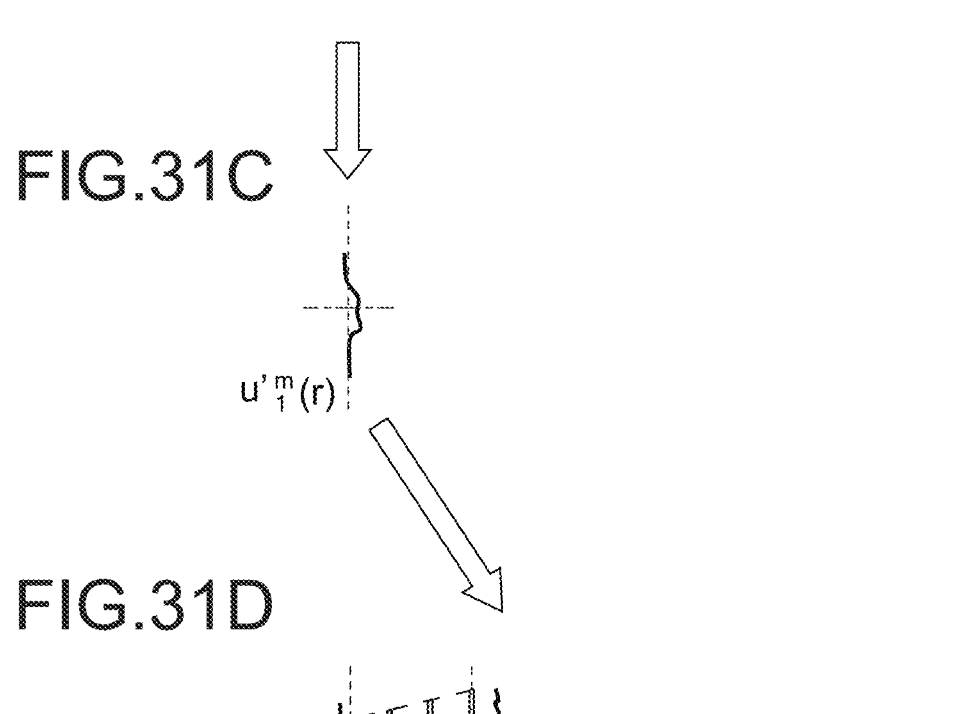
FIG.31C
$u'^{m}_{1}(r)$
FIG.31D
$f_{in}^{m}(r)$
$g'^{m,1}_{out}(r)$

FIG.35

| | Z=1 | Z=2 | Z=3 | Z=4 |
|---|---|---|---|---|
| LIGHT SOURCE 1 | $\Delta T_1^{1,1}(r)$ | $\Delta T_2^{1,1}(r)$ | $\Delta T_3^{1,1}(r)$ | $\Delta T_4^{1,1}(r)$ |
| ⋮ | ⋮ | ⋮ | ⋮ | ⋮ |
| LIGHT SOURCE m-1 | $\Delta T_1^{m-1,1}(r)$ | $\Delta T_2^{m-1,1}(r)$ | $\Delta T_3^{m-1,1}(r)$ | $\Delta T_4^{m-1,1}(r)$ |
| LIGHT SOURCE m | $\Delta T_1^{m,1}(r)$ | $\Delta T_2^{m,1}(r)$ | $\Delta T_3^{m,1}(r)$ | $\Delta T_4^{m,1}(r)$ |
| LIGHT SOURCE m+1 | $\Delta T_1^{m+1,1}(r)$ | $\Delta T_2^{m+1,1}(r)$ | $\Delta T_3^{m+1,1}(r)$ | $\Delta T_4^{m+1,1}(r)$ |
| ⋮ | ⋮ | ⋮ | ⋮ | ⋮ |
| LIGHT SOURCE $N_{LS}$ | $\Delta T_1^{N_{LS},1}(r)$ | $\Delta T_2^{N_{LS},1}(r)$ | $\Delta T_3^{N_{LS},1}(r)$ | $\Delta T_4^{N_{LS},1}(r)$ |

FIG.36A
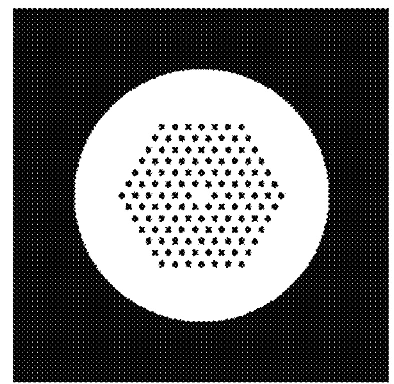
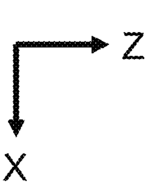
FIG.36B
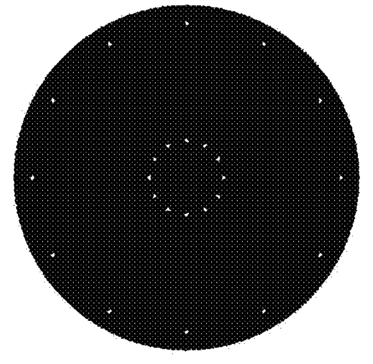
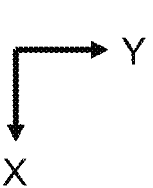
FIG.36C
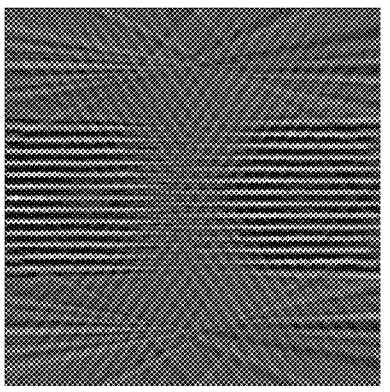
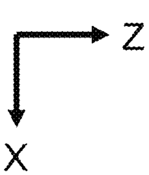
FIG.36D
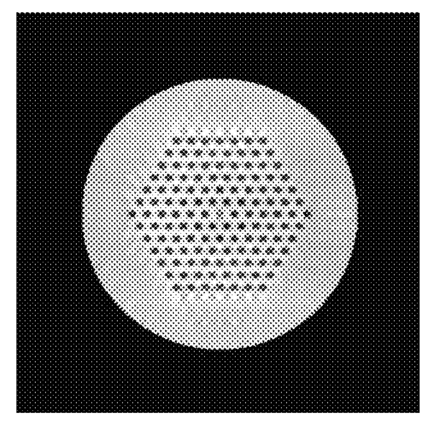
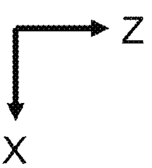

FIG.37A
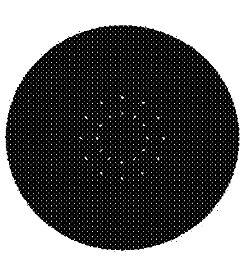
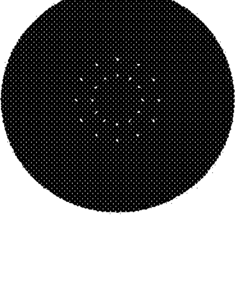
FIG.37B
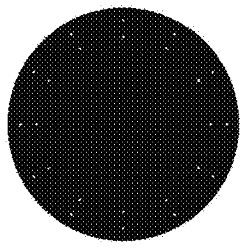
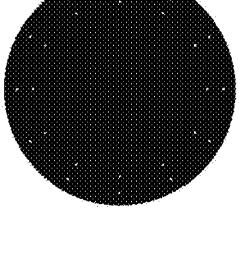
FIG.37C
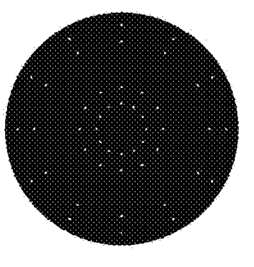
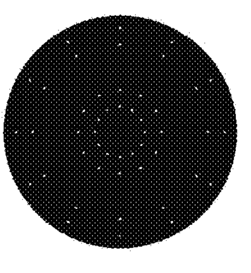
FIG.37D
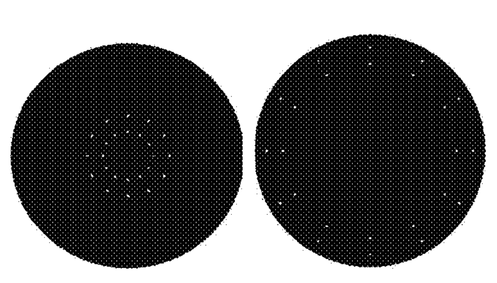
FIG.37E
FIG.37F
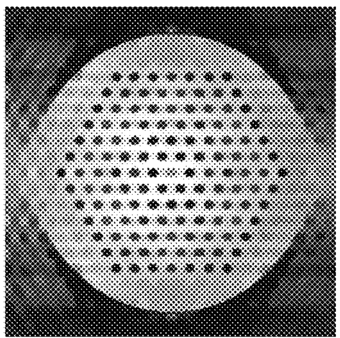
FIG.37G
FIG.37H
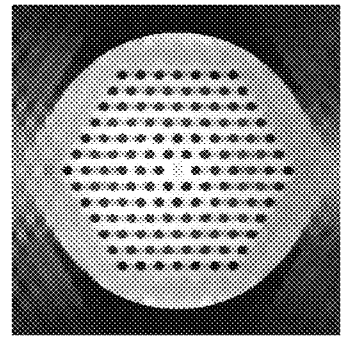

FIG.39A
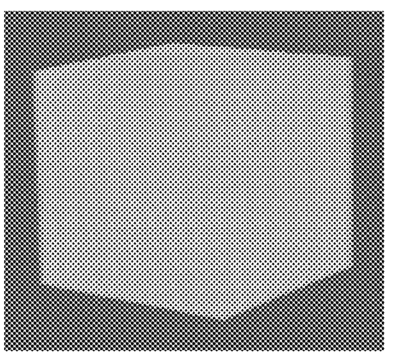
FIG.39C
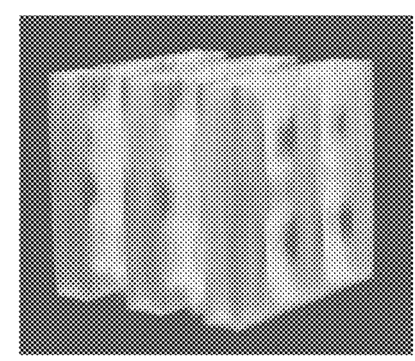
FIG.39B
FIG.39D
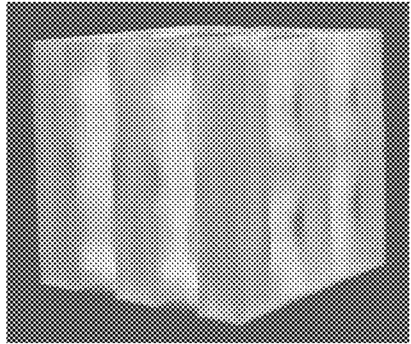
FIG.39E
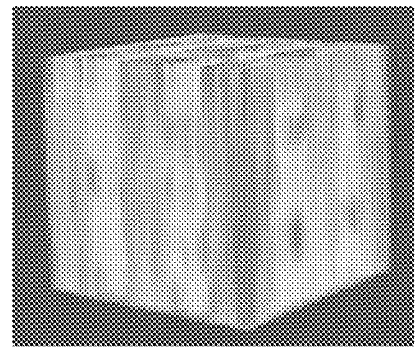

MICROSCOPE SYSTEM

CROSS REFERENCES

The present application is a continuation application of PCT/JP2 021/011097 filed on Mar. 18, 2021; the entire contents of which are incorporated herein by reference.

BACKGROUND OF INVENTION

Technical Field

The present disclosure relates to a microscope system.

Background Art

DESCRIPTION OF THE RELATED ART

There is a reconstruction method that reproduces an actual object on an object model on a computer. In this reconstruction method, the object model on a computer is modified by an optimization method so that an image of the measured object and an image of the computed object model match. Finally, when the image of the object and the image of the object model match, the object model on a computer reproduces the actual object.

An image of an object is acquired by a measurement optical system. What the image of the object model is like is calculated by an image computation technique. Therefore, in this reconstruction method, two things, namely, a measurement optical system and an image computation technique are important.

For example, it is possible to use an optical system of a microscope as the measurement optical system. In the optical system of a microscope, an image of a sample is acquired using a halogen lamp or an LED. The halogen lamp and the LED are incoherent light sources.

Illumination using an incoherent light source can be classified into incoherent illumination, coherent illumination, and partial coherent illumination, depending on illumination conditions. These illuminations will be described.

In a microscope, Kahler illumination is used. In Kahler illumination, a light source is disposed on the focal plane of a condenser lens or an image of a light source is formed on the focal plane of a condenser lens. Light emitted from each point of the light source is converted into a parallel ray by the condenser lens. Thus, the sample is illuminated by a parallel light beam.

When the size of the light source is changed, the spatial coherence of illumination light at a sample surface is changed. When the spatial coherence of illumination light is changed, the imaging characteristics are changed.

Even with an incoherent light source, the light source can be considered as a point light source if the size of the light source is extremely small. Illumination of irradiating a sample with light from a point light source is called coherent illumination.

The image computation technique can be classified into linear operations and nonlinear operations. In linear operations, only single scattering in a sample is considered. In nonlinear operations, not only single scattering but also multiple scattering is considered.

In linear operations, a first-order Born approximation is used. In the Born approximation, even when scattering occurs two or more times in a sample, the two or more times scattering is ignored. In linear operations, sample information and output information are determined in one-to-one correspondence. Therefore, it is possible to calculate output information analytically. The output information is, for example, an image of a sample.

Linear operations will be described, taking imaging in a microscope as an example. When sample information (transmittance distribution of a sample) O and output information (image intensity distribution) I can be considered as a linear system of convolution of a point image intensity distribution PSF of an optical system, the output information I is represented by the following equation.

$$I=PSF*O$$

where * represents convolution.

In linear operations, the computation time is short, but the computation accuracy is low because two or more times scattering is ignored. An image of an object model reconstructed using linear operations is obtained by deconvolution of an image of the measured sample with the point image intensity distribution.

Nonlinear operations are a computing method that considers scattering occurring multiple times in a sample. One of the nonlinear operations is the beam propagation method. In the beam propagation method, an object model is replaced by a plurality of thin layers. The image of the object model is then calculated by sequentially calculating a wavefront change as light passes through each layer.

The beam propagation method can calculate an image of an object model more accurately than in linear operations.

A technique for restoring the refractive index distribution of a sample by optimization calculation is disclosed in "Non-Patent Literature 1: "High-resolution 3D refractive index microscopy of multiple-scattering samples from intensity images" Optica, Vol. 6, No. 9, pp. 1211-1219 (2019)" (hereinafter referred to as Non-Patent Literature 1). In this technique, the beam propagation method is used. In addition, spatial coherent illumination is performed in acquisition of an image.

It is possible to estimate three-dimensional optical characteristics by estimating an object model from images. The three-dimensional optical characteristics are, for example, the refractive index distribution of an object.

SUMMARY

A microscope system according to at least some embodiments of the present disclosure includes: an incoherent light source; a detection optical system; and an imager, in which

- the incoherent light source is a light source configured to emit light that is temporally not coherent,
- the detection optical system is an optical system configured to form an optical image of a sample,
- the imager receives the optical image of the sample formed by the detection optical system,
- in the sample, a plurality of coherent illuminations are simultaneously performed by light emitted from the incoherent light source,
- the coherent illuminations are illumination by light that is spatially coherent,
- a direction in which the sample is irradiated with a light beam is different for each of the coherent illuminations,
- in a pupil plane of the detection optical system, the respective light beams of the coherent illuminations pass through first regions different from each other,
- each of the first regions satisfies the following Condition (1), and at least one distance among distances between the two adjacent first regions satisfies the following Condition (2):

$$LS<PS\times10^{-3} \quad (1)$$

$$0.05\times T<d \quad (2)$$

where

LS is an area of the first region (in $mm^2$),

PS is an area of a pupil of the detection optical system (in $mm^2$), d is a distance between the two adjacent first regions (in mm), and T is a diameter of the pupil of the detection optical system (in mm).

A microscope system according to at least some embodiments of the present disclosure includes: an incoherent light source; an illumination optical system; a detection optical system; and an imager, in which the incoherent light source is a light source configured to emit light that is temporally not coherent, the detection optical system is an optical system configured to form an optical image of a sample, the imager receives the optical image of the sample formed by the detection optical system, in the sample, a plurality of coherent illuminations are simultaneously performed by light emitted from the incoherent light source, the coherent illuminations are illumination by light that is spatially coherent, a direction in which the sample is irradiated with a light beam is different for each of the coherent illuminations, in a pupil plane of the illumination optical system, the respective light beams of the coherent illuminations are located in second regions different from each other, each of the second regions satisfies the following Condition (6), and at least one distance among distances between the two adjacent second regions satisfies the following Condition (7):

$$LS'<PS'\times10^{-3} \quad (6)$$

$$0.05\times T'<d' \quad (7)$$

where

LS' is an area of the second region (in $mm^2$),

PS' is an area of a pupil of the illumination optical system (in $mm^2$), d' is a distance between the two adjacent second regions (in mm), and T' is a diameter of the pupil of the illumination optical system (in mm).

BRIEF DESCRIPTION OF DRAWINGS

FIG. 17 is a flowchart of a first simulation;

FIGS. 31A to 31D are diagrams illustrating correction of a wavefront;

FIG. 35 is a diagram illustrating the gradient of a sample;

FIGS. 36A to 36D are diagrams illustrating the result of simulation in the first example;

FIGS. 37A to 37H are diagrams illustrating aperture members and reconstructed estimation samples;

FIGS. 39A to 39E are diagrams illustrating an estimation sample in the second example.

DETAILED DESCRIPTION

In Non-Patent Literature 1, illumination is performed with one light beam. In this case, it is necessary to change the illumination angle to illuminate a sample from a plurality of directions. Therefore, it takes time to acquire an image. As a result, the time from starting image acquisition to completing estimation of an object model is long.

Prior to a description of examples, operation effects of embodiments according to some aspects of the present disclosure will be described. In a specific description of operation effects of the embodiments, specific examples will be described. However, the examples described later as well as the illustrative embodiments are only some of the embodiments encompassed by the present disclosure, and the embodiments include numerous variations. Therefore, the present disclosure is not intended to be limited to the illustrative embodiments.

In the following description, a sample with a small thickness is referred to as "thin sample" and a sample with a large thickness is referred to as "thick sample".

A microscope system in the present embodiment includes an incoherent light source, a detection optical system, and an imager. The incoherent light source is a light source configured to emit light that is temporally not coherent. The detection optical system is an optical system configured to form an optical image of a sample, and the imager receives the optical image of the sample formed by the detection optical system. In the sample, a plurality of coherent illuminations are performed simultaneously by light emitted from the incoherent light source, and the coherent illuminations are illumination by light that is spatially coherent. The direction in which the sample is irradiated with a light beam is different for each coherent illumination. In the pupil plane of the detection optical system, the respective light beams of the coherent illuminations pass through first regions different from each other. The first region is a region of a light beam passing through the pupil plane of the detection optical system, each of the first regions satisfies the following Condition (1), and at least one distance among the distances between the two adjacent first regions satisfies the following Condition (2).

$$LS<PS\times10^{-3} \quad (1)$$

$$0.05\times T<d \quad (2)$$

where

LS is the area of the first region (in $mm^2$),

PS is the area of the pupil of the detection optical system (in $mm^2$), d is the distance between the two adjacent first regions (in mm), and T is the diameter of the pupil of the detection optical system (in mm).

Figure 1A:
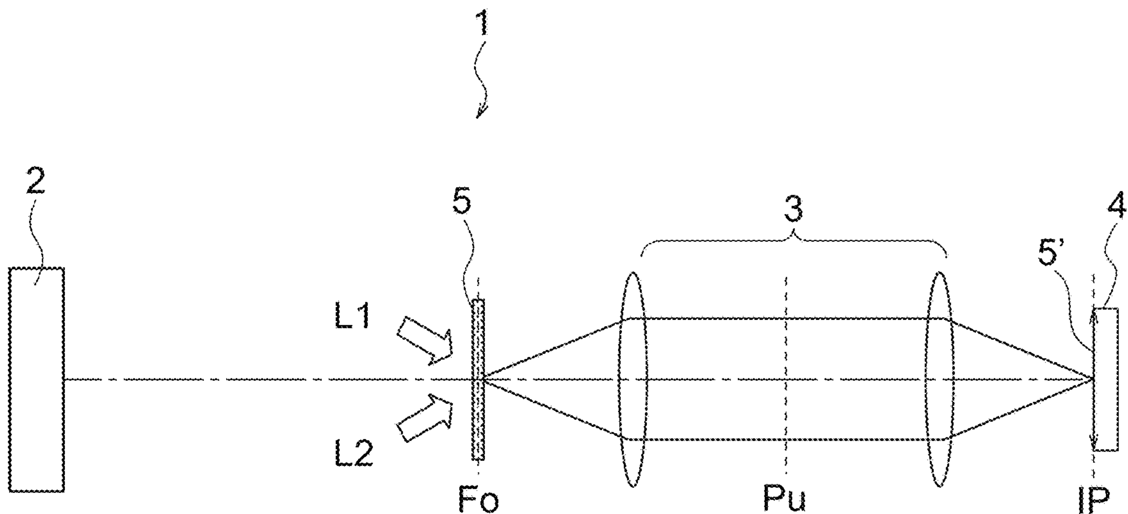
FIGS. 1A and 1B are diagrams illustrating a microscope system of the present embodiment and a photographic image.
Figure 1B:
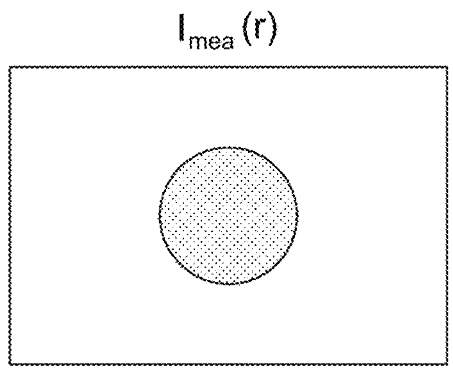

FIGS. 1A and 1B are diagrams illustrating a microscope system of the present embodiment illustrating a microscope system of the present embodiment and a photographic image. FIG. 1A is a diagram illustrating a microscope system. FIG. 1B is a diagram illustrating a photographic image.

As illustrated in FIG. 1A, a microscope system 1 includes an incoherent light source 2, a detection optical system 3, and an imager 4.

The incoherent light source 2 is a light source that emits light that is temporally not coherent. In a sample 5, coherent illumination is performed by light emitted from the incoherent light source. The coherent illumination is illumination by light that is spatially coherent.

In the coherent illumination for the sample 5, the sample 5 is irradiated with a plurality of light beams simultaneously. Further, the sample 5 is irradiated with a plurality of light beams from different directions.

In FIG. 1A, a light beam L1 and a light beam L2 are illustrated. The light beam L1 and the light beam L2 are light beams irradiating the sample 5 and emitted from the incoherent light source 2. The light beam L1 and the light beam L2 are light beams independent of each other and irradiate the sample 5 simultaneously. The orientation of the light beam L1 with respect to the sample 5 is different from the orientation of the light beam L2 with respect to the sample 5. The light beam L1 and the light beam L2 are each a light beam of coherent illumination light.

The sample 5 is a thin sample. In FIG. 1A, a focus position Fo of the detection optical system 3 is located inside the sample 5.

The detection optical system 3 is an optical system that forms an optical image 5' of the sample 5. Light emitted from the sample 5 is collected by the detection optical system 3 onto an imaging plane IP. The optical image 5' is formed on the imaging plane IP.

An image pickup surface of the imager 4 is located on the imaging plane IP. The imager 4 receives the optical image 5' of the sample 5 formed by the detection optical system 3. An image of the optical image 5' is acquired by the imager 4. As a result, a photographic image $I_{mea}(r)$ illustrated in FIG. 1B is obtained. r denotes the two-dimensional coordinates of (x,y).

Since the sample 5 is a thin sample, one photographic image is acquired. Thus, the detection optical system 3 and the imager 4 do not move in the optical axis direction. Further, the sample 5 also does not move in the optical axis direction.

A light beam emitted from the sample 5 arrives at a pupil position Pu of the detection optical system 3. The sample 5 is irradiated with a plurality of light beams simultaneously. Thus, a plurality of light beams arrive at the pupil position Pu simultaneously. Further, the sample 5 is irradiated with a plurality of light beams from different directions. Thus, at the pupil position Pu, a plurality of light beams pass through regions different from each other.

Figure 2:
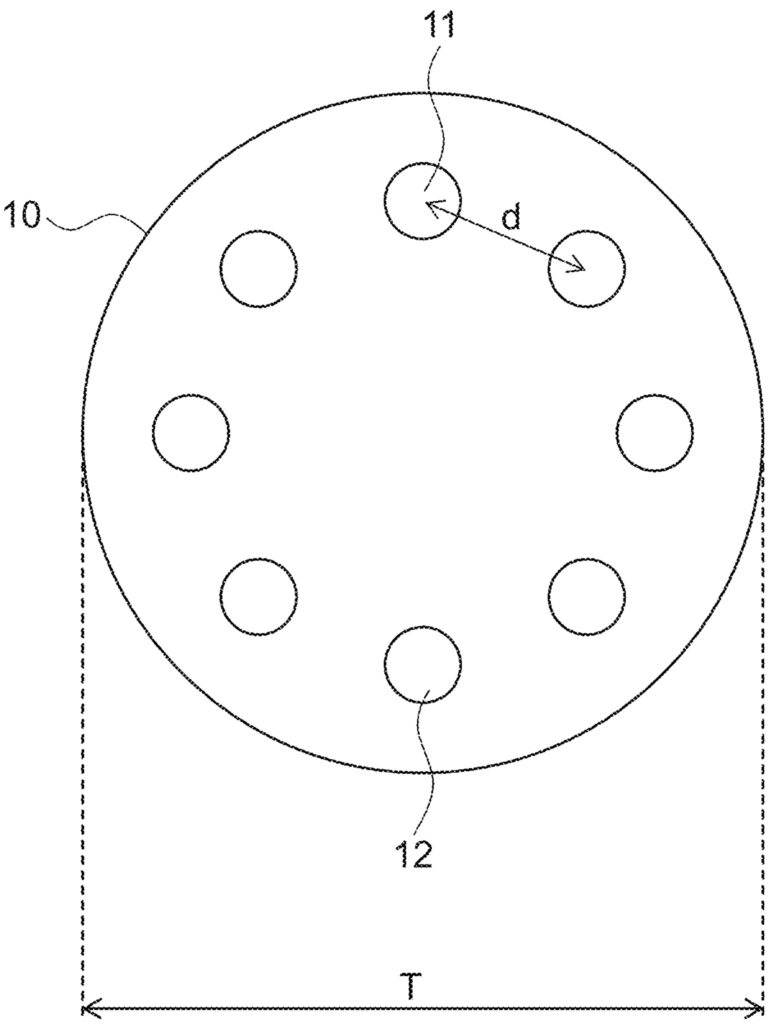
FIG. 2 is a diagram illustrating a pupil plane of a detection optical system.

FIG. 2 is a diagram illustrating the pupil plane of the detection optical system. A first region is the region of a light beam passing through the pupil plane of the detection optical system.

In FIG. 2, the number of first regions in a pupil plane 10 of the detection optical system 3 is eight. For example, a first region 11 is the region where the light beam L1 passes through the pupil plane 10. A first region 12 is the region where the light beam L2 passes through the pupil plane 10.

In the microscope system of the present embodiment, each of the first regions satisfies the following Condition (1).

$$LS<PS\times10^{-3} \quad (1)$$

where

LS is the area of the first region (in $mm^2$), and

PS is the area of the pupil of the detection optical system (in $mm^2$).

Each of the light beams is an independent light beam. Thus, the emission position of a light beam in the light source is different for each light beam. The light beam emitted from the light source irradiates the sample. In this case, it is preferable that the sample be irradiated with one wavefront in irradiation of the light beam emitted from one emission position.

In the microscope system of the present embodiment, it is possible to acquire a photographic image $I_{mea}(r)$. It is possible to use the photographic image $I_{mea}(r)$, for example, in estimation of the refractive index distribution. Estimation of the refractive index distribution will be described later.

In estimation of the refractive index distribution, a computational image is calculated from an estimation sample using the beam propagation method for partial coherent imaging. A parameter (refractive index distribution) of the estimation sample is changed by gradient descent or the like so that the computational image approaches the photographic image $I_{mea}(r)$.

In the beam propagation method for partial coherent imaging, the computation time is proportional to the number of wavefronts irradiating the sample. When a value exceeds the upper limit value of Condition (1), the sample is irradiated with a plurality of wavefronts by illumination of a light beam emitted from one emission position. The computation time therefore becomes too long.

In the microscope system of the present embodiment, at least one distance among the distances between the two adjacent first regions satisfies the following Condition (2).

$$0.05 \times T < d \tag{2}$$

where d is the distance between the two adjacent first regions (in mm), and

T is the diameter of the pupil of the detection optical system (in mm).

An optical image is formed with a light beam in one first region and an optical image is formed with a light beam in another first region. Since the angle of incidence on the sample differs for the two light beams, the two optical images are also different.

When a value falls below the lower limit value of Condition (2), one first region and another first region are too close to each other. In this case, the difference between the two optical images is reduced. When the difference is reduced, information obtained from the two optical images is substantially the same. Therefore, for example, in estimation of the refractive index distribution, the reconstruction performance is not improved although the computation time is long.

In the microscope system of the present embodiment, it is preferable that half of the first regions satisfy Condition (2).

When half of the first regions satisfies Condition (2), it is possible to obtain information different from each other from two adjacent optical images and to acquire a number of pieces of information different from each other. When the refractive index distribution is estimated, it is possible to estimate with relatively high accuracy.

In the microscope system of the present embodiment, it is preferable that the following Condition (3) be satisfied.

$$\sum_{i=1}^{n} LSi < PS \times 10^{-2} \tag{3}$$

where

LSi is the area of the i-th first region (in $mm^2$),

PS is the area of the pupil of the detection optical system (in $mm^2$), and n is the number of first regions.

The left side of Condition (3) is the total area obtained by summing the respective areas of the first regions. By satisfying Condition (3), it is possible to reduce the number of wavefronts irradiating the sample and to shorten the computation time.

In the microscope system of the present embodiment, it is preferable that some of the first regions be located within a first annular region, and the first annular region is a region with a radius of 50% or more in a pupil region of the detection optical system.

Figure 3:
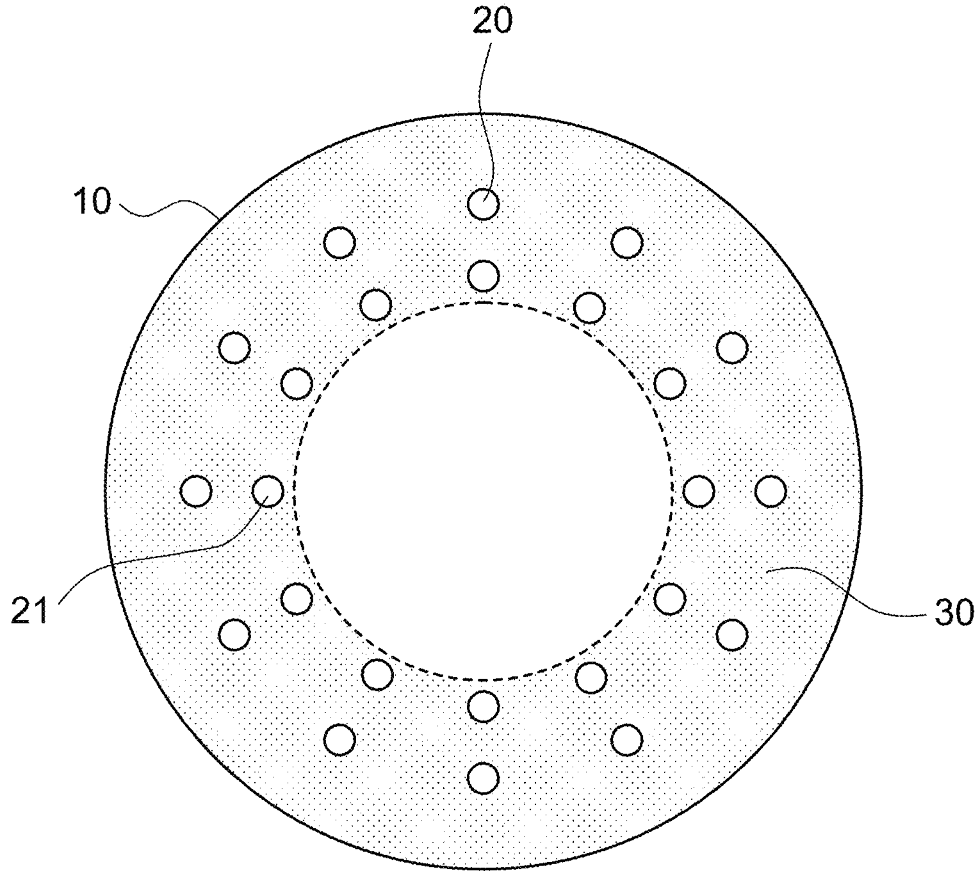
FIG. 3 is a diagram illustrating the pupil plane of the detection optical system in a first example.

FIG. 3 is a diagram illustrating the pupil plane of the detection optical system in a first example. FIG. 3 illustrates the first regions in the pupil plane 10 of the detection optical system. First regions 20 and first regions 21 are located on circumferences. The first regions 20 are located outside the circumference where the first regions 21 are located. Either the first regions 20 or the first regions 21 are sufficient.

In FIG. 3, one circle is drawn with a broken line. The radius of the circle is 50% of the radius of the pupil 10. The region outside the circle is a first annular region 30. The first annular region 30 is a region with a radius of 50% or more.

In the first example, the first regions 20 and the first regions 21 are located in the first annular region 30. The first example satisfies Conditions (1), (2), and (3). When the refractive index distribution is estimated, in the first example, it is possible to estimate a relatively fine structure.

When there are many first regions that satisfy Condition (2), the computation time is reduced. Even when some of the first regions do not satisfy Condition (2), the computation time is reduced. It is desirable that half or more of the first regions satisfy Condition (2).

In the microscope system of the present embodiment, it is preferable that some of the first regions be aligned to form a double circle within the first annular region.

As illustrated in FIG. 3, in the first example, the first regions 20 and the first regions 21 form a double circle in the first annular region 30. Thus, it is possible to acquire a number of pieces of information different from each other. When the refractive index distribution is estimated, it is possible to estimate a relatively fine structure.

In the microscope system of the present embodiment, it is preferable that some of the first regions be located within a second annular region, and the second annular region is a region with a radius of 70% to 90% in a pupil region of the detection optical system.

Figure 4:
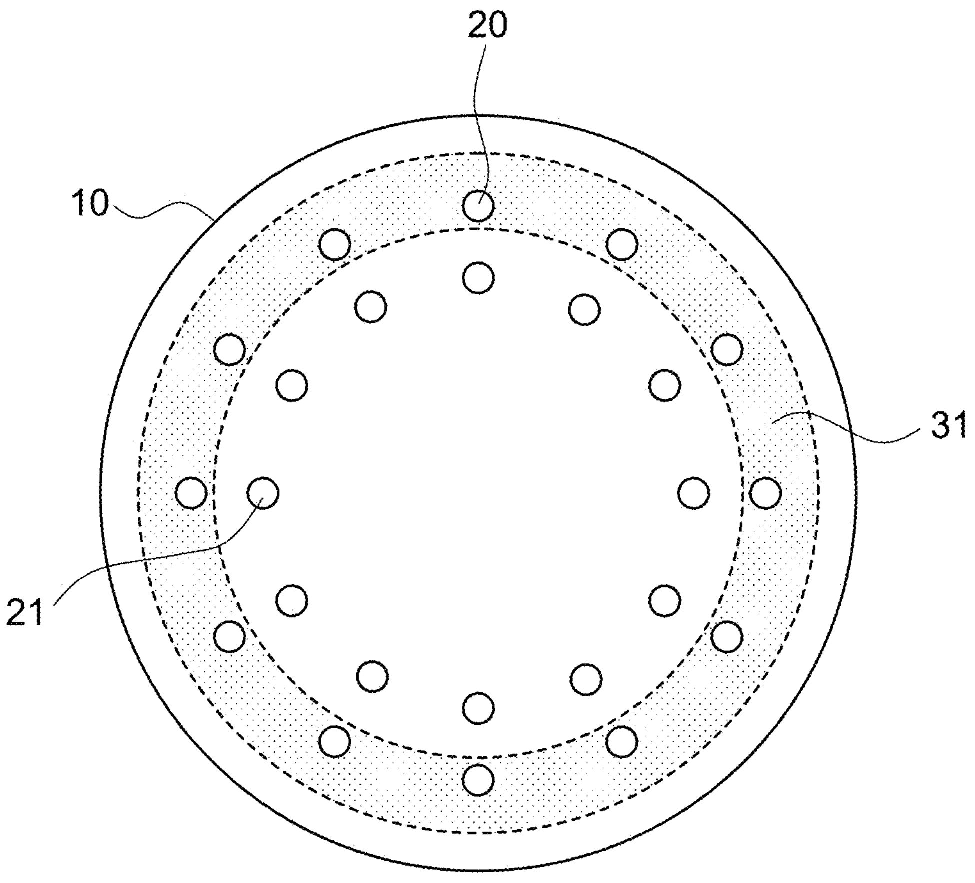
FIG. 4 is a diagram illustrating the pupil plane of the detection optical system in a second example.

FIG. 4 is a diagram illustrating the pupil plane of the detection optical system in a second example. FIG. 4 illustrates the first regions in the pupil plane 10 of the detection optical system. First regions 20 and first regions 21 are located on circumferences. The first regions 20 are located outside the circumference where the first regions 21 are located. Only the first regions 20 may be present and the first regions 21 do not have to be present.

In FIG. 4, two circles are drawn with broken lines. The radius of the inner circle is 70% of the radius of the pupil 10. The radius of the outer circle is 90% of the radius of the pupil 10. The region sandwiched between the two circles is a second annular region 31. The second annular region 31 is a region with a radius of 70% to 90%.

In the second example, the first regions 20 are located in the second annular region 31. The second example satisfies Conditions (1), (2), and (3). When the refractive index distribution is estimated, in the second example, it is possible to estimate a relatively fine structure. Some of the first regions do not have to satisfy Condition (2). It is desirable that half or more of the first regions satisfy Condition (2).

In the microscope system of the present embodiment, it is preferable that some of the first regions be located within a third annular region, and the third annular region is a region with a radius of 50% to 70% in a pupil region of the detection optical system.

Figure 5:
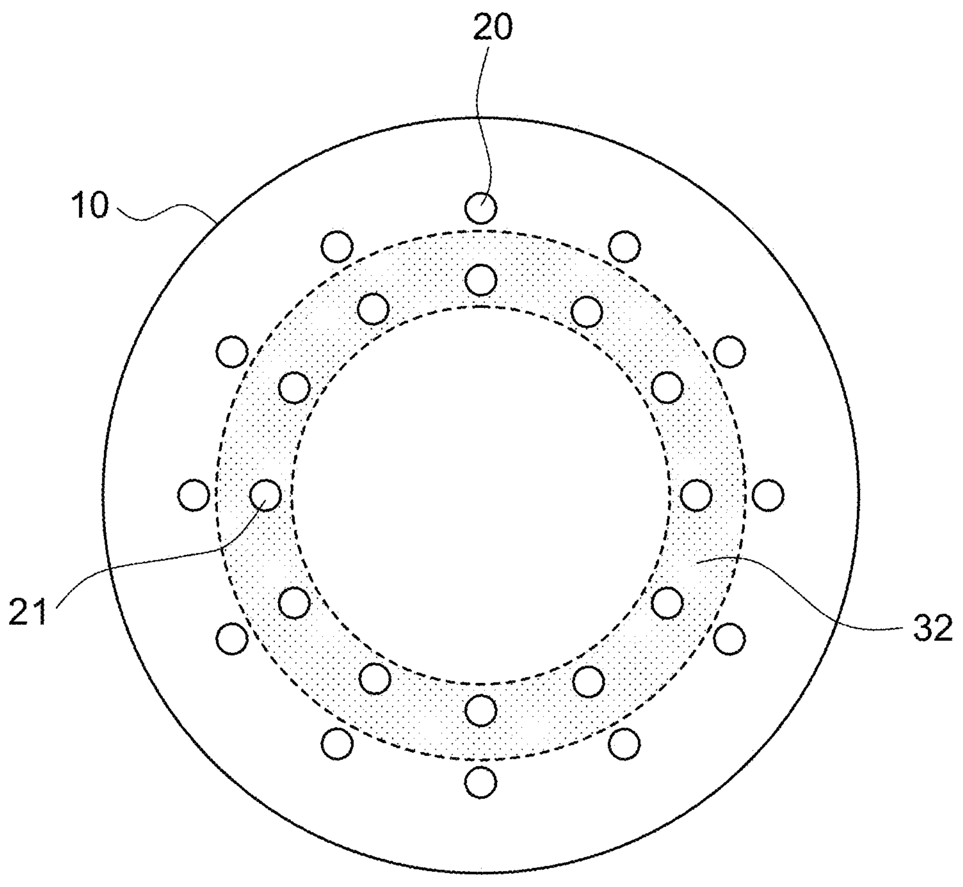
FIG. 5 is a diagram illustrating the pupil plane of the detection optical system in a third example.

FIG. 5 is a diagram illustrating the pupil plane of the detection optical system in a third example. FIG. 5 illustrates the first regions in the pupil plane 10 of the detection optical system. First regions 20 and first regions 21 are located on circumferences. The first regions 20 are located outside the circumference where the first regions 21 are located. Only the first regions 21 may be present and the first regions 20 do not have to be present.

In FIG. 5, two circles are drawn with broken lines. The radius of the inner circle is 50% of the radius of the pupil 10. The radius of the outer circle is 70% of the radius of the pupil 10. The region sandwiched between the two circles is a third annular region 32. The third annular region 32 is a region with a radius of 50% to 70%.

In the third example, the first regions 21 are located in the third annular region 32. The third example satisfies Conditions (1), (2), and (3). When the refractive index distribution is estimated, in the third example, it is possible to estimate a relatively fine structure. Some of the first regions do not have to satisfy Condition (2). It is desirable that half or more of the first regions satisfy Condition (2).

In the microscope system of the present embodiment, it is preferable that some of the first regions be located within a first circular region, and the first circular region is a region closer to the center than the first annular region in the pupil region of the detection optical system.

Figure 6:
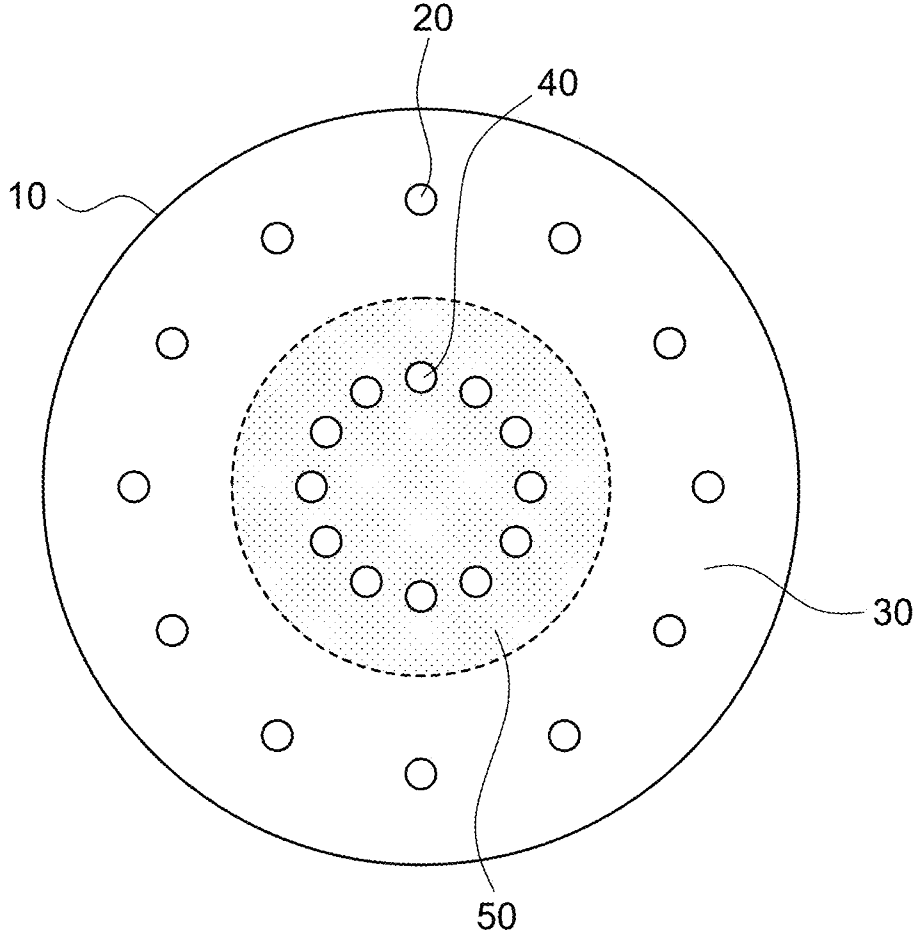
FIG. 6 is a diagram illustrating the pupil plane of the detection optical system in a fourth example.

FIG. 6 is a diagram illustrating the pupil plane of the detection optical system in a fourth example. FIG. 6 illustrates the first regions in the pupil plane 10 of the detection optical system. First regions 20 and first regions 40 are located on circumferences. The first regions 20 are located outside the circumference where the first regions 40 are located.

In FIG. 6, one circle is drawn with a broken line. The region outside the circle is a first annular region 30. The region inside the circle is a first circular region 50. The first circular region 50 is a region closer to the center than the first annular region.

In the fourth example, the first regions 40 are located in the first circular region 50. The fourth example satisfies Conditions (1), (2), and (3). When the refractive index distribution is estimated, in the fourth example, it is possible to estimate not only a relatively fine structure but also a relatively coarse structure. Some of the first regions do not have to satisfy Condition (2). It is desirable that half or more of the first regions satisfy Condition (2).

In the microscope system of the present embodiment, it is preferable that some of the first regions be aligned to form a circle within the first circular region.

As illustrated in FIG. 6, in the fourth example, the first regions 40 form a circle in the first circular region 50. When the refractive index distribution is estimated, it is possible to estimate a relatively coarse structure.

In the microscope system of the present embodiment, it is preferable that some of the first regions be located within a second circular region, and the second circular region be a region with a radius of 50% or less in a pupil region of the detection optical system.

Figure 7:
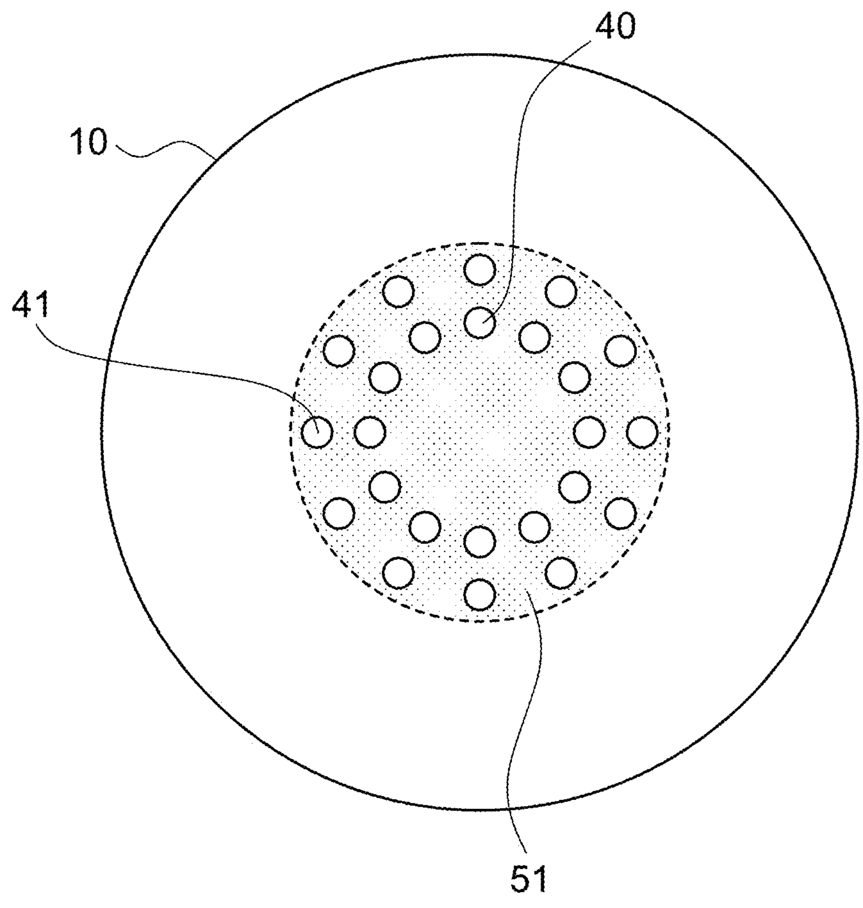
FIG. 7 is a diagram illustrating the pupil plane of the detection optical system in a fifth example.

FIG. 7 is a diagram illustrating the pupil plane of the detection optical system in a fifth example. FIG. 7 illustrates the first regions in the pupil plane 10 of the detection optical system. First regions 40 and first regions 41 are located on circumferences. The first regions 41 are located outside the circumference where the first regions 40 are located. Either the first regions 40 or the first regions 41 are sufficient.

In FIG. 7, one circle is drawn with a broken line. The radius of the circle is 50% of the radius of the pupil 10. The region inside the circle is a second circular region 51. The second circular region 51 is a region with a radius of 50% or less.

In the fifth example, the first regions 40 and the first regions 41 are located in the second circular region 51. The fifth example satisfies Conditions (1), (2), and (3). When the refractive index distribution is estimated, in the fifth example, it is possible to estimate a relatively coarse structure. Some of the first regions do not have to satisfy Condition (2). It is desirable that half or more of the first regions satisfy Condition (2).

In the microscope system of the present embodiment, it is preferable that some of the first regions be aligned to form a circle within the second circular region.

As illustrated in FIG. 7, in the fifth example, the first regions 40 and the first regions 41 form circles in the second circular region 51. Thus, it is possible to acquire a number of pieces of information different from each other. When the refractive index distribution is estimated, it is possible to estimate a relatively coarse structure.

In the microscope system of the present embodiment, it is preferable that some of the first regions be located within a fourth annular region, and the fourth annular region is a region with a radius of 30% or more to 50% in a pupil region of the detection optical system.

Figure 8:
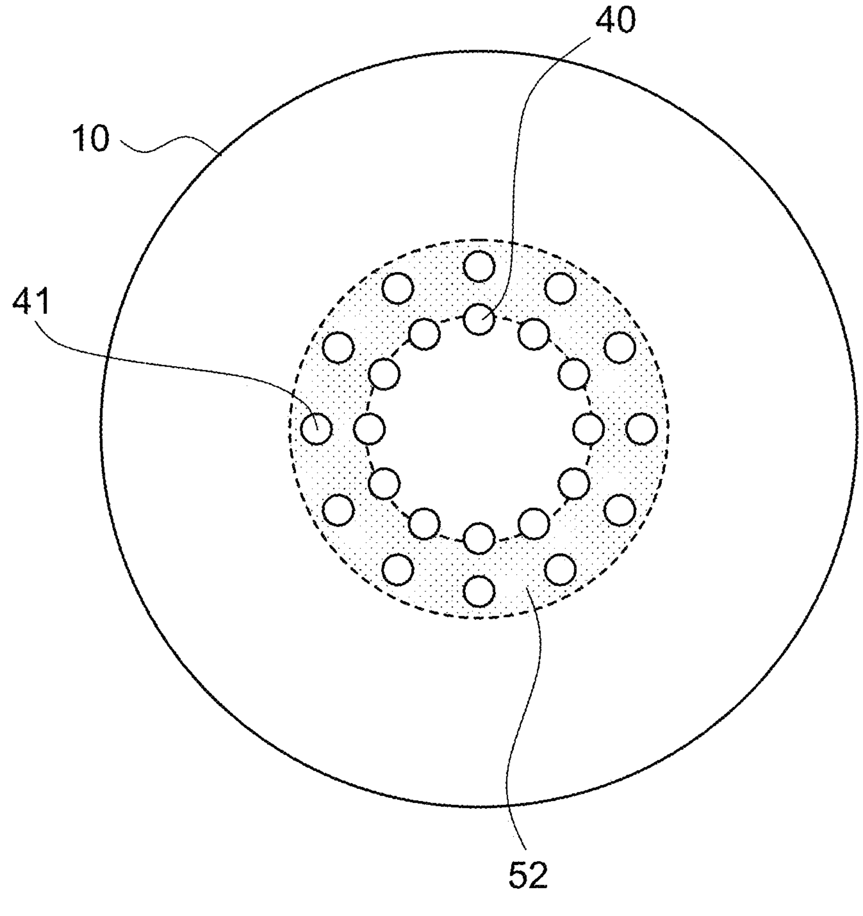
FIG. 8 is a diagram illustrating the pupil plane of the detection optical system in a sixth example.

FIG. 8 is a diagram illustrating the pupil plane of the detection optical system in a sixth example. FIG. 8 illustrates the first regions in the pupil plane 10 of the detection optical system. First regions 40 and first regions 41 are located on circumferences. The first regions 41 are located outside the circumference where the first regions 40 are located. Only the first regions 41 may be present and the first regions 40 do not have to be present.

In FIG. 8, two circles are drawn with broken lines. The radius of the inner circle is 30% of the radius of the pupil 10. The radius of the outer circle is 50% of the radius of the pupil 10. The region sandwiched between the two circles is a fourth annular region 52. The fourth annular region 52 is a region with a radius of 30% to 50%.

In the sixth example, the first regions 41 are located in the fourth annular region 52. The sixth example satisfies Conditions (1), (2), and (3). When the refractive index distribution is estimated, in the sixth example, it is possible to estimate a relatively coarse structure. Some of the first regions do not have to satisfy Condition (2). It is desirable that half or more of the first regions satisfy Condition (2).

In the microscope system of the present embodiment, it is preferable that some of the first regions be located within a third circular region, and the third circular region is a region with a radius of 30% or less in a pupil region of the detection optical system.

Figure 9:
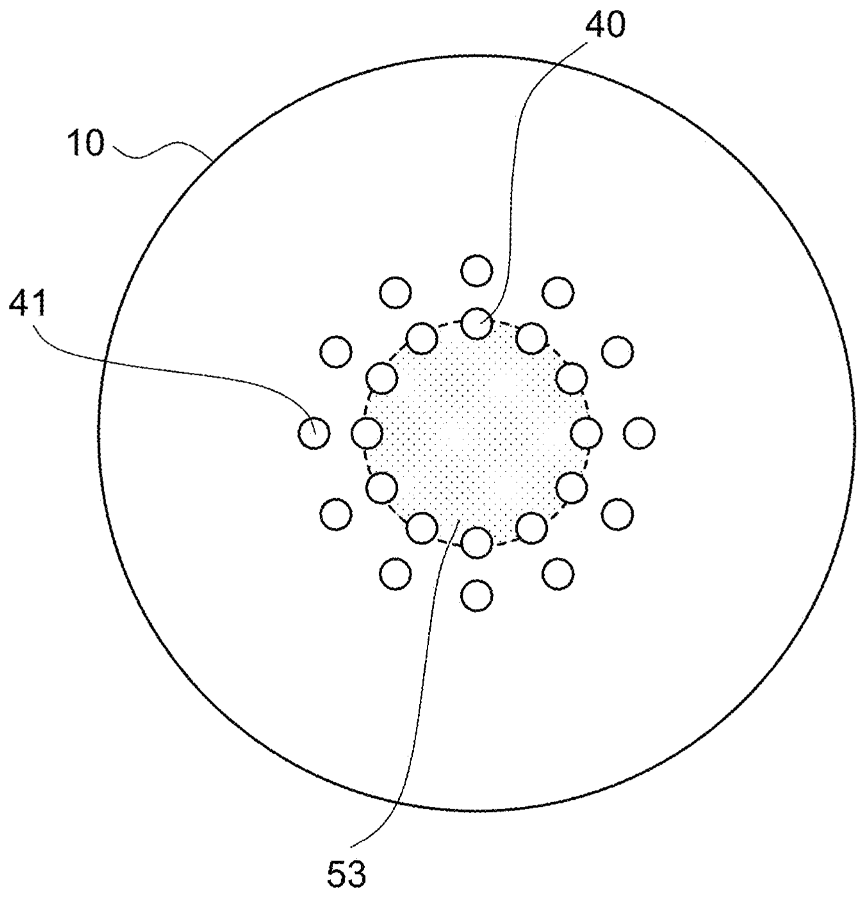
FIG. 9 is a diagram illustrating the pupil plane of the detection optical system in a seventh example.

FIG. 9 is a diagram illustrating the pupil plane of the detection optical system in a seventh example. FIG. 9 illustrates the first regions in the pupil plane 10 of the detection optical system. First regions 40 and first regions 41 are located on circumferences. The first regions 41 are located outside the circumference where the first regions 40 are located. Only the first regions 40 may be present and the first regions 41 do not have to be present.

In FIG. 9, one circle is drawn with a broken line. The radius of the circle is 30% of the radius of the pupil 10. The region inside the circle is a third circular region 53. The third circular region 53 is a region with a radius of 30% or less.

In the seventh example, the first regions 40 are located in the third circular region 53. The seventh example satisfies Conditions (1), (2), and (3). When the refractive index distribution is estimated, in the seventh example, it is possible to estimate a relatively coarse structure. Some of the first regions do not have to satisfy Condition (2). It is desirable that half or more of the first regions satisfy Condition (2).

In the microscope system of the present embodiment, it is preferable that when a pupil of the detection optical system is divided into four sector shapes with the equal central angle, any of the first regions are located in each of the four sector shapes.

Figure 10:
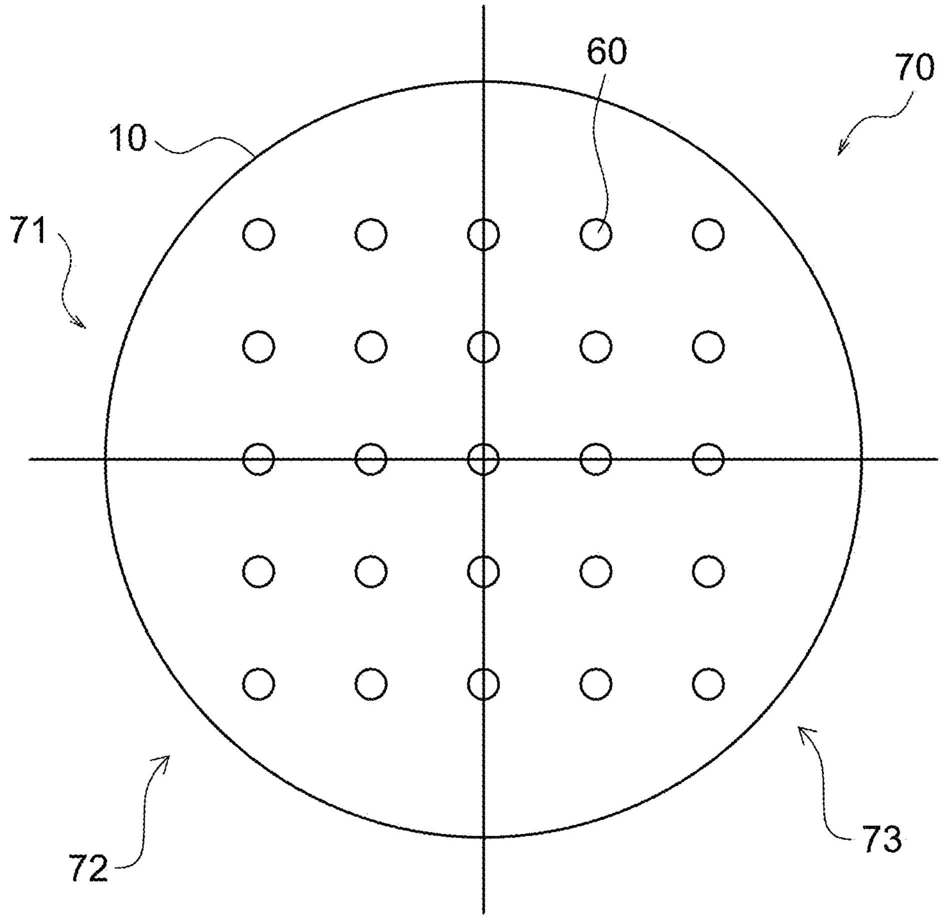
FIG. 10 is a diagram illustrating the pupil plane of the detection optical system in an eighth example.

FIG. 10 is a diagram illustrating the pupil plane of the detection optical system in an eighth example. FIG. 10 illustrates the first regions in the pupil plane 10 of the detection optical system. First regions 60 are located in a grid pattern.

In FIG. 10, two straight lines orthogonal to each other are drawn. The two straight lines divide the pupil plane 10 into a first sector-shaped region 70, a second sector-shaped region 71, a third sector-shaped region 72, and a fourth sector-shaped region 74. In the four sector-shaped regions, the central angle in one sector-shaped region is equal to the central angle in the other sector-shaped regions.

In the eighth example, the first regions 60 are located in all of the first sector-shaped region 70, the second sector-shaped region 71, the third sector-shaped region 72, and the fourth sector-shaped region 74. The eighth example satisfies Conditions (1), (2), and (3). When the refractive index distribution is estimated, in the eighth example, it is possible to estimate not only a relatively fine structure but also a relatively coarse structure. Some of the first regions do not have to satisfy Condition (2). It is desirable that half or more of the first regions satisfy Condition (2).

In the microscope system of the present embodiment, it is preferable that some of the first regions be paired across the center of the pupil of the detection optical system.

Figure 11:
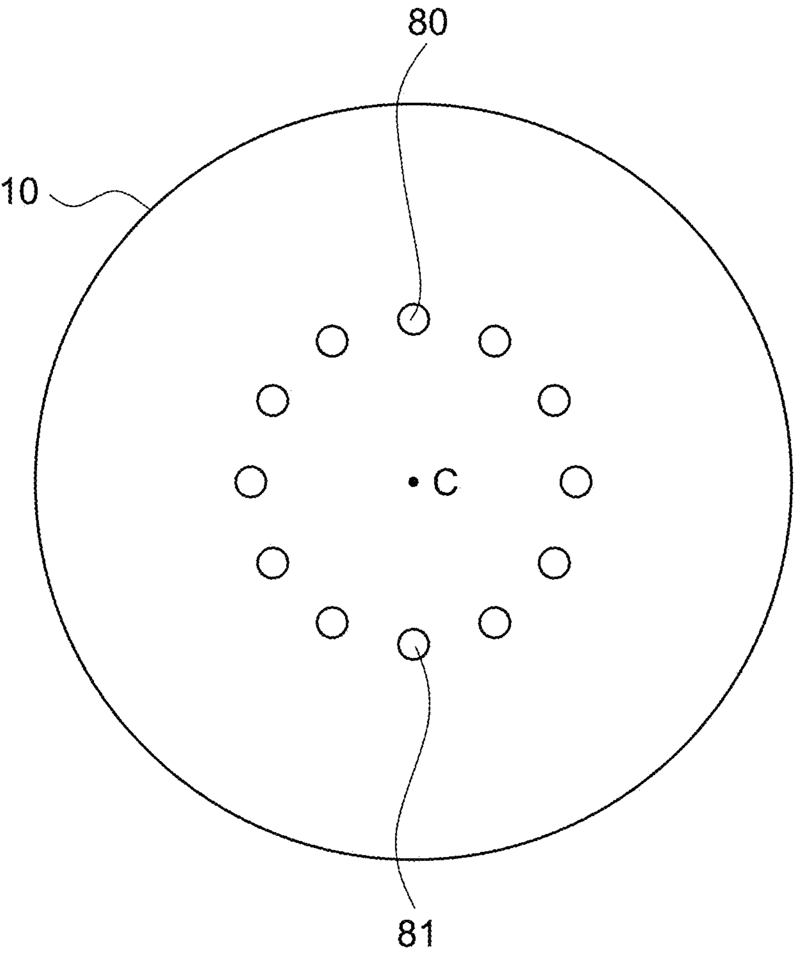
FIG. 11 is a diagram illustrating the pupil plane of the detection optical system in a ninth example.

FIG. 11 is a diagram illustrating the pupil plane of the detection optical system in a ninth example. FIG. 11 illustrates the first regions in the pupil plane 10 of the detection optical system. A first region 80 and a first region 81 are located on a circumference.

In the ninth example, the first region 80 and the first region 81 are paired across a center C of the pupil of the detection optical system. The ninth example satisfies Conditions (1), (2), and (3). When the refractive index distribution is estimated, in the ninth example, it is possible to estimate a relatively coarse structure. Some of the first regions do not have to satisfy Condition (2). It is desirable that half or more of the first regions satisfy Condition (2).

Further, the number of first regions in the ninth example is smaller than that in the seventh example. When the refractive index distribution is estimated, it is possible to estimate within a time shorter than the estimation time in the seventh example.

In the microscope system of the present embodiment, it is preferable that each of the first regions satisfy the following Condition (4).

$$PS\times10^{-6}<LS \tag{4}$$

where

LS is the area of the first region (in $mm^2$), and

PS is the area of the pupil of the detection optical system (in $mm^2$).

When a value falls below the lower limit value of Condition (4), the optical image is darker. In this case, the SN in the photographic image $I_{mea}(r)$ deteriorates. It is possible to use the photographic image $I_{mea}(r)$, for example, in estimation of the refractive index distribution. If the SN in the photographic image $I_{mea}(r)$ deteriorates, the estimation accuracy deteriorates.

In the microscope system of the present embodiment, at least one distance among the distances between the two adjacent first regions satisfies the following Condition (5).

$$d<0.5\times T \tag{5}$$

where d is the distance between the two adjacent first regions (in mm), and

T is the diameter of the pupil of the detection optical system (in mm).

When a value exceeds the upper limit value of Condition (5), the number of first regions is reduced. Therefore, the optical image is darker.

It is desirable that the first region satisfying Condition (2) simultaneously satisfy Condition (5).

In the microscope system of the present embodiment, it is preferable that the following Condition (A) be satisfied.

$$4\leq n\leq100 \tag{A}$$

where n is the number of first regions.

When a value falls below the lower limit value of Condition (A), the number of first regions is reduced. Therefore, the optical image is darker. When a value exceeds the upper limit value of Condition (A), for example, the time for estimation of the refractive index distribution is longer.

A microscope system of the present embodiment includes an incoherent light source, an illumination optical system, a detection optical system, and an imager. The incoherent light source is a light source that emits light that is temporally not coherent. The detection optical system is an optical system that forms an optical image of a sample, and the imager receives the optical image of the sample formed by the detection optical system. In the sample, a plurality of coherent illuminations are performed simultaneously by light emitted from the incoherent light source, and the coherent illuminations are illumination by light that is spatially coherent. The direction in which the sample is irradiated with a light beam is different for each of the coherent illuminations, and in a pupil plane of the illumination optical system, the respective light beams of the coherent illuminations are located in second regions different from each other. Each of the second regions satisfies the following Condition (6), and at least one distance among distances between the two adjacent second regions satisfies the following Condition (7).

$$LS'<PS'\times10^{-3} \tag{6}$$

$$0.05\times T'<d' \tag{7}$$

where

LS' is the area of the second region (in $mm^2$),

PS' is the area of the pupil of the illumination optical system (in $mm^2$), d' is the distance between the two adjacent second regions (in mm), and T' is the diameter of the pupil of the illumination optical system (in mm).

Figure 12:
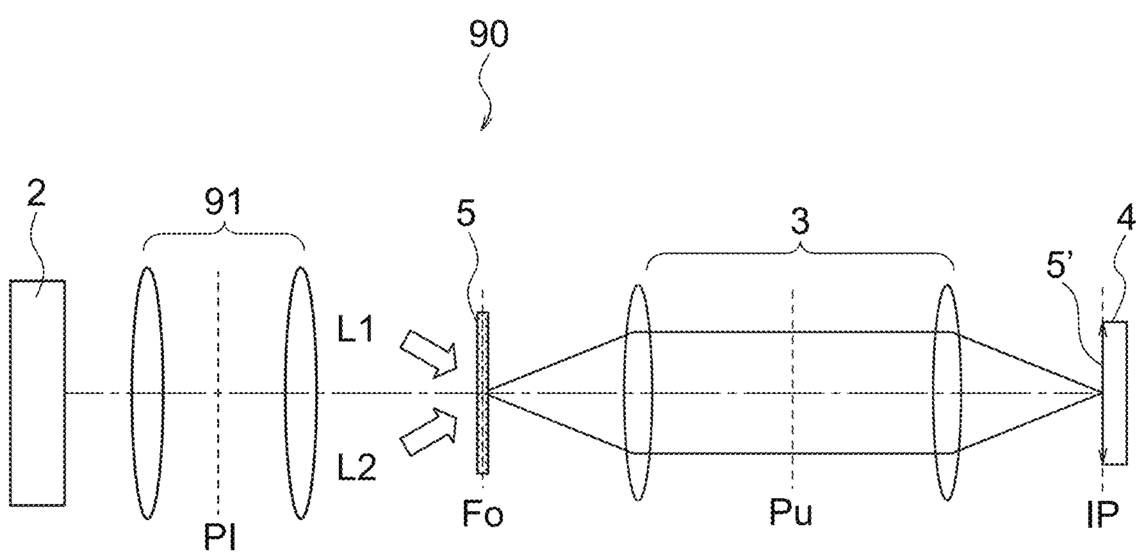
FIG. 12 is a diagram illustrating a microscope system of the present embodiment.

FIG. 12 is a diagram illustrating a microscope system of the present embodiment. The same configurations as that in FIG. 1 are denoted by the same numerals and will not be further elaborated.

A microscope system 90 includes an incoherent light source 2, an illumination optical system 91, a detection optical system 3, and an imager 4.

When the incoherent light source 2 is disposed at a position away from a pupil plane PI of the illumination optical system 91, light emitted from the incoherent light source 2 passes through the pupil plane PI. When the incoherent light source 2 is disposed at a position of the pupil plane PI, light is emitted from the pupil plane PI. Light emitted from the incoherent light source 2 passes through the illumination optical system 91 and irradiates a sample 5.

Figure 13:
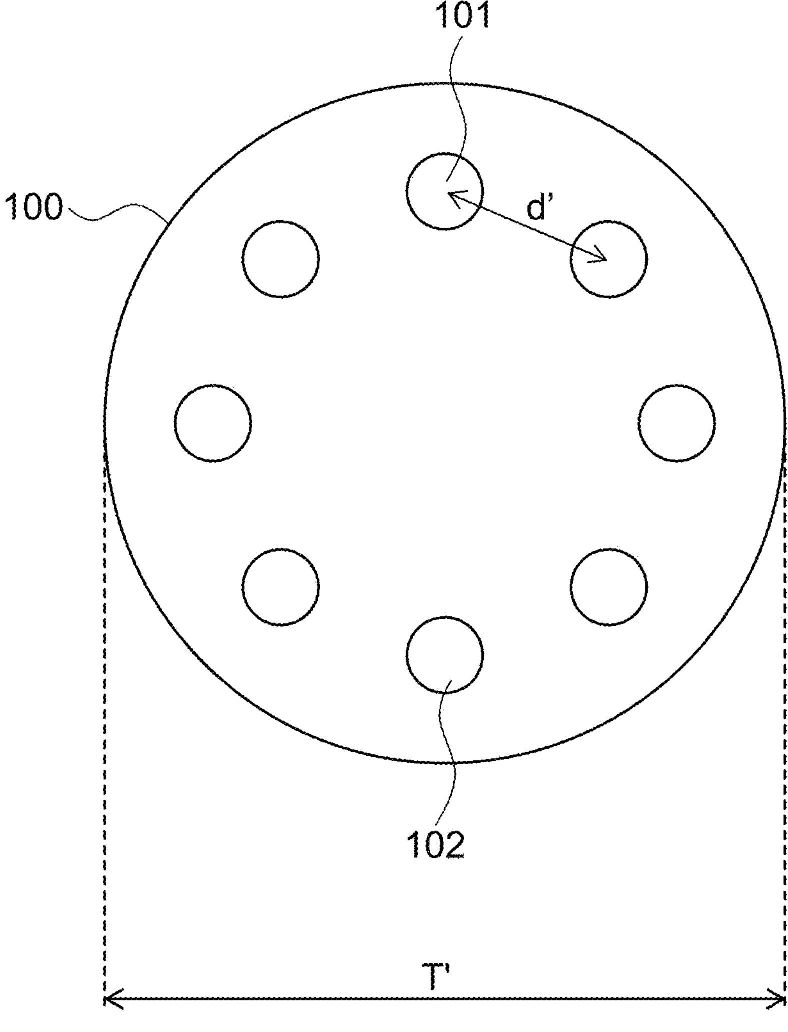
FIG. 13 is a diagram illustrating a pupil plane of an illumination optical system.

FIG. 13 is a diagram illustrating the pupil plane of the illumination optical system. In FIG. 13, the number of second regions in a pupil plane 100 of the illumination optical system 91 is eight. In the pupil plane 100, a plurality of beams of light are located at regions different from each other. The respective positions of the second regions are different from each other. The second region indicates the position of each of the beams of light.

For example, a second region 101 is a region where a light beam L1 passes through the pupil plane 100 or where a light beam L1 is generated. A second region 102 is a region where a light beam L2 passes through the pupil plane 100 or where a light beam L2 is generated. The light beam L1 and the light beam L2 are each a light beam of coherent illumination light.

In the microscope system of the present embodiment, each of the second regions satisfies the following Condition (6).

$$LS'<PS'\times 10^{-3} \quad (6)$$

where

LS' is the area of the second region (in mm$^2$), and

PS' is the area of the pupil of the illumination optical system (in mm$^2$).

The technical meaning of Condition (6) is the same as the technical meaning of Condition (1).

In the microscope system of the present embodiment, at least one distance among the distances between the two adjacent second regions satisfies the following Condition (7).

$$0.05\times T'<d' \quad (7)$$

where d' is the distance between the two adjacent second regions (in mm), and

T' is the diameter of the pupil of the illumination optical system (in mm).

The technical meaning of Condition (7) is the same as the technical meaning of Condition (2).

In the microscope system of the present embodiment, it is preferable that the detection optical system include an objective lens and an imaging lens, the illumination optical system include a condenser lens, the area of the second region be represented by the following Expression (8), and the diameter of the pupil of the illumination optical system be represented by the following Expression (9)

$$PS'=(FLcd\times NA)^2\times\pi \quad (8)$$

$$T'=FLcd\times NA \quad (9)$$

where

FLcd is the focal length of the condenser lens (in mm), and

NA is the numerical aperture of the objective lens.

It is preferable that the microscope system of the present embodiment further include an aperture member. Each of the light beams is emitted from a corresponding one of a plurality of independent regions on a predetermined plane. The predetermined plane is a plane orthogonal to the optical axis of the detection optical system and at a position opposite the detection optical system with respect to the sample. The aperture member is disposed on the predetermined plane and has a plurality of independent transmission regions. The transmission regions are each a region that allows light to pass through, and each of the transmission regions corresponds to one of the second regions.

Figure 14:
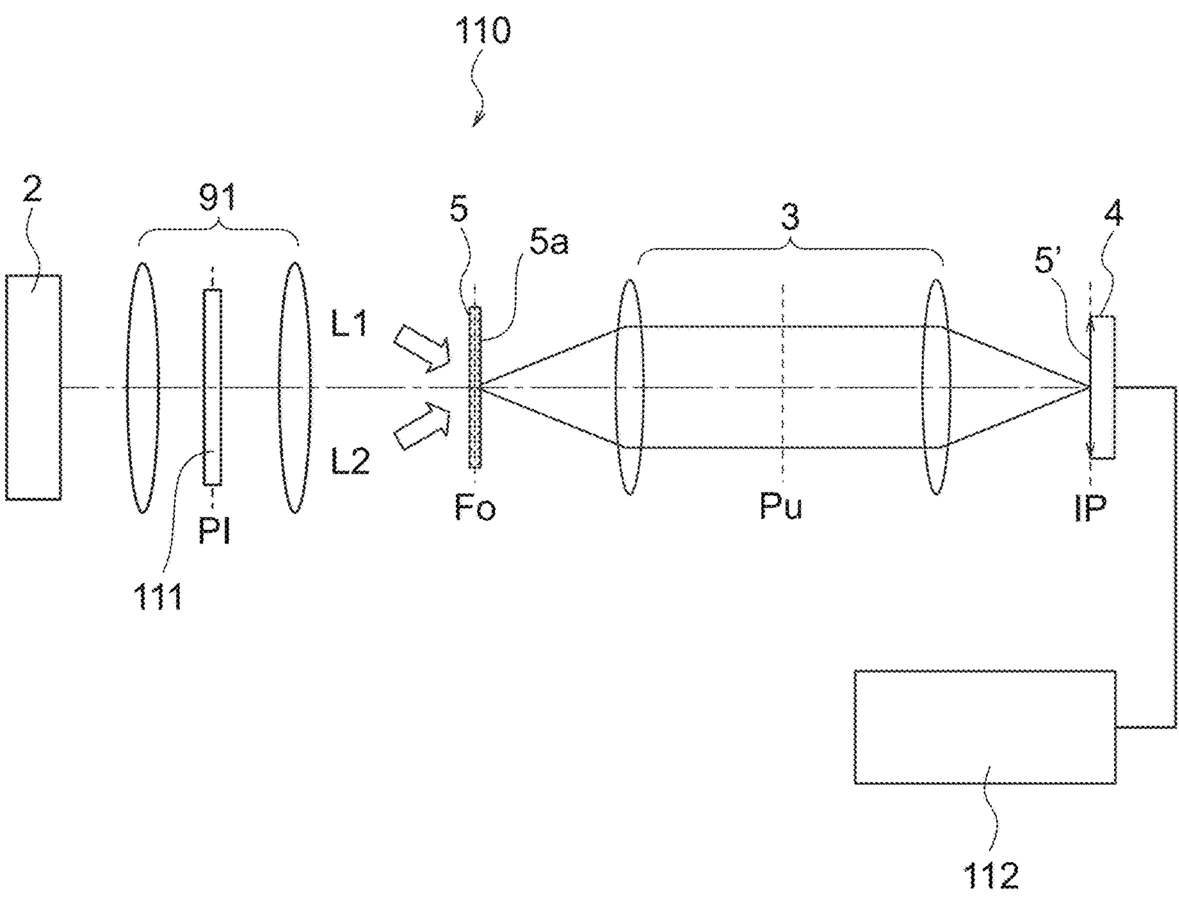
FIG. 14 is a diagram illustrating a microscope system of the present embodiment.

FIG. 14 is a diagram illustrating a microscope system of the present embodiment. The same configurations as that in FIG. 12 are denoted by the same numerals and will not be further elaborated.

A microscope system 110 includes an incoherent light source 2, an illumination optical system 91, an aperture member 111, a detection optical system 3, and an imager 4.

In the microscope system 110, each of a plurality of light beams is emitted from a corresponding one of a plurality of regions on a predetermined plane. The regions are independent of each other. The predetermined plane is a plane orthogonal to the optical axis of the detection optical system 3 and at a position opposite the detection optical system 3 with respect to a sample 5. In the microscope system 110, the pupil plane PI of the illumination optical system 91 is the predetermined plane.

The aperture member 111 is disposed on the predetermined plane. In the microscope system 110, the aperture member 111 is disposed on the pupil plane PI.

The microscope system 110 may include a processor 112. By including the processor 112, for example, it is possible to estimate the refractive index distribution of the sample 5.

Figure 15:
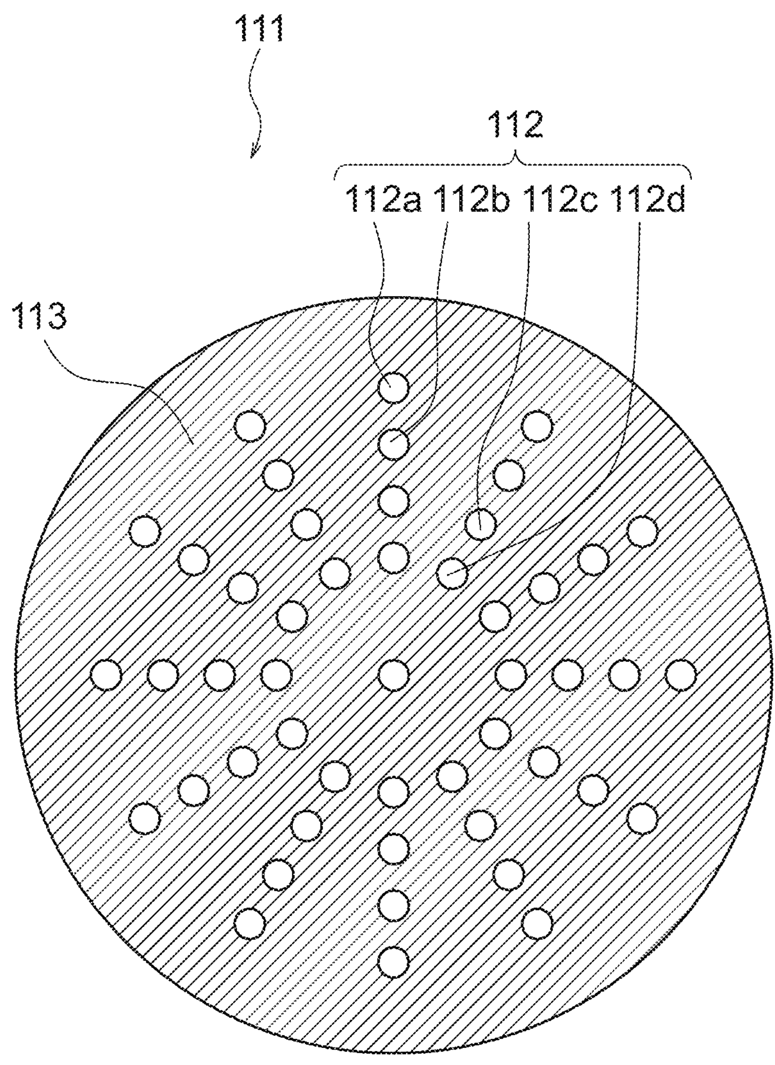
FIG. 15 is a diagram illustrating an aperture member.

FIG. 15 is a diagram illustrating the aperture member. The aperture member 111 has a plurality of independent transmission regions 112. A plurality of transmission regions 112 are independent of each other. The surrounding of the transmission regions 112 is a light-shielding region 113.

The transmission regions 112 are each a region that allows light to pass through. Light passes through a transmission region 112 whereby a light beam L1 irradiates the sample 5. Light passes through another transmission region 112 whereby a light beam L2 irradiates the sample 5.

The transmission regions 112 are each a region of light in the pupil plane PI. Each of the transmission regions 112 corresponds to one of the second regions.

In the aperture member 111, the transmission regions 112 are located on the circumferences of four circles. The four circles are referred to as a first circle, a second circle, a third circle, and a fourth circle from the outer periphery toward the center of the aperture member.

A transmission region **112*a* is located on the circumference of the first circle. A transmission region 112*b* is located on the circumference of the second circle. A transmission region 112*c* is located on the circumference of the third circle. A transmission region 112*d* is located on the circumference of the fourth circle. When the refractive index distribution is estimated using the aperture member 111**, it is possible to perform estimation with high accuracy.

In the aperture member 111, a transmission region is provided at the center. By providing a transmission region at the center, it is possible to easily position the aperture member 111. However, the transmission region at the center is not necessarily required.

Specific examples of the aperture member will be described. The second region is located on the pupil plane PI and the first region is located on the pupil plane Pu. It is possible that the pupil plane PI is conjugate to the pupil plane Pu. In this case, the second region is conjugate to the first region. Since the second region is a transmission region of the aperture member, it is possible to consider the first region as a transmission region of the aperture member. As a result, it is possible to consider that FIGS. 3 to 11 illustrate specific examples of the aperture member.

FIG. 3 illustrates the first example of the aperture member. In FIG. 3, the first regions 20 and the first regions 21 represent the transmission regions of the aperture member. Some of the aperture members are located in a region with a radius of 50% or more in the pupil region of the illumination optical system. Some of the transmission regions of the aperture member are aligned to form a double circle within a region with a radius of 50% or more.

The first example satisfies Conditions (6) and (7). When the refractive index distribution is estimated, in the first example, it is possible to estimate a relatively fine structure.

FIG. 4 illustrates the second example of the aperture member. In FIG. 4, some of the transmission regions of the aperture member are located in a region with a radius of 70% to 90% in the pupil region of the illumination optical system.

The second example satisfies Conditions (6) and (7). When the refractive index distribution is estimated, in the second example, it is possible to estimate a relatively fine structure.

FIG. 5 illustrates the third example of the aperture member. In FIG. 5, some of the transmission regions of the aperture member are located in a region with a radius of 50% to 70% in the pupil region of the illumination optical system.

The third example satisfies Conditions (6) and (7). When the refractive index distribution is estimated, in the third example, it is possible to estimate a relatively fine structure.

FIG. 6 illustrates the fourth example of the aperture member. In FIG. 6, some of the transmission regions of the aperture member are located in a region closer to the center than the region with a radius of 50% or more in the pupil region of the illumination optical system.

The fourth example satisfies Conditions (6) and (7). When the refractive index distribution is estimated, in the fourth example, it is possible to estimate not only a relatively fine structure but also a relatively coarse structure.

FIG. 7 illustrates the fifth example of the aperture member. In FIG. 7, some of the transmission regions of the aperture member are located in a region with a radius of 50% or less in the pupil region of the illumination optical system.

The fifth example satisfies Conditions (6) and (7). When the refractive index distribution is estimated, in the fifth example, it is possible to estimate a relatively coarse structure.

FIG. 8 illustrates the sixth example of the aperture member. In FIG. 8, some of the transmission regions of the aperture member are located in a region with a radius of 30% or more to 50% in the pupil region of the illumination optical system.

The sixth example satisfies Conditions (6) and (7). When the refractive index distribution is estimated, in the sixth example, it is possible to estimate a relatively coarse structure.

FIG. 9 illustrates the seventh example of the aperture member. In FIG. 9, some of the transmission regions of the aperture member are located in a region with a radius of 30% or less in the pupil region of the illumination optical system.

The seventh example satisfies Conditions (6) and (7). When the refractive index distribution is estimated, in the seventh example, it is possible to estimate a relatively coarse structure.

FIG. 10 illustrates the eighth example of the aperture member. In FIG. 10, when the pupil of the illumination optical system is divided into four sector shapes with the equal central angle, any of the transmission regions of the aperture member is located in each of the four sector shapes.

The eighth example satisfies Conditions (6) and (7). When the refractive index distribution is estimated, in the eighth example, it is possible to estimate not only a relatively fine structure but also a relatively coarse structure.

FIG. 11 illustrates the ninth example of the aperture member. In FIG. 11, some of the transmission regions of the aperture member are paired across the center of the pupil of the illumination optical system.

The ninth example satisfies Conditions (6) and (7). When the refractive index distribution is estimated, in the ninth example, it is possible to estimate a relatively coarse structure. In the ninth example, the number of transmission regions of the aperture member is smaller than that in the seventh example. When the refractive index distribution is estimated, it is possible to estimate within a time shorter than the estimation time in the seventh example.

In the microscope system of the present embodiment, it is preferable that each of the light beams be emitted from a corresponding one of a plurality of independent regions on a predetermined plane. The predetermined plane is a plane orthogonal to the optical axis of the detection optical system and at a position opposite the detection optical system with respect to the sample. A plurality of incoherent light sources are disposed on the predetermined plane, and each of the incoherent light sources corresponds to one of the second regions.

Figure 16:
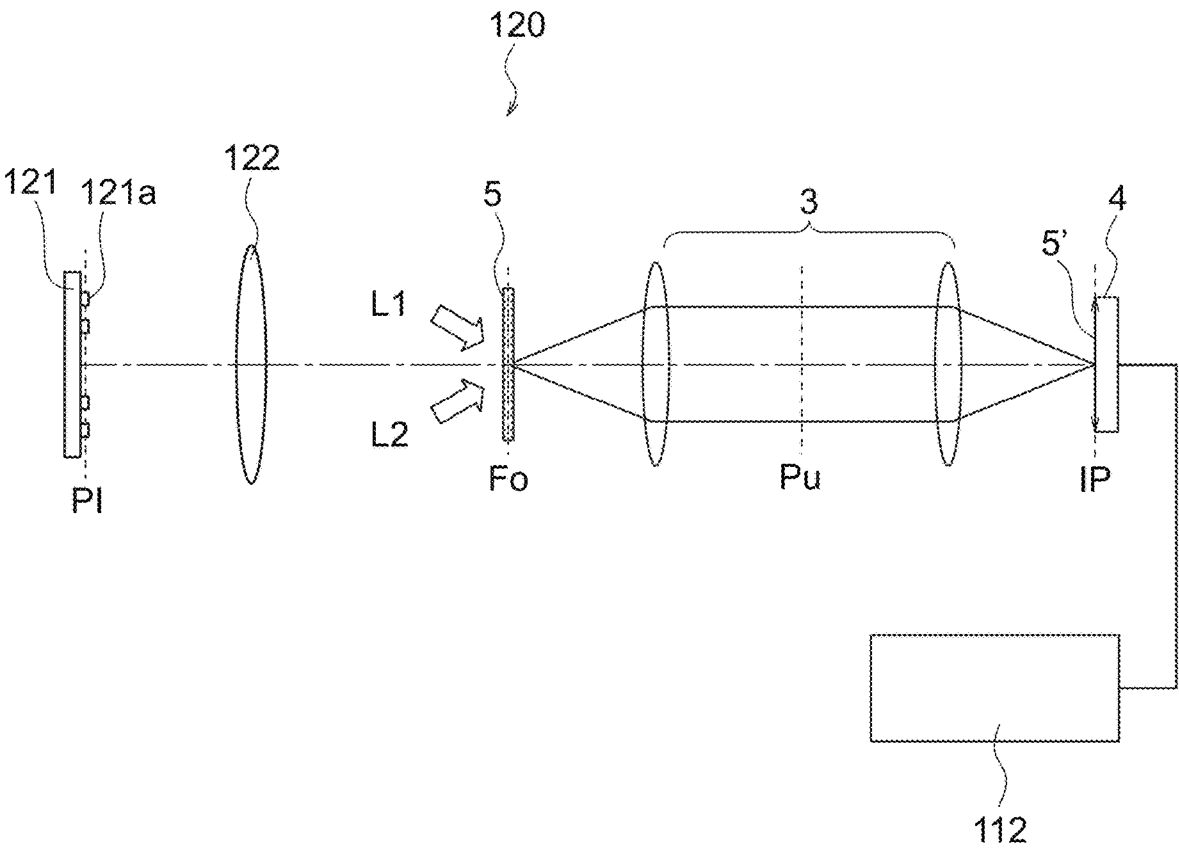
FIG. 16 is a diagram illustrating a microscope system of the present embodiment.

FIG. 16 is a diagram illustrating a microscope system of the present embodiment. The same configurations as in FIG. 12 are denoted by the same numerals and will not be further elaborated.

A microscope system 120 includes an incoherent light source 121, an illumination optical system 122, a detection optical system 3, and an imager 4.

In the microscope system 120, each of a plurality of light beams is emitted from a corresponding one of a plurality of regions on a predetermined plane. The regions are independent of each other. The predetermined plane is a plane orthogonal to the optical axis of the detection optical system 3 and at a position opposite the detection optical system 3 with respect to a sample 5. In the microscope system 120, the pupil plane PI of the illumination optical system 122 is the predetermined plane.

The incoherent light source 121 is disposed on the predetermined plane. In the microscope system 120, the incoherent light source 121 is disposed on the pupil plane PI.

The incoherent light source 121 has a plurality of independent light-emitting regions **121*a*. The light-emitting regions 121*a*** are independent of each other.

The light-emitting regions **121*a* are each a region that emits light. Light is emitted from a light-emitting region 121*a* whereby a light beam L1 irradiates the sample 5. Light is emitted from another light-emitting region 121*a* whereby a light beam L2 irradiates the sample 5**.

The light-emitting regions **121*a* are each a region of light in the pupil plane PI. Each of the light-emitting regions 121*a*** corresponds to one of the second regions.

When the transmission regions 112 illustrated in FIG. 15 are considered as the light-emitting regions **121*a*, it is possible to consider FIG. 15 as a diagram illustrating an incoherent light source. Further, it is possible to consider FIGS. 3 to 11** as specific examples of the incoherent light source. Thus, the effects achieved by the aperture members in the first to ninth examples are also achieved when the incoherent light source is used.

It is preferable that the microscope system of the present embodiment further include a processor. The processor obtains a wavefront passing through an estimation sample modeling the sample, by feedforward operation for each of the light beams, calculates an intensity distribution at an imaging position of the detection optical system corresponding to the wavefront, for each of the light beams, generates a computational image by summing the intensity distributions of the light beams, and reconstructs the estimation sample by performing an optimization process to reduce a difference between the computational image and a measurement image output from the imager.

The microscope system of the present embodiment includes a processor. By including a processor, it is possible to reconstruct the estimation sample in the microscope system of the present embodiment. In reconstruction of the estimation sample, for example, the refractive index distribution of the sample is estimated.

In reconstruction of the estimation sample, a wavefront passing through the estimation sample modeling the sample is obtained by feedforward operation for each of the light beams. An intensity distribution at an imaging position of the detection optical system corresponding to the wavefront is calculated for each of the light beams. A computational image is generated by summing the intensity distributions of the light beams. An optimization process is performed to reduce the difference between the computational image and a measurement image output from the imager.

The reconstruction of the estimation sample will now be described.

In the microscope system 110 illustrated in FIG. 14, the sample 5 is located between the illumination optical system 91 and the detection optical system 3. In the microscope system 120 illustrated in FIG. 16, the sample 5 is located between the illumination optical system 122 and the detection optical system 3. The illumination optical system and the detection optical system form a measurement optical system.

Light beams are incident on the sample 5 from a plurality of directions simultaneously. The sample 5 is illuminated by rays of light incident simultaneously from a plurality of directions. In the microscope system of the embodiment, the illumination by each light beam is coherent illumination.

The optical image 5' of the sample 5 is formed by the detection optical system 3. By picking up the optical image 5' with the imager 4, it is possible to obtain the photographic image $I_{mea}(r)$ illustrated in FIG. 1B.

The photographic image $I_{mea}(r)$ is input to the processor. In the processor, reconstruction of the estimation sample is performed using the photographic image $I_{mea}(r)$. In the reconstruction, simulation is performed.

In a first simulation, the sample is a thin sample. In a second simulation, the sample is a thick sample.

The first simulation will be described. The optical system used in the first simulation is the measurement optical system in the microscope system 110 illustrated in FIG. 14.

As illustrated in FIG. 14, the sample 5 is a thin sample. The focus position Fo of the detection optical system 3 is located inside the sample 5. For example, the distance between the focus position Fo and a surface 5*a* of the sample 5 is Δz1.

Since the sample 5 is a thin sample, one photographic image is acquired. Thus, the detection optical system 3 and the imager 4 do not move in the optical axis direction. Further, the sample 5 also does not move in the optical axis direction.

Figure 17:
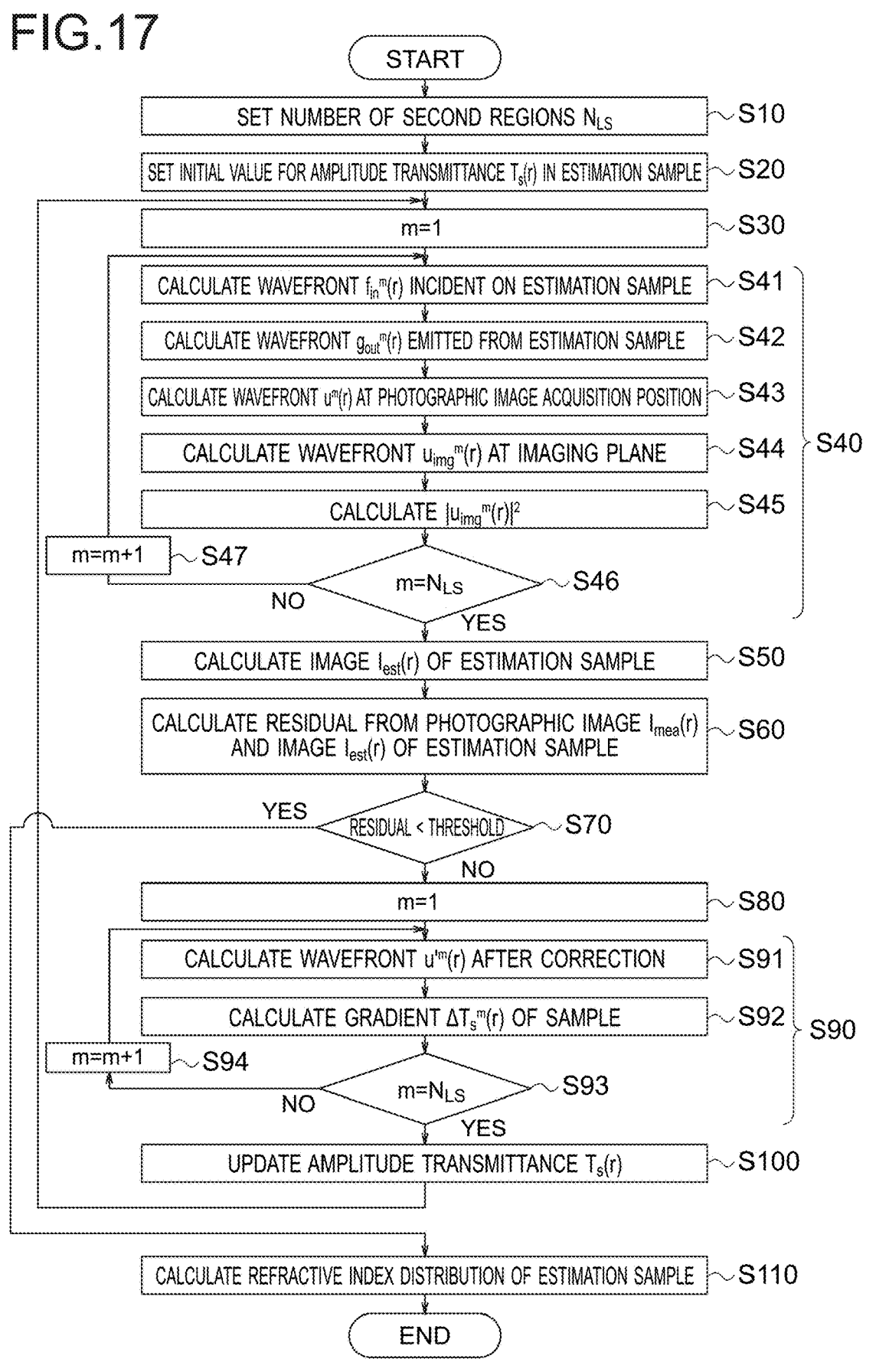

FIG. 17 is a flowchart of the first simulation. Before the description of the flowchart, the estimation sample and wavefronts will be described.

Figure 18:
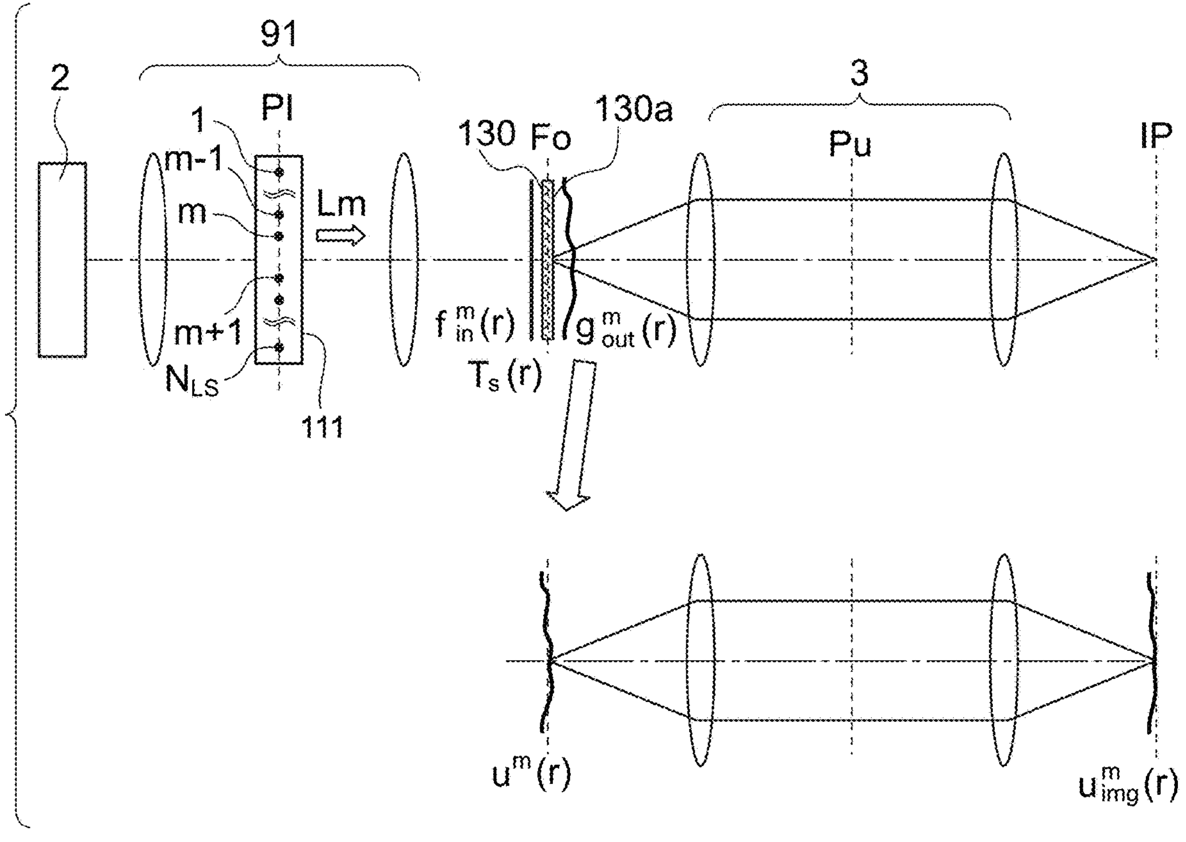
FIG. 18 is a diagram illustrating an optical system used in the simulation.

FIG. 18 is a diagram illustrating an optical system used in the simulation. The optical system used in the simulation is the same as the measurement optical system that acquires the photographic image $I_{mea}(r)$. In the simulation, an estimation sample 130 is used instead of the sample 5.

FIG. 18 illustrates the estimation sample 130, a wavefront $f_{in}^{m}(r)$, an amplitude transmittance $T_s(r)$, a wavefront $g_{out}^{m}(r)$, a wavefront $u^{m}(r)$ at a photographic image acquisition position, and a wavefront $u_{img}^{m}(r)$ at an imaging plane.

In the microscope system 110, the aperture member 111 is disposed on the pupil plane PI. The second regions are the transmission regions of the aperture member 111. Since light is emitted from the transmission regions, it is possible to consider the second regions as light sources.

In FIG. 18, the first light source to the $N_{LS}$-th second region are illustrated. It is possible to dispose the second regions at the pupil position of the illumination optical system 91.

Returning to FIG. 17, the simulation will be described. The simulation includes the steps of estimating an estimation sample, calculating an image of the estimation sample, optimizing the refractive index distribution of the estimation sample, updating the estimation sample, and reconstructing and outputting the structure of the estimation sample.

At step S10, the number of second regions $N_{LS}$ is set. In the microscope system 110, the transmission regions of the aperture member are located on the pupil plane of the illumination optical system. The transmission regions are the second regions. Thus, at step S10, the number of transmission regions is set for $N_{LS}$.

Step S20 is the step of estimating an estimation sample. For the sample 5, one photographic image has been acquired. Since the estimation sample 130 is a thin sample, it is possible to consider the estimation sample 130 as one thin layer. Thus, an initial value of the amplitude transmittance is set once.

At step S20, an initial value is set for the amplitude transmittance $T_s(r)$ in the estimation sample 130.

In order to calculate an image of the estimation sample 130, information on the estimation sample 130, for example, the refractive index distribution, is necessary. The estimation sample 130 is a sample modeling the sample 5. Thus, it is desirable if it can be possible to use the refractive index distribution of the sample 5 for the refractive index distribution of the estimation sample 130.

However, an accurate refractive index distribution of the sample 5 is unable to be obtained from the photographic image $I_{mea}(r)$. Thus, the refractive index distribution of the estimation sample 130 has to be estimated.

As indicated by Expression (10), it is possible to convert the refractive index distribution $n_s(r)$ of the estimation sample 130 into the amplitude transmittance $T_s(r)$. Thus, at step S20, an initial value of the amplitude transmittance $T_s(r)$ in the estimation sample 130 is set.

$$T_s(r)=\exp(ik_0 dn(r)dz) \tag{10}$$

$$dn(r)=n_s(r)-n_0$$

where $k_0$ is 2π/λ for the wavelength λ of illumination light, $n_0$ is the refractive index of a medium, and dz is the thickness of the sample.

When it is possible to estimate the value of the amplitude transmittance $T_s(r)$ from the photographic image $I_{mea}(r)$, the estimated value may be used as the initial value. When it is possible to estimate the value of the amplitude transmittance $T_s(r)$ by other methods, it is possible to set the estimated value as the initial value. When the initial value is unable to be estimated, for example, $T_s(r)=1$ is set.

At step S30, the value of a variable m is initialized. Steps S41, S42, S43, S44, and S45 described later are executed for all of the light sources. The variable m represents the number of times these steps are executed.

Steps S40 and S50 are the steps of calculating an image of the estimation sample. The number of images of the estimation sample is equal to the number of photographic images. Since the number of photographic images is one, the number of images of the estimation sample is also one.

Step S40 includes steps S41, S42, S43, S44, S45, S46, and S47.

At step S41, the wavefront $f_{in}^{m}(r)$ incident on the estimation sample 130 is calculated. $f_{in}^{m}(r)$ represents the wavefront of light emitted from the first light source to the $N_{LS}$-th light source.

In the pupil of the illumination optical system, when it is assumed that a first wavefront where the first light source to the $N_{LS}$-th light source are located is the wavefront emitted from each light source, the wavefront $f_{in}^{m}(r)$ represents the first wavefront.

As described above, it is possible to consider each of the second regions as a point light source. In FIG. 18, illumination light Lm is emitted from the m-th light source. The illumination light Lm is incident on the estimation sample 130.

In this case, the wavefront $f_{in}^{m}(r)$ is represented by Expressions (11) and (12).

$$f_{in}^{m}(r) = \exp(-iku_m \cdot r) \tag{11}$$

$$u_m = (\sin\theta_{x,m}, \sin\theta_{y,m}) \tag{12}$$

where k is $2\pi n_0/r$, $n_0$ is the refractive index of a medium, and $\theta_{x,m}$ and $\theta_{y,m}$ are the angles of incidence on the estimation sample.

At step S42, the wavefront $g_{out}^{m}(r)$ emitted from the estimation sample 130 is calculated. In a case of a thin sample, the wavefront $g_{out}^{m}(r)$ is represented by Expression (13).

$$g_{out}^{m}(r) = T_s(r) f_{in}^{m}(r) \tag{13}$$

where $T_s(r)$ is the amplitude transmittance of the estimation sample.

The wavefront $g_{out}^{m}(r)$ is a wavefront after the wavefront $f_{in}^{m}(r)$ passes through the estimation sample 130. Since the wavefront $f_{in}^{m}(r)$ represents the first wavefront, the wavefront $g_{out}^{m}(r)$ represents a second wavefront.

Since the estimation sample 130 is a thin sample, it is possible to directly calculate the wavefront $g_{out}^{m}(r)$ from the wavefront $f_{in}^{m}(r)$, as indicated by Expression (13).

At step S43, the wavefront $u^{m}(r)$ at a photographic image acquisition position is calculated. The photographic image acquisition position is the focus position Fo of the detection optical system 3 on the sample side when the photographic image is acquired.

The wavefront $u^{m}(r)$ is represented by Expression (14).

$$u^{m} = F_{2D}^{-1}\left[F_{2D}[g_{out}^{m}(r)]\exp\left(-2\pi i \times \Delta z1\sqrt{1/\lambda^2 - |u|^2}\right)\right] \tag{14}$$

where $\Delta z1$ is the distance from a surface of the estimation sample to the photographic image acquisition position, $\lambda$ is a wavelength, u is the two-dimensional notation of pupil plane coordinates $(\xi, \eta)$, $F_{2D}$ is a two-dimensional Fourier transform, and $F_{2D}^{-1}$ is a two-dimensional Fourier inverse transform.

At step S60 described later, a residual is calculated. The photographic image and the image of the estimation sample are used in calculation of the residual. In order to calculate the image of the estimation sample, it is necessary to obtain the wavefront at the photographic image acquisition position.

As described above, the distance between the focus position Fo and the surface 5*a* is $\Delta z1$. Assuming that the sign of the distance measured toward the direction of travel of light is positive, the photographic image acquisition position is a position $-\Delta z1$ away from the surface 5*a*.

Thus, in the optical system used in the simulation, the photographic image acquisition position is a position $-\Delta z1$ away from the surface 130*a* of the estimation sample 130. In this case, the wavefront at the photographic image acquisition position is a wavefront at a position $-\Delta z1$ away from the surface 130*a*.

The wavefront $u^{m}(r)$ in Expression (14) is a wavefront in which the wavefront $g_{out}^{m}(r)$ propagates by $\Delta z1$ in the direction opposite to the direction of travel of light. This wavefront is a wavefront at a position $-\Delta z1$ away from the surface 130*a*. Thus, the wavefront $u^{m}(r)$ in Expression (14) represents a wavefront at the photographic image acquisition position.

Strictly speaking, the photographic image acquisition position and the position of the surface 5*a* are different. However, since the sample 5 is a thin sample, the value of $\Delta z1$ is extremely small. Therefore, it is possible to consider that the photographic image acquisition position and the position of the surface 5*a* are substantially the same.

The estimation sample 130 is also a thin sample. Therefore, it is possible to consider that the position of the surface 130*a* and the position $-\Delta z1$ away from the surface 130*a* are substantially the same. In other words, it is possible to consider that the position of the wavefront $g_{out}^{m}(r)$ and the position of the wavefront $u^{m}(r)$ are substantially the same. In this case, it is possible to use the wavefront $g_{out}^{m}(r)$ instead of the wavefront $u^{m}(r)$.

At step S44, the wavefront $u_{img}^{m}(r)$ at the imaging plane is calculated. The wavefront $u^{m}(r)$ is propagated to the imaging plane IP. At that time, it passes through the detection optical system 3. The detection optical system 3 forms a Fourier optical system. Thus, as indicated by Expression (15), it is possible to calculate the wavefront $u_{img}^{m}(r)$ at the imaging plane IP using the wavefront $u^{m}(r)$ and the pupil function P(u) of the detection optical system.

$$u_{img}^{m}(r) = F_{2D}^{-1}[F_{2D}\{u^{m}(r)\} \times P(u)] \tag{15}$$

At step S45, the wavefront $u_{img}^{m}(r)$ is squared. The wavefront $u_{img}^{m}(r)$ represents the amplitude of light. Thus, the light intensity is calculated by squaring the wavefront $u_{img}^{m}(r)$.

$|u_{img}^{m}(r)|^2$ represents the light intensity distribution at the imaging plane IP. Assuming that a first intensity distribution is the light intensity distribution at the imaging position of the detection optical system, $|u_{img}{}^m(r)|^2$ represents the first light intensity distribution at the imaging position of the detection optical system.

The wavefront $f_{in}{}^m(r)$, the wavefront $g_{out}{}^m(r)$, the wavefront $u^m(r)$, and the wavefront $u_{img}{}^m(r)$ represent the wavefronts generated by illumination light emitted from the m-th light source, that is, illumination light emitted from one light source.

An image $I_{est}(r)$ of the estimation sample is generated by illumination light emitted from all of the light sources. Thus, the wavefront $f_{in}{}^m(r)$, the wavefront $g_{out}{}^m(r)$, the wavefront $u^m(r)$, and the wavefront $u_{img}{}^m(r)$ need to be obtained for all of the light sources.

At step S46, it is determined whether the value of the variable m matches the number of second regions $N_{LS}$. If the determination result is NO, step S47 is executed. If the determination result is YES, step S50 is executed.

(If the determination result is NO: $m \neq N_{LS}$)

If the determination result is NO, 1 is added to the value of the variable m at step S47. When step S47 is finished, the process returns to step S41.

At step S47, the value of the variable m is increased by one. Therefore, for another light source, the wavefront $f_{in}{}^m(r)$ is calculated at step S41, the wavefront $g_{out}{}^m(r)$ is calculated at step S42, the wavefront $u^m(r)$ is calculated at step S43, the wavefront $u_{img}{}^m(r)$ is calculated at step S44, and $|u_{img}{}^m(r)|^2$ is calculated at step S45.

Steps S41, S42, S43, S44, and S45 are repeatedly performed until $|u_{img}{}^m(r)|^2$ is obtained for all of the light sources.

(If the determination result is YES: $m=N_{LS}$)

If the determination result is YES, the summation of $|u_{img}{}^m(r)|^2$ is performed at step S50. As a result, the image $I_{est}(r)$ of the estimation sample is calculated. The image $I_{est}(r)$ of the estimation sample is represented by Expression (16).

$$I_{est}(r) = \sum_m |u^m_{img}(r)|^2 \tag{16}$$

Figure 19:
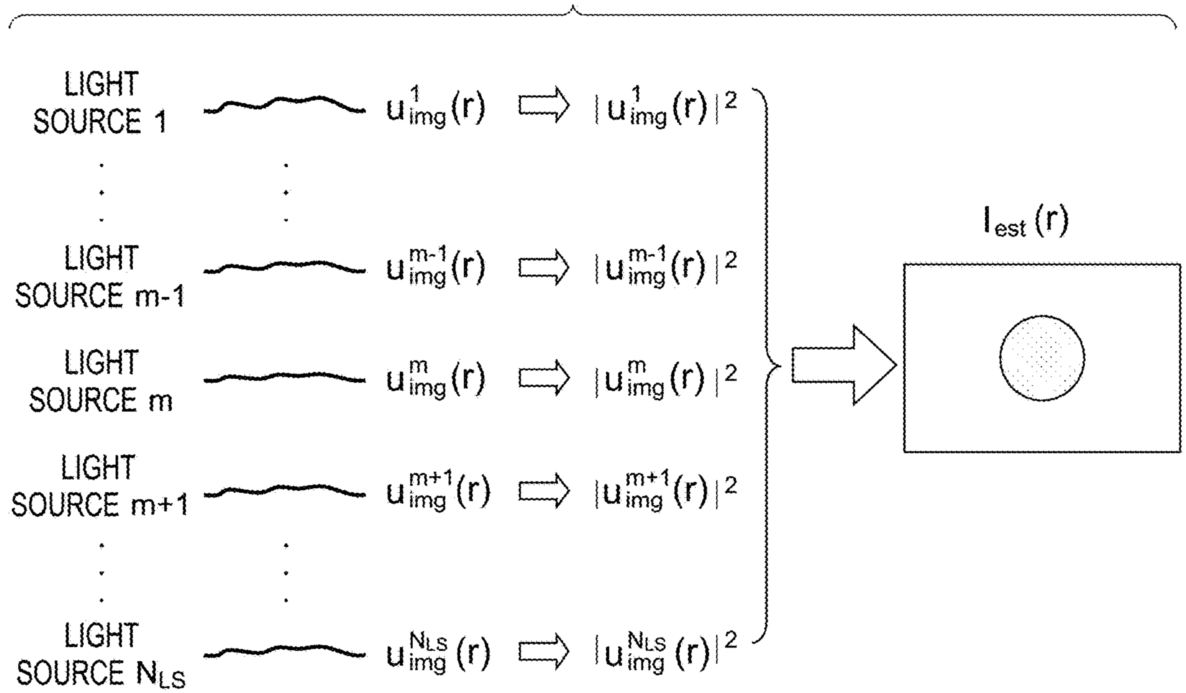
FIG. 19 is a diagram illustrating an image of an estimation sample.

FIG. 19 is a diagram illustrating the image of the estimation sample. The image $I_{est}(r)$ of the estimation sample is an image when the wavefront $u_{img}{}^m(r)$ is obtained for all of the light sources. As illustrated in FIG. 19, the wavefront $u_{img}{}^m(r)$ is calculated for each light source, $|u_{img}{}^m(r)|^2$ is calculated from the wavefront $u_{img}{}^m(r)$, and all of $|u_{img}{}^m(r)|^2$ are summed. As a result, the image $I_{est}(r)$ of the estimation sample is calculated.

At step S60, a residual is calculated. The residual is represented by Expression (17). As indicated by Expression (17), the residual is calculated from the photographic image $I_{mea}(r)$ and the image $I_{est}(r)$ of the estimation sample.

$$\sum_r \|I_{mea}(r) - I_{est}(r)\|^2_{l2} \tag{17}$$

Expression (17) represents a matrix norm. The norm is represented by Expression (18).

$$\|(x)\|^2_{l2} = \|(x_1, x_2, \ldots , x_N)\|^2_{l2} = x_1^2 + x_2^2 \cdots + x_N^2 \tag{18}$$

At step S70, the residual is compared with a threshold. If the determination result is NO, step S80 is executed. If the determination result is YES, step S110 is executed.

(If the determination result is NO: residual≥threshold)

At step S80, the value of a variable m is initialized. Steps S91 and S92 described later are executed for all of the light sources. The variable m represents the number of times these steps are executed.

Step S90 is the step of optimizing the refractive index distribution of the estimation sample.

Step S90 includes steps S91, S92, S93, and S94.

At step S91, a wavefront $u'^m(r)$ is calculated. In calculation of the wavefront $u'^m(r)$, the photographic image $I_{mea}(r)$ and the image $I_{est}(r)$ of the estimation sample are used. Further, the wavefront $u'^m(r)$ is the wavefront at the photographic image acquisition position.

The wavefront $u'^m(r)$ is represented by Expression (19).

$$u'^m(r) = u^m(r)\sqrt{\frac{I_{mea}(r)}{I_{est}(r)}} \tag{19}$$

Figure 20A:
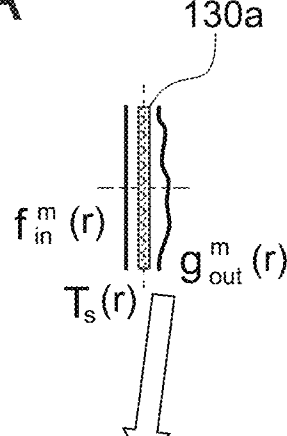
FIGS. 20A to 20D are diagrams illustrating correction of wavefronts.
Figure 20B:
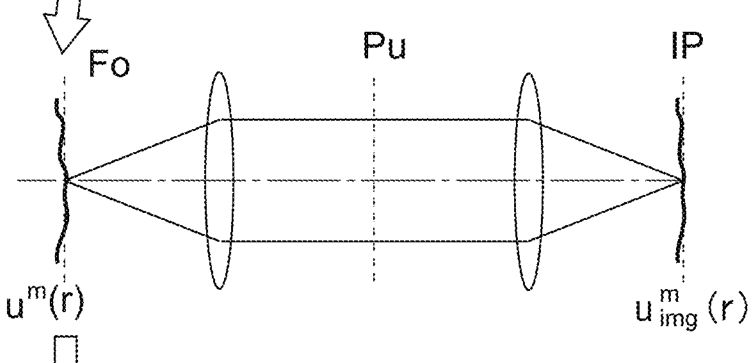
Figure 20C:
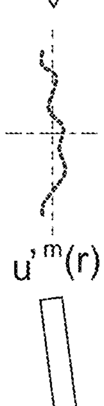
Figure 20D:
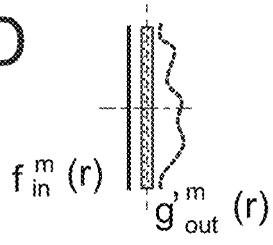

FIGS. 20A to 20D are diagrams illustrating correction of wavefronts. FIG. 20A is a diagram illustrating the wavefront before correction emitted from the estimation sample. FIG. 20B is a diagram illustrating the wavefront before correction at the photographic image acquisition position. FIG. 20C is a diagram illustrating the wavefront after correction at the photographic image acquisition position. FIG. 20D is a diagram illustrating the wavefront after correction emitted from the estimation sample.

As illustrated in FIG. 19, the image $I_{est}(r)$ of the estimation sample is calculated based on the wavefront $u_{img}{}^m(r)$. As illustrated in FIG. 19 and FIG. 20B, the wavefront $u_{img}{}^m(r)$ is calculated based on the wavefront $u^m(r)$.

As illustrated in FIG. 20A, the amplitude transmittance $T_s(r)$ is used in calculation of the wavefront $u^m(r)$. The amplitude transmittance $T_s(r)$ is the estimated amplitude transmittance. When step S90 is executed for the first time, this amplitude transmittance $T_s(r)$ is different from the amplitude transmittance of the sample 5.

As the difference between the amplitude transmittance $T_s(r)$ and the amplitude transmittance of the sample 5 increases, the difference between the image $I_{est}(r)$ of the estimation sample and the photographic image $I_{mea}(r)$ also increases. Thus, it is possible to consider that the difference between the image $I_{est}(r)$ of the estimation sample and the photographic image $I_{mea}(r)$ reflects the difference between the amplitude transmittance $T_s(r)$ and the amplitude transmittance of the sample 5.

Then, as indicated by Expression (11), the wavefront $u^m(r)$ is corrected using the image $I_{est}(r)$ of the estimation sample and the photographic image $I_{mea}(r)$. As a result, as illustrated in FIG. 20C, the wavefront after correction, that is, the wavefront $u'^m(r)$ can be obtained.

By using the wavefront $u'^m(r)$, it is possible to calculate a new amplitude transmittance $T_s(r)$. The wavefront $u'^m(r)$ is different from the wavefront $u^m(r)$ Thus, the new amplitude transmittance $T_s(r)$ is different from the amplitude transmittance when the wavefront $u^m(r)$ is calculated.

In this way, it is possible to calculate the amplitude transmittance $T_s(r)$ using the wavefront $u'^m(r)$. However, as illustrated in FIG. 20A, the wavefront $g_{out}{}^m(r)$ is necessary in calculation of the amplitude transmittance $T_s(r)$.

As illustrated in FIGS. 20A and 20C, the position of the wavefront $u'^m(r)$ is different from the position of the wavefront $g_{out}{}^m(r)$. Thus, in order to calculate the amplitude transmittance $T_s(r)$, as illustrated in FIG. 20D, the wavefront $g'_{out}{}^m(r)$ is necessary.

The wavefront $g_{out}{}^m(r)$ is represented by Expression (20). Since the wavefront $u'''^m(r)$ is the wavefront after correction, the wavefront $g'_{out}{}^m(r)$ is also the wavefront after correction.

$$g'^m_{out}(r) = F^{-1}_{2D}\left[F_{2D}[u'^m_1(r)]\exp\left(-2\pi i \times \Delta z1\sqrt{1/\lambda^2 - |u|^2}\right)\right] \tag{20}$$

As described above, the photographic image acquisition position is a position $-\Delta z1$ away from the surface 130*a*. In other words, the position of the surface 130*a* is a position $\Delta z1$ away from the photographic image acquisition position. Thus, the wavefront at the position of the surface 130*a* is the wavefront at a position $\Delta z1$ away from the photographic image acquisition position.

The wavefront $g'_{out}{}^m(r)$ in Expression (20) is a wavefront in which the wavefront $u'''^m(r)$ propagates by $\Delta z1$ in the direction of travel of light. This wavefront is the wavefront at a position $\Delta z1$ away from the photographic image acquisition position. Thus, the wavefront $g'_{out}{}^m(r)$ in Expression (20) represents the wavefront at the position of the surface 130*a*.

The wavefront at the position of the surface 130*a* is a wavefront after $f_{in}{}^m(r)$ passes through the estimation sample 130. As described above, $f_{in}{}^m(r)$ represents the first wavefront. Assuming that the second wavefront is a wavefront after the first wavefront passes through the estimation sample, the wavefront $g'_{out}{}^m(r)$ represents the second wavefront.

As described above, the value of $\Delta z1$ is extremely small. Further, the estimation sample 130 is a thin sample. Therefore, it is possible to consider that the photographic image acquisition position and the position $\Delta z1$ away from the photographic image acquisition position are substantially the same. In other words, it is possible to consider that the position of the wavefront $u'''^m(r)$ and the position of the wavefront $g_{out}{}^m(r)$ are substantially the same. In this case, it is also possible to use the wavefront $u'''^m(r)$ instead of the wavefront $g'_{out}{}^m(r)$.

At step S92, a gradient $\Delta T_s{}^m(r)$ of the sample is calculated. The gradient $\Delta T_s{}^m$ of the sample is represented by Expression (21). It is possible to use, for example, gradient descent to calculate the gradient $\Delta T_s{}^m(r)$ of the sample.

$$\Delta T^m_s(r) = \frac{|f^m_{in}(r)| f^{*m}_{in}(r)(g'^m_{out}(r) - g^m_{out}(r))}{|T_s(r)|_{max}\left(|T_s(r)|^2 + \delta\right)} \tag{21}$$

where $f^*$ is the complex conjugate of f, and $\delta$ is a normalization constant to prevent division by zero.

As illustrated in FIG. 20A, the amplitude transmittance $T_s(r)$ is used in calculation of the wavefront $g_{out}{}^m(r)$. The amplitude transmittance $T_s$ (r) is the estimated amplitude transmittance. Thus, this amplitude transmittance $T_s(r)$ is different from the amplitude transmittance of the sample 5.

As the difference between the amplitude transmittance $T_s$ (r) and the amplitude transmittance of the sample 5 increases, the difference between the wavefront $g_{out}{}^m(r)$ and the wavefront $g'_{out}{}^m(r)$ also increases. Thus, it is possible to consider that the difference between the wavefront $g_{out}{}^m(r)$ and the wavefront $g'_{out}{}^m(r)$ reflects the difference between the amplitude transmittance $T_s(r)$ and the amplitude transmittance of the sample 5.

The wavefront $f_{in}{}^m(r)$, the amplitude transmittance $T_s(r)$, the wavefront $g_{out}{}^m(r)$, and the wavefront $g'_{out}{}^m(r)$ are known. Then, as indicated by Expression (21), it is possible to calculate the gradient $\Delta T_s{}^m(r)$ of the sample, using the wavefront $f_{in}{}^m(r)$, the amplitude transmittance $T_s(r)$, the wavefront $g_{out}{}^m(r)$, and the wavefront $g'_{out}{}^m(r)$.

Figure 21:
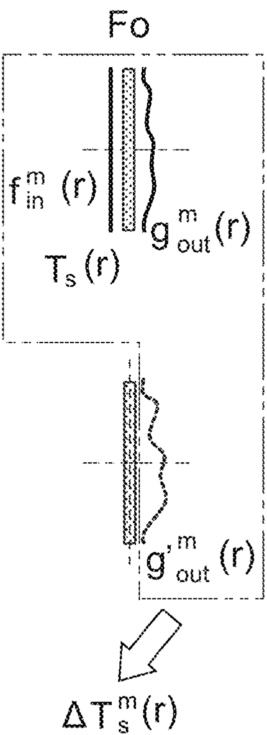
FIG. 21 is a diagram illustrating the gradient of a sample.

FIG. 21 is a diagram illustrating the gradient of the sample.

The gradient $\Delta T_s{}^m(r)$ of the sample obtained at step S92 represents the gradient of the sample in illumination light emitted from one light source. The gradient $\Delta T_s{}^m(r)$ of the sample is determined by illumination light emitted from all of the light sources. Thus, the gradient $\Delta T_s{}^m(r)$ of the sample needs to be obtained for all of the light sources.

At step S93, it is determined whether the value of the variable m matches the number of light sources $N_{LS}$. If the determination result is NO, step S94 is executed. If the determination result is YES, step S100 is executed.

(If the determination result is NO: $m \neq N_{LS}$)

If the determination result is NO, 1 is added to the value of the variable m at step S94. When step S94 is finished, the process returns to step S91.

At step S94, the value of the variable m is increased by one. Therefore, for another light source, the wavefront $u'''^m(r)$ is calculated at step S91 and the gradient $\Delta T_s{}^m(r)$ of the sample is calculated at step S92.

Steps S91 and S92 are repeatedly performed until the gradient $\Delta T_s{}^m(r)$ of the sample is obtained for all of the light sources.

Figure 22:
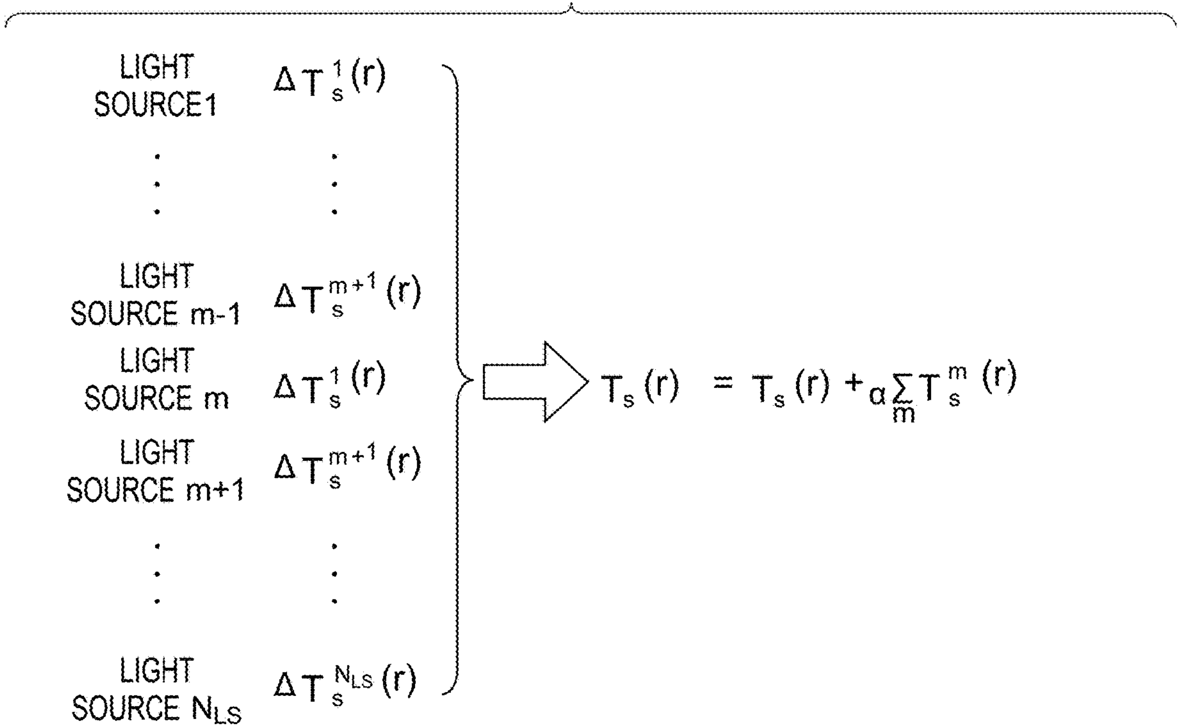
FIG. 22 is a diagram illustrating the gradient of a sample.

FIG. 22 is a diagram illustrating the gradient of the sample. In FIG. 22, the gradient $\Delta T_s{}^m(r)$ of the sample is obtained for all of the light sources.

(If the determination result is YES: $m = N_{LS}$)

If the determination result is YES, the amplitude transmittance $T_s(r)$ is updated at step S100. Step S100 is the step of updating the estimation sample.

The updated amplitude transmittance $T_s(r)$ is represented by Expression (22).

$$T_s(r) = T_s(r) + \alpha\sum_m T^m_s(r) \tag{22}$$

where $\alpha$ is a correction coefficient for the gradient of the sample.

Furthermore, when the sample 5 is considered as a perfect phase object without absorption, it is possible to further update the amplitude transmittance $T_s(r)$ using Expression (23).

$$T_s(r) = \frac{T_s(r)}{|T_s(r)|} \tag{23}$$

When step S100 is finished, the process returns to step S30. With the updated amplitude transmittance $T_s(r)$, steps S30 to S100 are executed.

Steps S30 to S100 are repeatedly executed, whereby the updated amplitude transmittance $T_s(r)$ gradually approaches the amplitude transmittance of the sample 5. In other words, the residual becomes smaller. Eventually, the residual becomes smaller than the threshold.

(If the determination result is YES: residual<threshold)

At step 110, the refractive index distribution of the estimation sample is calculated. The obtained amplitude transmittance $T_s(r)$ is the same or substantially the same as the amplitude transmittance of the sample 5. The refractive index distribution n(r) is found from the obtained amplitude transmittance $T_s(r)$ and Expression (1).

By using the refractive index distribution n(r) obtained at step S110, it is possible to reconstruct the structure of the estimation sample. It is possible to output the reconstructed structure of the estimation sample, for example, to a display device. The estimation sample 130 is a thin sample. In the first simulation, it is possible to reconstruct the structure of a thin sample.

As described above, the amplitude transmittance $T_s(r)$ obtained at step S110 is the same or substantially the same as the amplitude transmittance of the sample 5. In this case, it is possible to consider that the refractive index distribution n(r) is also the same or substantially the same as the refractive index distribution of the sample 5. Thus, it is possible to consider that the reconstructed structure of the estimation sample 130 is the same or substantially the same as the structure of the sample 5.

In the first simulation, steps S40, S50, and S90 are repeatedly executed. As a result, the amplitude transmittance $T_s(r)$ is updated. As described above, steps S40 and S50 are the steps of calculating an image of the estimation sample. Step S90 is the step of optimizing the refractive index distribution of the estimation sample.

The amplitude transmittance $T_s(r)$ represents the estimation sample. Thus, the step of calculating an image of the estimation sample and the step of optimizing the refractive index distribution of the estimation sample are repeatedly executed to update the estimation sample.

The second simulation will be described. The optical system used in the second simulation is the measurement optical system in the microscope system 120 illustrated in FIG. 16.

Figure 23:
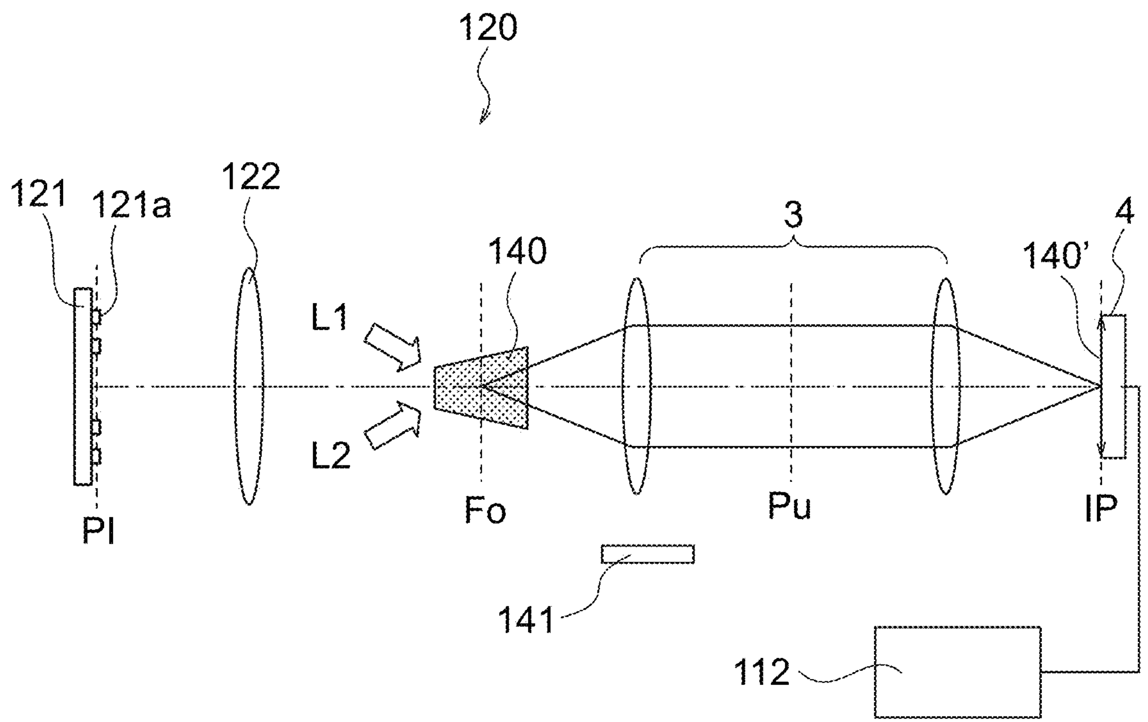
FIG. 23 is a diagram illustrating a microscope system of the present embodiment.

FIG. 23 is a diagram illustrating a microscope system of the present embodiment. The same configurations as that in FIG. 16 are denoted by the same numerals and will not be further elaborated.

A sample 140 is a thick sample. Light beams are incident on the sample 140 from a plurality of directions simultaneously. In FIG. 23, a light beam L1 and a light beam L2 are illustrated.

Light emitted from the sample 140 is collected by the detection optical system 3 onto an imaging plane IP. An optical image 140' is formed on the imaging plane IP. The optical image 140' is an optical image of the sample 140.

The microscope system 120 includes a movable stage 141. The movable stage 141 moves in the direction of an optical axis AX.

As described above, a photographic image is used in optimization of the refractive index distribution of the estimation sample. Since the sample 140 is a thick sample, a plurality of captured images are acquired. In order to acquire a plurality of captured images, the sample 140 is fixed and the focus position of the detection optical system 3 is moved by the movable stage 141.

The detection optical system 3 includes, for example, an infinity-corrected objective lens and an imaging lens. In this case, it is possible to move the focus position of the detection optical system 3 by moving the objective lens. The detection optical system 3 and the imager 4 may be fixed and the sample 140 may be moved.

A case where four captured images are acquired will be described below.

Figures 24A, 24B, 24C, 24D:
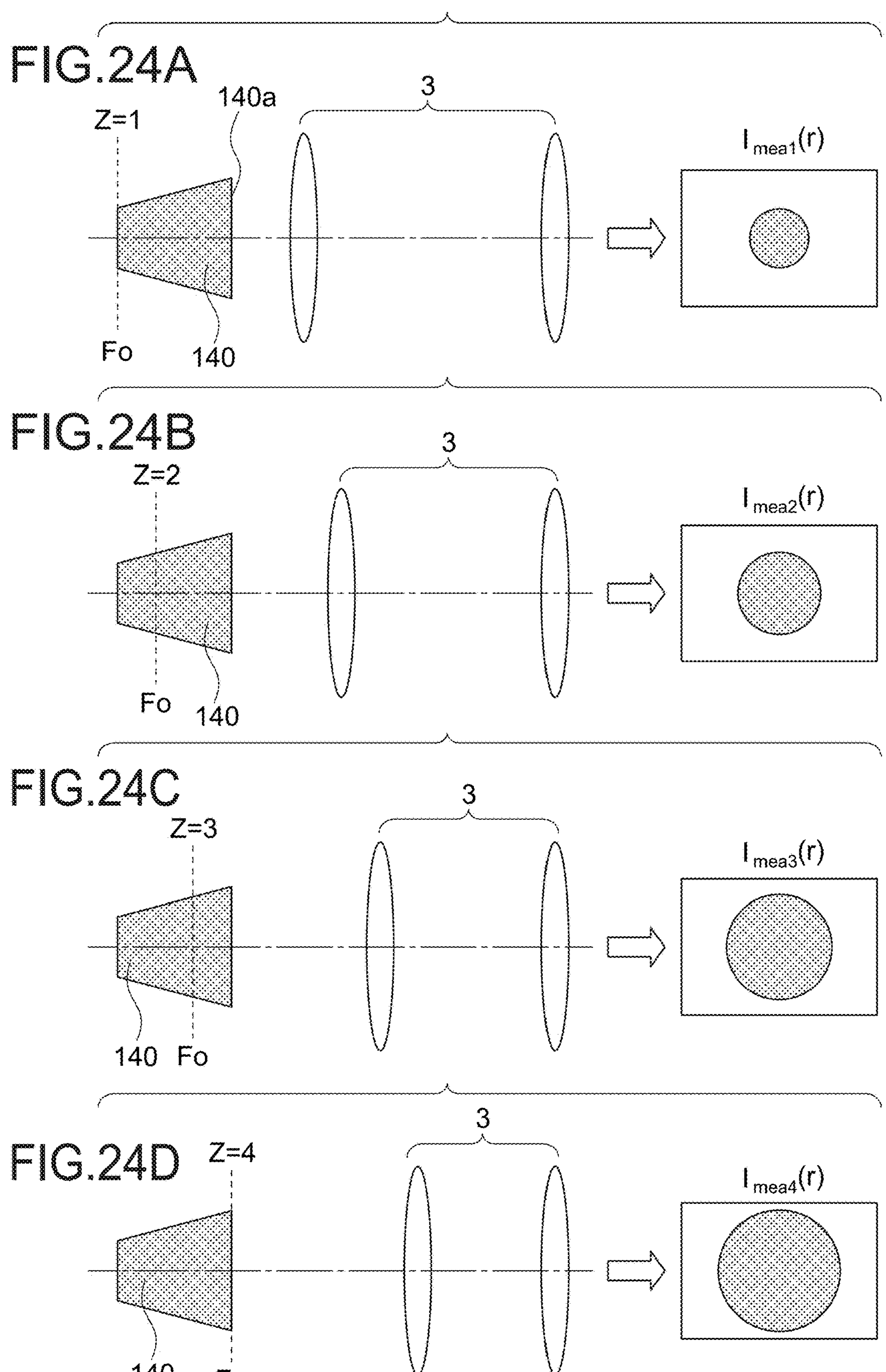
FIGS. 24A to 24D are diagrams illustrating photographic images.

FIGS. 24A to 24D are diagrams illustrating photographic images. FIG. 24A is a diagram illustrating a photographic image at a first position. FIG. 24B is a diagram illustrating a photographic image at a second position. FIG. 24C is a diagram illustrating a photographic image at a third position. FIG. 24D is a diagram illustrating a photographic image at a fourth position.

The focus position Fo relative to the sample 140 is changed by changing the distance between the detection optical system 3 and the sample 140. Here, the focus position Fo relative to the sample 140 is changed four times. As a result, the following four photographic images are acquired.

Photographic image $I_{mea1}(r)$ image at a distance of $3\times\Delta z$ from a surface 140*a*.

Photographic image $I_{mea2}(r)$: image at a distance of $2\times\Delta z$ from the surface 140*a*.

Photographic image $I_{mea3}(r)$ image at a distance of $\Delta z$ from the surface 140*a*.

Photographic Image $I_{mea4}(r)$ image at the surface 140*a*.

The photographic image $I_{mea1}(r)$, the photographic image $I_{mea2}(r)$, the photographic image $I_{mea3}(r)$, and the photographic image $I_{mea4}(r)$ are input to the processor. In the processor, reconstruction of the estimation sample is performed using the four photographic images. In the reconstruction, simulation is performed.

Figure 25:
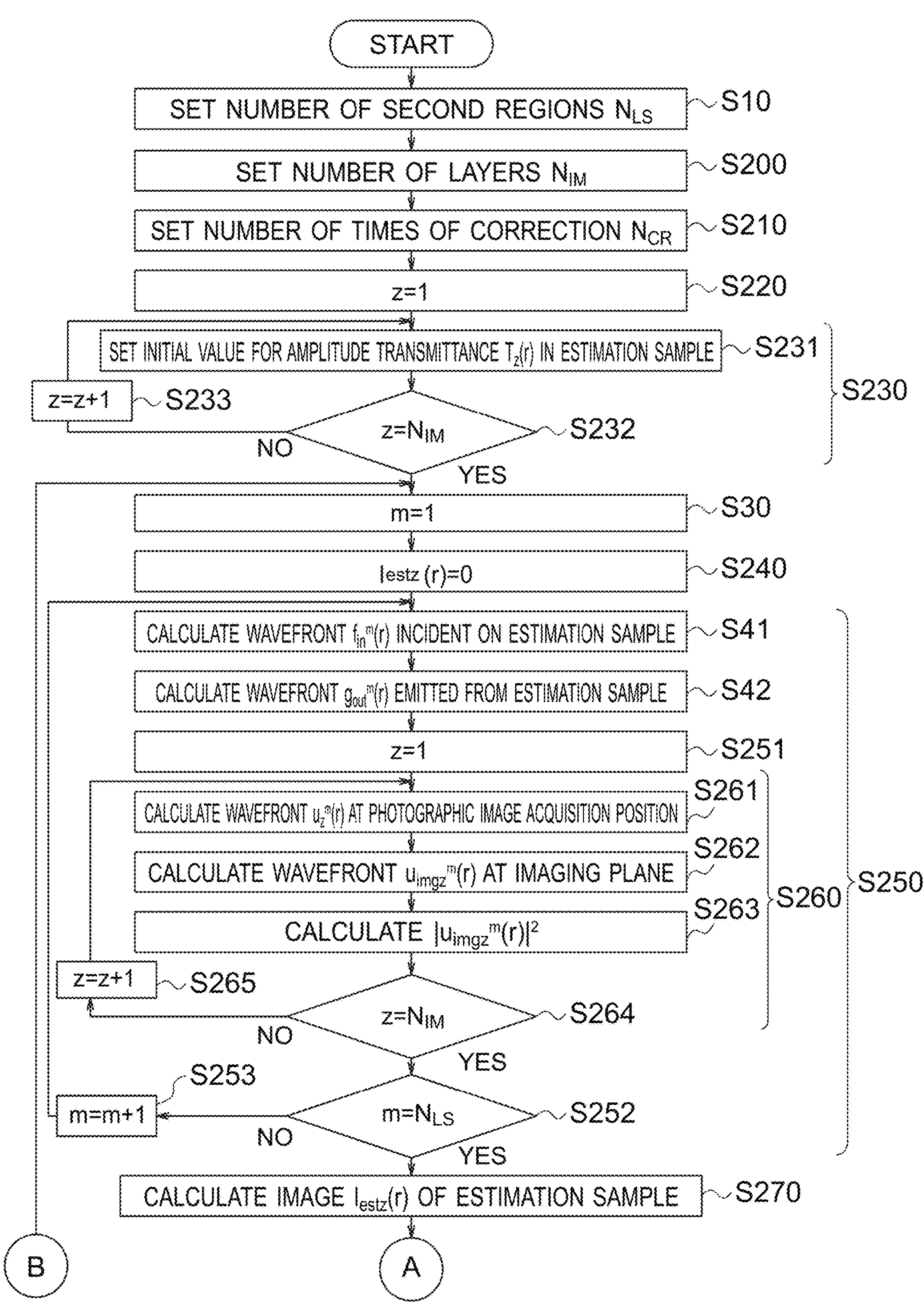
FIG. 25 is a flowchart of a second simulation.
Figure 26:
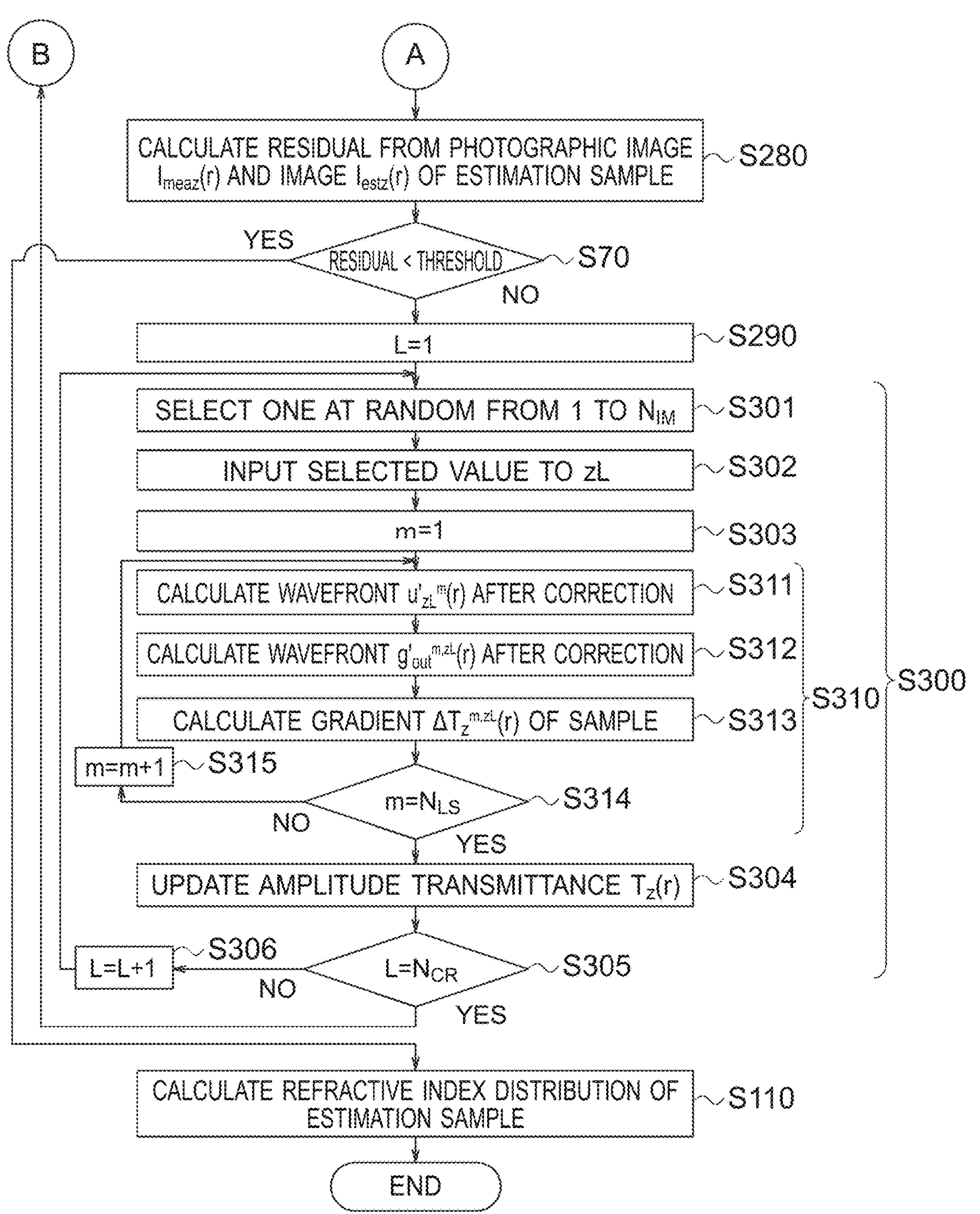
FIG. 26 is a flowchart of the second simulation.

FIGS. 25 and 26 are flowcharts of the second simulation. The same processing as the processing in the first flowchart is denoted by the same numeral and will not be further elaborated. Before the description of the flowchart, the estimation sample and wavefronts will be described.

Figure 27:
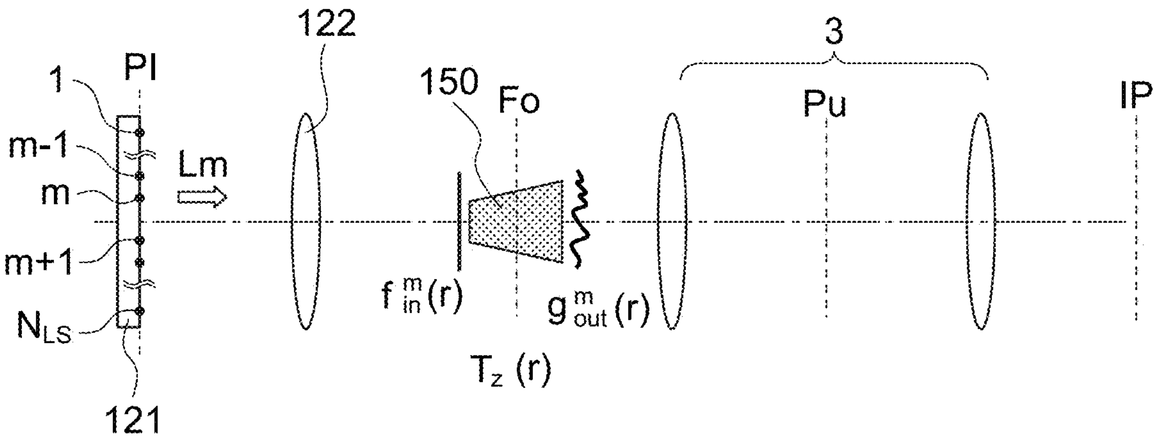
FIG. 27 is a diagram illustrating an optical system used in the simulation.

FIG. 27 is a diagram illustrating an optical system used in the simulation. The same configurations as in FIG. 16 are denoted by the same numerals and will not be further elaborated.

The optical system used in the simulation is the same as the measurement optical system that acquires the photographic image $I_{mea1}(r)$, the photographic image $I_{mea2}(r)$, the photographic image $I_{mea3}(r)$, and the photographic image $I_{mea4}(r)$. In the simulation, an estimation sample 150 is used instead of the sample 140.

FIG. 27 illustrates the estimation sample 150, a wavefront $f_{in}^{m}(r)$, an amplitude transmittance $T_z(r)$, and a wave front $g_{out}^{m}(r)$.

When the estimation sample is a thin sample, it is possible to directly calculate the wavefront $g_{out}^{m}(r)$ from the wavefront $f_{in}^{m}(r)$, as indicated by Expression (13). However, when the estimation sample is a thick sample, it is difficult to directly calculate the wavefront $g_{out}^{m}(r)$ from the wavefront $f_{in}^{m}(r)$.

The estimation sample 150 is a thick sample. Then, the estimation sample 150 is replaced by a plurality of thin layers along the optical axis direction. Then, for each of the thin layers, the wavefronts on both sides of the layer are calculated.

Figure 28:
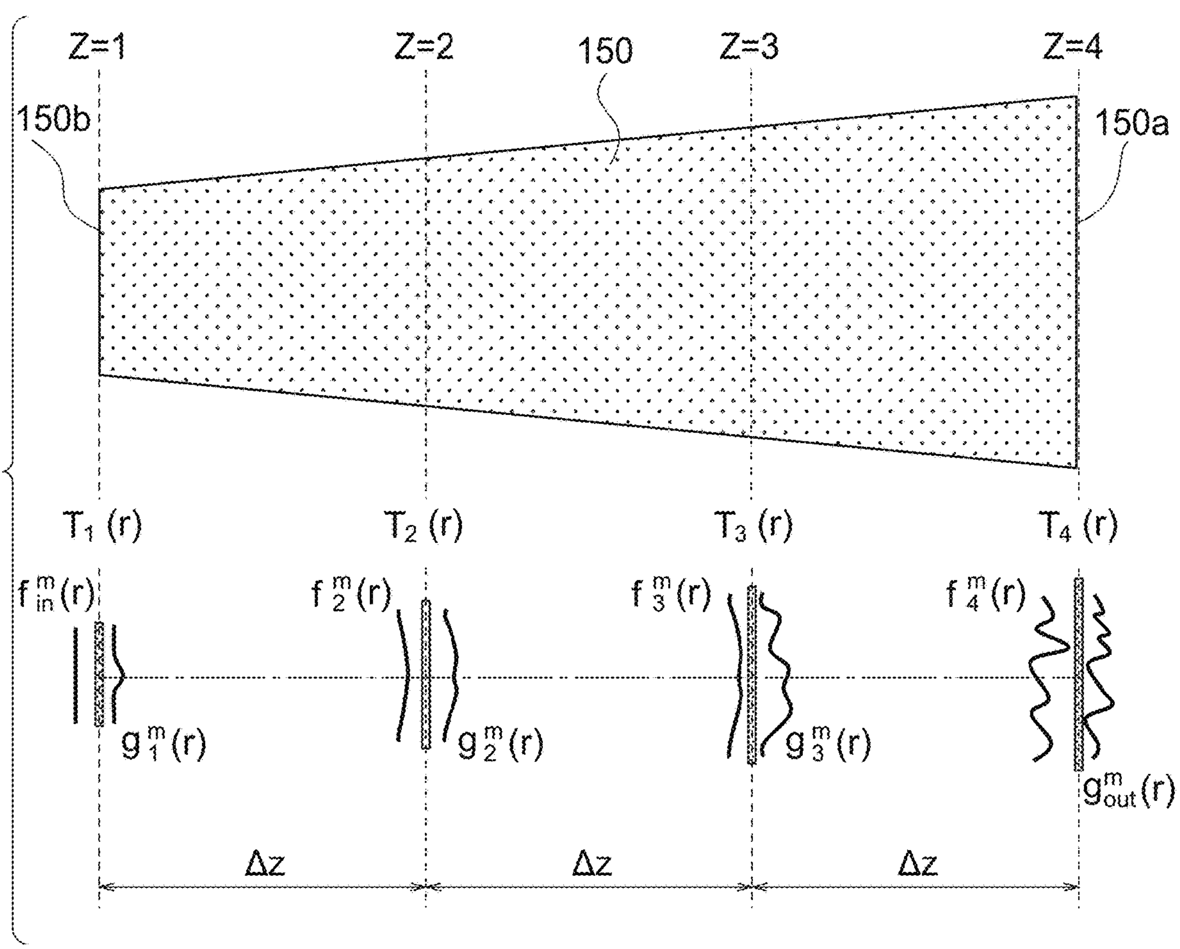
FIG. 28 is a diagram illustrating wavefronts in each layer.

FIG. 28 is a diagram illustrating wavefronts in each layer. The calculation of wavefronts will be described later. It is possible to set the number of layers equal to the number of acquired images. However, the number of layers may be greater than the number of acquired images. In FIG. 28, the number of layers is the same as the number of acquired images.

In FIG. 28, the position of Z=1 is the position of the first layer, the position of Z=2 is the position of the second layer, the position of Z=3 is the position of the third layer, and the position of Z=4 is the position of the fourth layer.

Returning to FIGS. 25 and 26, the simulation will be described.

At step S10, the number of second regions $N_{LS}$ is set. In the microscope system 120, incoherent light sources are located at the pupil plane of the illumination optical system. Thus, at step S10, the number of light sources is set for $N_{LS}$.

At step S200, the number of layers $N_{IM}$ is set. The estimation sample 150 is a thick sample. Thus, as described above, the estimation sample 150 is replaced by a plurality of thin layers. The number of layers $N_{IM}$ represents the number of thin layers.

In the sample 140, photographic images are acquired at a plurality of positions. It is possible to set the number of layers $N_{IM}$ equal to the number of positions where the photographic images are acquired. When the focus position Fo relative to the sample 140 is changed four times, $N_{IM}$=4.

The numbers from 1 to $N_{IM}$ represent the positions of thin layers. For example, when $N_{IM}$=4, the number 1 represents the position of the first layer, the number 2 represents the position of the second layer, the number 3 represents the position of the third layer, and the number 4 represents the position of the fourth layer.

The calculation of the image of the estimation sample is performed by simulation. Therefore, it is possible to freely set the number of layers $N_{IM}$. For example, it is possible to set the number of layers $N_{IM}$ to be greater than the number of positions where the photographic images are acquired.

For example, when $N_{IM}$=7, the number of thin layers is seven. In this case, seven images of the estimation sample are calculated. In the simulation, as described later, the photographic images and the images of the estimation sample in the thin layers are used. Thus, the seven positions where the images of the estimation sample are calculated include the four positions where the photographic images are acquired.

It is possible that the relation between the seven positions and the photographic images is, for example, as follows.

The number 1 represents the position of the first layer. At this position, the photographic image $I_{mea1}(r)$ is acquired. Further, at this position, the image of the estimation sample in the first layer is calculated. Thus, the image of the estimation sample in the first layer and the photographic image $I_{mea1}(r)$ are used in the step described later.

The number 2 represents the position of the second layer. There is no photographic image acquired at this position.

The number 3 represents the position of the third layer. At this position, the photographic image $I_{mea2}(r)$ is acquired. Further, at this position, the image of the estimation sample in the third layer is calculated. Thus, the image of the estimation sample in the third layer and the photographic image $I_{mea2}(r)$ are used in the step described later.

The number 4 represents the position of the fourth layer. There is no photographic image acquired at this position.

The number 5 represents the position of the fifth layer. At this position, the photographic image $I_{mea3}(r)$ is acquired. Further, at this position, the image of the estimation sample in the fifth layer is calculated. Thus, the image of the estimation sample in the fifth layer and the photographic image $I_{mea3}(r)$ are used in the step described later.

The number 6 represents the position of the sixth layer. There is no photographic image acquired at this position.

The number 7 represents the position of the seventh layer. At this position, the photographic image $I_{mea4}(r)$ is acquired. Further, at this position, the image of the estimation sample in the seventh layer is calculated. Thus, the image of the estimation sample in the seventh layer and the photographic image $I_{mea4}(r)$ are used in the step described later.

At step S210, the number of times of correction $N_{CR}$ is set.

At step S220, the value of a variable z is initialized. Step S231 described later is executed for all the acquisition positions. The variable z represents the number of times step S231 is executed.

Step S230 is the step of estimating the estimation sample. In the sample 140, four photographic images have been acquired. As described above, the estimation sample 150 has been replaced by four thin layers. Thus, an initial value of the amplitude transmittance is set four times.

Step S230 includes steps S231, S232, and S233.

At step S231, an initial value is set for the amplitude transmittance $T_z(r)$ in the estimation sample 150.

In the setting of an initial value, the transport-of-intensity equation may be used. The transport-of-intensity equation is disclosed, for example, in the following literature.

M. R. Teague, "Deterministic phase retrieval: a Greens function solution", J. Opt. Soc. Am. 73, 1434-1441 (1983).

The transport-of-intensity equation at a focus position Z0 is represented by Expression (24).

$$\nabla^2 \phi_{z0}(r) = -\frac{k}{I_{z0}} \frac{\delta I_{mea_{z0}}(r)}{\delta z} \tag{24}$$

Here, $\nabla^2$ is a second-order Laplacian, k is a wave number, $\varphi_{Z0}(r)$ is the phase distribution of the sample at the imaging plane, $I_{Z0}$ is the average light intensity of the optical image, and $\delta I_{meaZ0}(r)/\delta_Z$ is a differential image between two defocus images $\pm\Delta z$ away from the imaging plane.

Using Expression (24), it is possible to easily obtain the phase distribution $\varphi_{Z0}(r)$ of the sample from a focus image and two defocus images.

However, it is impossible to measure the phase if the difference in light intensity at the same point between two defocus images is zero or extremely small. Even in partial coherent illumination, if the numerical aperture of the illumination light is close to the numerical aperture of the objective lens, this difference in light intensity is zero or extremely small. Therefore, in such a case, it is difficult to set an initial value using the transport-of-intensity equation.

As described above, the phase distribution $\varphi_{Z0}(r)$ is calculated from a focus image and two defocus images. The focus image is acquired, for example, by moving the objective lens in the optical axis direction at regular intervals. In this case, a plurality of focus images are acquired discretely along the optical axis. Thus, the two defocus images are also acquired discretely.

The phase distribution $\varphi_{Z0}(r)$ represented by Expression (24) is a phase distribution in a plane orthogonal to the optical axis. Since a focus image and two defocus images are acquired discretely, the plane representing the phase distribution $\varphi_{Z0}(r)$ is also discretely located along the optical axis.

As indicated by Expression (25), it is possible to convert the phase distribution $\varphi_z(r)$ into the amplitude transmittance $T_s(r)$. In this way, it is possible to set an initial value for the amplitude transmittance $T_z(r)$.

$$T_z(r)=\exp(i\Phi_z(r)) \tag{25}$$

It is possible to use the phase distribution $\varphi_{Z0}$ obtained by the transport-of-intensity equation for the phase distribution $\varphi_z(r)$. It is possible to set an initial value using the transport-of-intensity equation. If estimation of an initial value is difficult, for example, $T_z(r)=1$ may be set.

At step S232, it is determined whether the value of the variable z matches the number of acquisition positions $N_{IM}$. If the determination result is NO, step S233 is executed. If the determination result is YES, step S30 is executed.

(If the determination result is NO: $z \neq N_{IM}$)

If the determination result is NO, 1 is added to the value of the variable z at step S233. When step S233 is finished, the process returns to step S231.

At step S233, the value of the variable z is increased by one. Therefore, for another acquisition position, an initial value is set for the amplitude transmittance $T_z(r)$ at step S231.

Step S231 is repeatedly performed until an initial value is set for all the acquisition positions.

(If the determination result is YES: $z=N_{IM}$)

At step S30, the value of the variable m is initialized. Steps S240, S41, S42, S251, and S260 described below are executed for all of the light sources. The variable m represents the number of times these steps are executed.

At step S240, the value of a function $I_{estz}(r)$ is initialized. $I_{estz}(r)$ represents an image of the estimation sample 30. As described above, the image of the estimation sample 150 has been replaced by four thin layers. Thus, $I_{estz}(r)$ represents the image of a thin layer.

Steps S250 and S270 are the steps of calculating an image of the estimation sample. The number of images of the estimation sample is equal to the number of photographic images. Since the number of photographic images is four, the number of images of the estimation sample is also four.

Step S250 includes steps S41, S42, S251, S252, S253, and S260.

At step S41, the wavefront $f_{in}{}^m(r)$ incident on the estimation sample 150 is calculated. The wavefront $f_{in}{}^m(r)$ is represented by the above Expressions (11) and (12).

At step S42, the wavefront $g_{out}{}^m(r)$ emitted from the estimation sample 150 is calculated. The wavefront $g_{out}{}^m(r)$ is calculated based on the wavefront $f_{in}{}^m(r)$. The estimation sample 150 has been replaced by four thin layers. Thus, the wavefront is calculated in each of the thin layers.

In FIG. 28, the position of Z=1 is the position of the first layer, the position of Z=2 is the position of the second layer, the position of Z=3 is the position of the third layer, and the position of Z=4 is the position of the fourth layer.

The four thin layers are aligned at regular intervals. The distance between the two adjacent layers is $\Delta z$. The wavefront propagates between the two layers. Thus, $\Delta z$ represents the propagation distance.

A wavefront $f_1{}^m(r)$ in the first layer is represented by Expressions (26) and (12).

$$f_1^m(r) = \exp(-iku_m \cdot r) \tag{26}$$

The position of the first layer is coincident with the position of a surface 150*b* of the estimation sample 150. The wavefront $f_{in}{}^m(r)$ is incident on the surface 150*b*. Thus, the wavefront $f_1{}^m(r)$ represents the wavefront $f_{in}{}^m(r)$. In FIG. 28, the wavefront $f_{in}{}^m(r)$ is illustrated instead of the wavefront $f_1{}^m(r)$.

A wavefront $g_1{}^m(r)$ in the first layer is represented by Expression (27).

$$g_1^m(r) = T_1(r) f_1^m(r) \tag{27}$$

where $T_1(r)$ is the amplitude transmittance in the first layer.

A wavefront $f_2{}^m(r)$ in the second layer is a wavefront when the wavefront $g_1{}^m(r)$ propagates by $\Delta z$. The wavefront $f_2{}^m(r)$ is represented by Expression (28).

$$f_2^m(r) = F_{2D}^{-1}\left[F_{2D}[g_1^m(r)]\exp\left(-2\pi i \times \Delta z 1 \sqrt{1/\lambda^2 - |u|^2}\right)\right] \tag{28}$$

$\Delta z$ is the distance between the two adjacent layers, $\lambda$ is a wavelength, u is the two-dimensional notation of pupil plane coordinates $(\xi,\eta)$, $F_{2D}$ is a two-dimensional Fourier transform, and $F_{2D}{}^{-1}$ is a two-dimensional Fourier inverse transform.

A wavefront $g_2{}^m(r)$ in the second layer is represented by Expression (29).

$$g_2^m(r) = T_2(r) f_2^m(r) \tag{29}$$

where $T_2(r)$ is the amplitude transmittance in the second layer.

A wavefront $f_3{}^m(r)$ in the third layer is a wavefront when the wavefront $g_2{}^m(r)$ propagates by $\Delta z$. The wavefront $f_3{}^m(r)$ in the third layer is represented by Expression (30).

$$f_3^m(r) = F_{2D}^{-1}\left[F_{2D}[g_2^m(r)]\exp\left(-2\pi i \times \Delta z 1 \sqrt{1/\lambda^2 - |u|^2}\right)\right] \tag{30}$$

A wavefront $g_3{}^m(r)$ in the third layer is represented by Expression (31).

$$g_3^m(r) = T_3(r) f_3^m(r) \tag{31}$$

where $T_3(r)$ is the amplitude transmittance in the third layer.

A wavefront $f_4{}^m(r)$ in the fourth layer is a wavefront when the wavefront $g_3{}^m(r)$ propagates by $\Delta z$. The wavefront $f_4{}^m(r)$ in the fourth layer is represented by Expression (32). By setting $\Delta D=\Delta z$ in Expression (21), it is possible to calculate the wavefront $f_4{}^m(r)$.

$$f_4^m(r) = F_{2D}^{-1}\left[F_{2D}[g_3^m(r)]\exp\left(-2\pi i \times \Delta z 1 \sqrt{1/\lambda^2 - |u|^2}\right)\right] \tag{32}$$

A wavefront $g_4{}^m(r)$ in the fourth layer is represented by Expression (33).

$$g_4^m(r) = T_4(r) f_4^m(r) \tag{33}$$

where $T_4(r)$ is the amplitude transmittance in the fourth layer.

The position of the fourth layer is coincident with the position of a surface 150*a* of the estimation sample 150. The wavefront $g_{out}^{m}(r)$ is emitted from the surface 150*a*. Thus, the wavefront $g_4^{m}(r)$ represents the wavefront $g_{out}^{m}(r)$. In FIG. 28, the wavefront $g_{out}^{m}(r)$ is illustrated instead of the wavefront $g_4^{m}(r)$.

As described above, when the estimation sample is a thick sample, it is possible to calculate the wavefront $g_{out}^{m}(r)$ by replacing the estimation sample by a plurality of thin layers and obtaining the wavefront propagating between two layers.

At step S251, the value of the variable z is initialized. Steps S261, S262, and S263 described below are executed for all of the acquisition positions. The variable z represents the number of times these steps are executed.

Step S260 includes steps S261, S262, S263, S264, and S265.

At step S261, the wavefront $u_z^{m}(r)$ at the photographic image acquisition position is calculated. The wavefront $u_z^{m}(r)$ is represented by Expression (34).

$$u_z^m(r) = F_{2D}^{-1}\left[F_{2D}[g_{out}^m(r)]\exp\left(-2\pi i\times\Delta D\sqrt{1/\lambda^2-|u|^2}\right)\right] \tag{34}$$

where ΔD is the distance from the surface of the estimation sample to the thin layer.

At step S262, a wavefront $u_{imgz}^{m}(r)$ at the imaging plane is calculated. The wavefront $u_{imgz}^{m}(r)$ is represented by Expression (35).

$$u_{imgz}^m(r) = F_{2D}^{-1}[F_{2D}\{u_z^m(r)\}\times P(u)] \tag{35}$$

At step S263, the wavefront $u_{imgz}^{m}(r)$ is squared. The wavefront $u_{imgz}^{m}(r)$ represents the amplitude of light. Thus, the light intensity is calculated by squaring the wavefront $u_{imgz}^{m}(r)$.

$|u_{imgz}^{m}(r)|^2$ represents the light intensity distribution at the imaging plane IP. Assuming that a first intensity distribution is the light intensity distribution at the imaging position of the detection optical system, $|u_{imgz}^{m}(r)|^2$ represents the first light intensity distribution at the imaging position of the detection optical system.

At step S264, it is determined whether the value of the variable z matches the number of acquisition positions $N_{IM}$. If the determination result is NO, step S265 is executed. If the determination result is YES, step S252 is executed.

(If the determination result is NO: $z \neq N_{IM}$)

If the determination result is NO, 1 is added to the value of the variable z at step S265. When step S265 is finished, the process returns to step S261.

At step S265, the value of the variable z is increased by one. Therefore, steps S261, S262, and S263 are executed for another acquisition position.

Steps S261, S262, and S263 are repeatedly executed until an initial value is set for all the acquisition positions.

The process at step S250 will be explained using the first and fourth layers. The second and third layers can be regarded in the same way as the first layer.

Figure 29A:
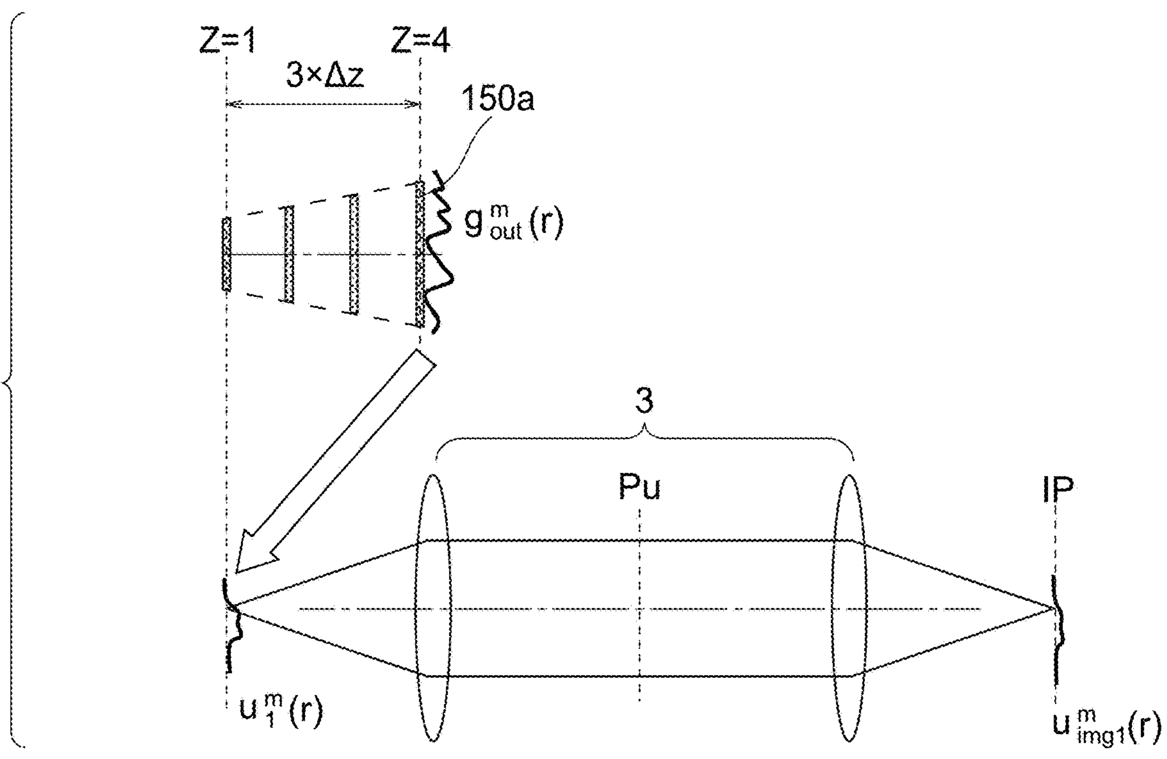
FIGS. 29A and 29B are diagrams of a wavefront at a photographic image acquisition position and a wavefront at an imaging plane.
Figure 29B:
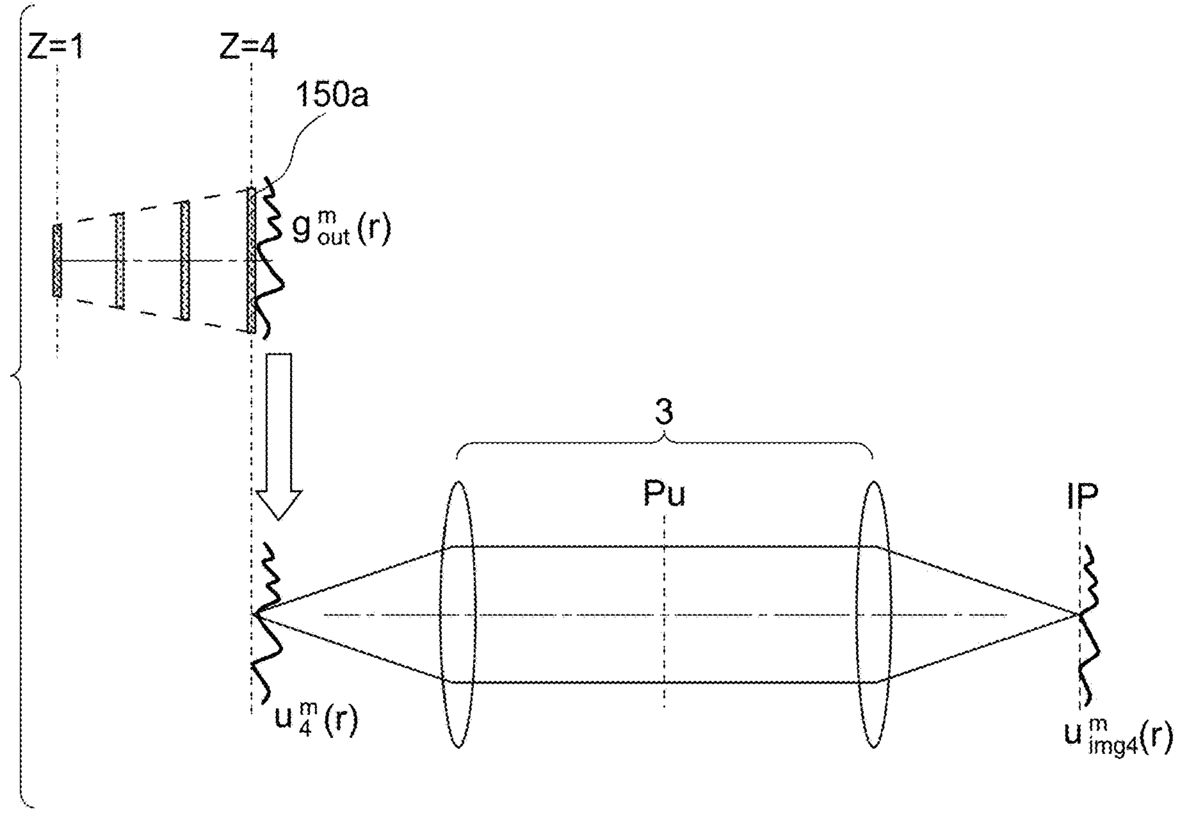

FIGS. 29A and 29B are diagrams of a wavefront at a photographic image acquisition position and a wavefront at an imaging plane. FIG. 29A is a diagram illustrating two wavefronts in the first layer. FIG. 29B is a diagram illustrating two wavefronts in the fourth layer.

The photographic image at z=1 is the photographic image $I_{mea1}(r)$. The photographic image $I_{mea1}(r)$ is the image at a distance of 3×Δz from the surface 140*a*. The first layer is 3×Δz away from the surface 150*a*. Thus, the position of the first layer corresponds to the acquisition position of the photographic image $I_{mea1}(r)$.

The emission position of the wavefront $g_{out}^{m}(r)$ is coincident with the surface 150*a*. As illustrated in FIG. 29A, the emission position of the wavefront $g_{out}^{m}(r)$ is different from the position of the first layer. The first layer is 3×Δz away from the emission position of the wavefront $g_{out}^{m}(r)$.

A wavefront $u_1^{m}(r)$ in the first layer is a wavefront when the wavefront $g_{out}^{m}(r)$ propagates by 3×Δz in the direction opposite to the direction of travel of light. Thus, by setting ΔD=−3×Δz at step S261, it is possible to calculate the wavefront $u_1^{m}(r)$ from Expression (34).

Once the wavefront $u_1^{m}(r)$ is calculated, at step S262, a wavefront $u_{img1}^{m}(r)$ in the imaging plane is calculated from Expression (35).

Furthermore, at step S263, a light intensity $|u_{img1}(r)|^2$ of the image in the first layer is calculated.

The photographic image at z=2 is the photographic image $I_{mea2}(r)$. The photographic image $I_{mea2}(r)$ is the image at a distance of 2×Δz from the surface 140*a*. The second layer is 2×Δz away from the surface 150*a*. Thus, the position of the second layer corresponds to the acquisition position of the photographic image $I_{mea2}(r)$.

The emission position of the wavefront $g_{out}^{m}(r)$ is different from the position of the second layer. The second layer is 2×Δz away from the emission position of the wavefront $g_{out}^{m}(r)$.

A wavefront $u_2^{m}(r)$ in the second layer is a wavefront when the wavefront $g_{out}^{m}(r)$ propagates by 2×Δz in the direction opposite to the direction of travel of light. Thus, by setting ΔD=−2×Δz at step S261, it is possible to calculate the wavefront $u_2^{m}(r)$.

Once the wavefront $u_2^{m}(r)$ is calculated, at step S262, a wavefront $u_{img2}^{m}(r)$ in the imaging plane is calculated.

Furthermore, at step S263, a light intensity $|u_{img}^{2}(r)|^2$ of the image in the second layer is calculated.

The photographic image at z=3 is the photographic image $I_{mea3}(r)$. The photographic image $I_{mea3}(r)$ is the image at a distance of Δz from the surface 140*a*. The third layer is Δz away from the surface 150*a*. Thus, the position of the third layer corresponds to the acquisition position of the photographic image $I_{mea3}(r)$.

The emission position of the wavefront $g_{out}^{m}(r)$ is different from the position of the third layer. The third layer is Δz away from the emission position of the wavefront $g_{out}^{m}(r)$.

A wavefront $u_3^{m}(r)$ in the third layer is a wavefront when the wavefront $g_{out}^{m}(r)$ propagates by Δz in the direction opposite to the direction of travel of light. Thus, by setting ΔD=Δz at step S261, it is possible to calculate the wavefront $u_3^{m}(r)$.

Once the wavefront $u_3^{m}(r)$ is calculated, at step S262, a wavefront $u_{img3}^{m}(r)$ in the imaging plane is calculated.

Furthermore, at step S263, a light intensity $|u_{img}^{3}(r)|^2$ of the image in the third layer is calculated.

The photographic image at z=4 is the photographic image $I_{mea4}(r)$. The photographic image $I_{mea4}(r)$ is the image at the surface 140*a*. The fourth layer is coincident with the surface 150*a*. Thus, the position of the fourth layer corresponds to the acquisition position of the photographic image $I_{mea4}(r)$.

The emission position of the wavefront $g_{out}^{m}(r)$ is at the surface 150*a*. As illustrated in FIG. 29B, the emission position of the wavefront $g_{out}^{m}(r)$ is the same as the position of the fourth layer.

A wavefront $u_4^{m}(r)$ in the fourth layer is the same as the wavefront $g_{out}^{m}(r)$. It is possible to replace the wavefront $g_{out}^{m}(r)$ by the wavefront $u_4^{m}(r)$.

Once the wavefront $u_4^m(r)$ is calculated, at step S262, a wavefront $u_{img4}^m$ in the imaging plane is calculated.

The emission position of the wavefront $g_{out}^m(r)$ is at the surface 150*a*. As illustrated in FIG. 16B, the emission position of the wavefront $g_{out}^m(r)$ is the same as the position of the fourth layer.

A wavefront $u_4^m(r)$ in the fourth layer is the same as the wavefront $g_{out}^m(r)$. It is possible to replace the wavefront $g_{out}^m(r)$ by the wavefront $u_4^m(r)$.

Once the wavefront $u_4^m(r)$ is calculated, at step S262, a wavefront $u_{img4}^m(r)$ in the imaging plane is calculated.

Furthermore, at step S263, a light intensity $|u_{img4}(r)|^2$ of the image in the fourth layer is calculated.

The wavefront $u_z^m(r)$ and the wavefront $u_{imgz}^m(r)$ represent the wavefronts generated by illumination light emitted from the m-th light source, that is, illumination light emitted from one light source.

The image $I_{estz}(r)$ of the estimation sample is generated at the acquisition position by illumination light emitted from all of the light sources. Thus, the wavefront needs to be obtained for all of the light sources.

(If the determination result is YES: $z=N_{IM}$)

Step S242 is executed.

The wavefront $f_{in}^m(r)$, the wavefront $g_{out}^m(r)$, the wavefront $u_z^m(r)$, and the wavefront $u_{imgz}^m(r)$ represent the wavefronts generated by illumination light emitted from the m-th light source, that is, illumination light emitted from one light source.

The image $I_{estz}(r)$ of the estimation sample is generated by illumination light emitted from all of the light sources. Thus, the wavefront $f_{in}^m(r)$, the wavefront $g_{out}^m(r)$, the wavefront $u_z^m(r)$, and the wavefront $u_{imgz}^m(r)$ need to be obtained for all of the light sources.

At step S252, it is determined whether the value of the variable m matches the number of light sources $N_{LS}$. If the determination result is NO, step S253 is executed. If the determination result is YES, step S270 is executed.

(If the determination result is NO: $m \neq N_{LS}$)

If the determination result is NO, 1 is added to the value of the variable m at step S253. When step S253 is finished, the process returns to step S41.

At step S253, the value of the variable m is increased by one. Therefore, for another light source, the wavefront $f_{in}^m(r)$ is calculated at step S41, the wavefront $g_{out}^m(r)$ is calculated at step S42, the wavefront $u_z^m(r)$ is calculated at step S261, the wavefront $u_{imgz}^m(r)$ is calculated at step S262, and $|u_{imgz}^m(r)|^2$ is calculated at step S263.

Steps S41, S42, S251, and S260 are repeatedly performed until $|u_{imgz}^m(r)|^2$ is obtained for all of the light sources.

(If the determination result is YES: $m=N_{LS}$)

If the determination result is YES, the summation of $|u_{imgz}^m(r)|^2$ is performed at step S270. As a result, the image $I_{estz}(r)$ of the estimation sample is calculated. The image $I_{estz}(r)$ of the estimation sample is represented by Expression (36).

$$L_{estz}(r) = \sum_m |u_{imgz}^m(r)|^2 \quad (36)$$

Figure 30A:
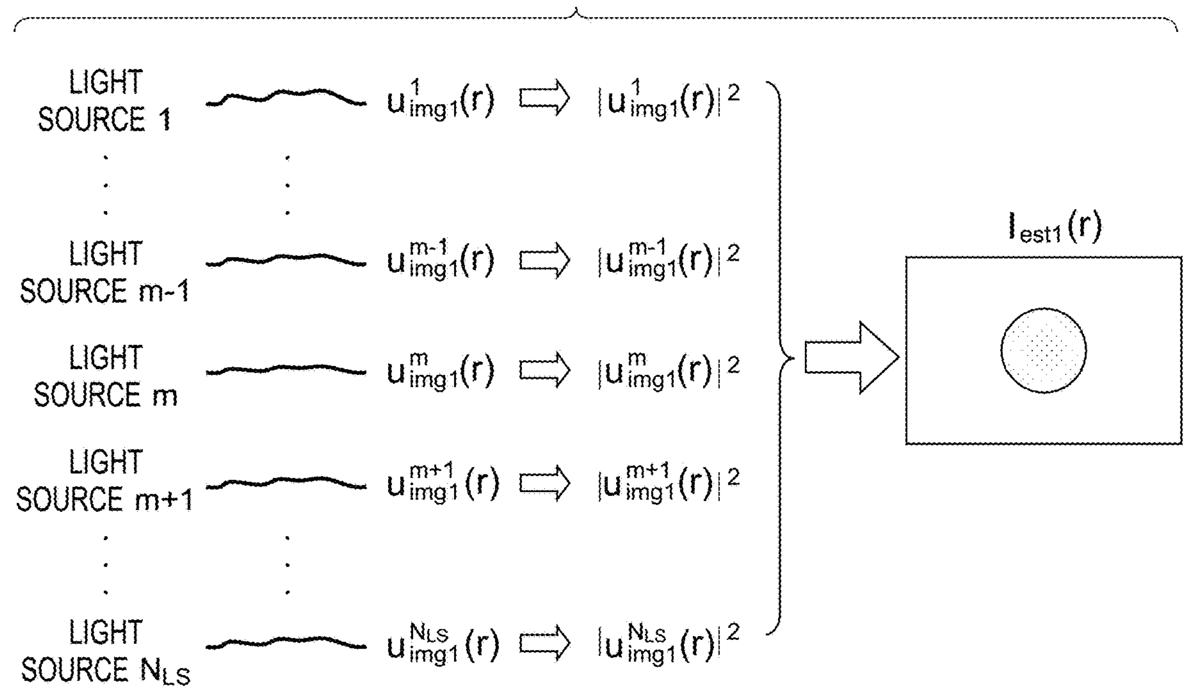
FIGS. 30A and 30B are diagrams illustrating images of an estimation sample.
Figure 30B:
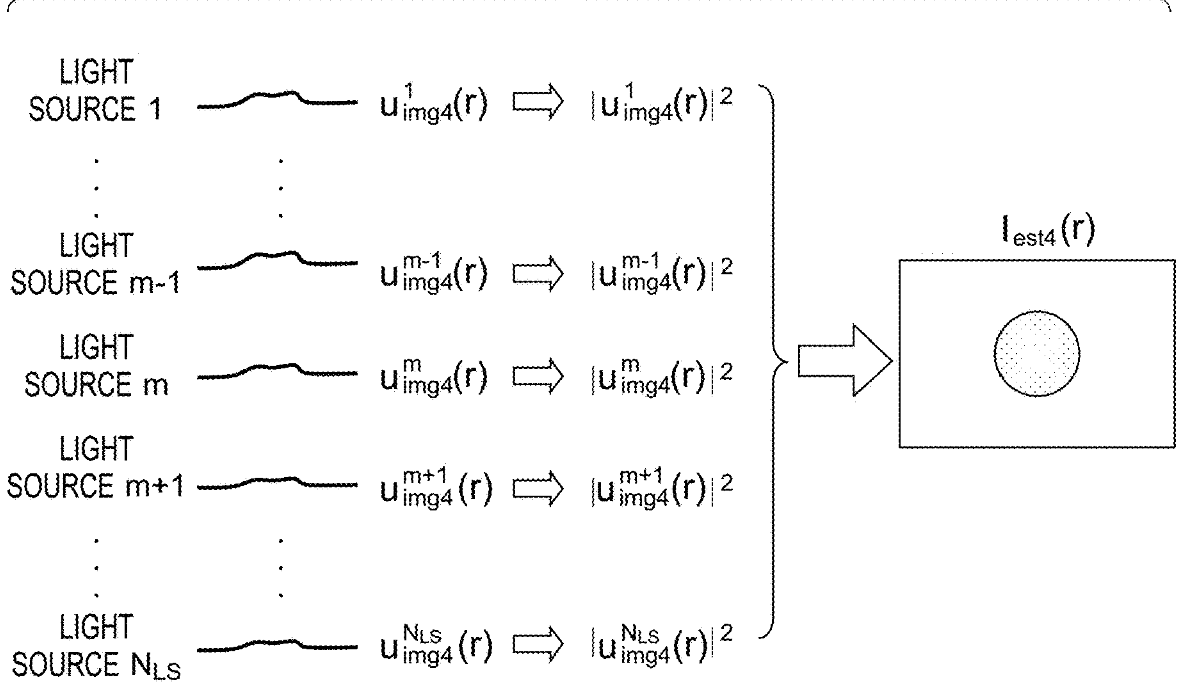

FIGS. 30A and 30B are diagrams illustrating images of the estimation sample. FIG. 30A is a diagram illustrating an image of the estimation sample in the first layer. FIG. 30B is a diagram illustrating an image of the estimation sample in the fourth layer.

An image $I_{est1}(r)$ of the estimation sample is an image when the wavefront $u_{img1}^m(r)$ is obtained for all of the light sources. An image $I_{est4}(r)$ of the estimation sample is an image when the wavefront $u_{img4}^m(r)$ is obtained for all of the light sources.

As illustrated in FIG. 30A, the wavefront $u_{img1}^m(r)$ is calculated for each light source, $|u_{img1}^m(r)|^2$ is calculated from the wavefront $u_{img1}^m(r)$, and all of $|u_{img1}^m(r)|^2$ are summed. As a result, the image $I_{est1}(r)$ of the estimation sample in the first layer is calculated.

As illustrated in FIG. 30B, the wavefront $u_{img4}^m(r)$ is calculated for each light source, $|u_{img4}^m(r)|^2$ is calculated from the wavefront $u_{img4}^m(r)$, and all of $|u_{img4}^m(r)|^2$ are summed. As a result, the image $I_{est4}(r)$ of the estimation sample in the fourth layer is calculated.

(If the determination result is YES: $m=N_{LS}$)

At step S280, a residual is calculated. The residual is represented by Expression (37). As indicated by Expression (37), the residual is calculated from the photographic image $I_{meaz}(r)$ and the image $I_{estz}(r)$ of the estimation sample.

$$\sum_{(r,z)} \|I_{meaz}(r) - I_{estz}(r)\|_{l2}^2 \quad (37)$$

As described above, the number of photographic images is four, and the number of images of the estimation sample is also four. Thus, the residual in the first layer is calculated from $I_{mea1}(r)$ and $I_{est1}(r)$. The residual in the second layer is calculated from $I_{mea2}(r)$ and $I_{est2}(r)$. The residual in the third layer is calculated from $I_{mea3}(r)$ and $I_{est3}(r)$. The residual in the fourth layer is calculated from $I_{mea4}(r)$ and $I_{est4}(r)$.

The residual used at step 70 is calculated from the residual in the first layer, the residual in the second layer, the residual in the third layer, and the residual in the fourth layer.

At step S70, the residual is compared with a threshold. If the determination result is NO, step S290 is executed. If the determination result is YES, step S110 is executed.

(If the determination result is NO: residual≥threshold)

At step S290, the value of a variable L is initialized. Steps S301, S302, S303, S304, and S310 described below are executed the number of times set at step S210. The variable L represents the number of times these steps are executed.

Step S300 includes steps S301, S302, S303, S304, S305, S306, and S310.

At step S301, one is selected at random from 1 to $N_{IM}$. At step S311 described later, a wavefront after correction is calculated. In calculation of a wavefront after correction, one photographic image and one image of the estimation sample are used.

As described above, at step S270, a plurality of images of the estimation sample are calculated. One of the images of the estimation sample is used in calculation of a wavefront after correction. Thus, an image of the estimation sample used in calculation of a wavefront after correction is selected from among the images of the estimation sample.

$N_{IM}$ is the number of layers. When $N_{IM}=4$, at step S301, one number is selected at random from among numbers 1 to 4.

For example, when the selected number is 1, the number 1 represents the first layer. The image of the estimation sample in the first layer corresponds to the photographic image at the first acquisition position. Thus, the photographic image at the first acquisition position and the image of the estimation sample in the first layer are used in calculation of the wavefront after correction.

For example, when the selected number is 4, the selected number represents the fourth layer. The image of the estimation sample in the fourth layer corresponds to the photographic image at the fourth acquisition position. Thus, the photographic image at the fourth acquisition position and the image of the estimation sample in the fourth layer are used in calculation of the wavefront after correction.

At step S302, the value selected at step S301 is input to a variable zL. As described above, at step S301, one number is selected at random from among numbers 1 to $N_{IM}$. For example, when the selected number is 1, at step S302, 1 is input to the variable zL.

At step S303, the value of variable m is initialized. Steps S311, S312, and S313 described later are executed for all of the light sources. The variable m represents the number of times these steps are executed.

Step S310 is the step of optimizing the refractive index distribution of the estimation sample.

Step S310 includes steps S311, S312, S313, S314, and S315.

At step S311, a wavefront $u'_{zL}{}^{m}(r)$ is calculated. The wavefront $u'_{zL}{}^{m}(r)$ is the wavefront at the position of the layer indicated by the value of variable zL.

In calculation of the wavefront $u'_{zL}{}^{m}(r)$, a photographic image $I_{meazL}(r)$ and an image $I_{estzL}(r)$ of the estimation sample are used. The photographic image $I_{meazL}(r)$ is the captured image at the position indicated by the value of the variable zL among photographic images $I_{meaz}$. The image $I_{estzL}(r)$ of the estimation sample is the image of the estimation sample at the position indicated by the value of the variable zL among images $I_{estz}$ of the estimation sample.

The wavefront $u'_{zL}{}^{m}(r)$ is represented by Expression (38).

$$u'^{m}_{zL}(r) = u^{m}_{zL}(r)\sqrt{\frac{I_{meazL}(r)}{I_{estzL}(r)}} \tag{38}$$

FIGS. 31A to 31D are diagrams illustrating correction of wavefronts. FIG. 31A is a diagram illustrating the wavefront before correction emitted from the estimation sample. FIG. 31B is a diagram illustrating the wavefront before correction at the photographic image acquisition position. FIG. 31C is a diagram illustrating the wavefront after correction at the photographic image acquisition position. FIG. 31D is a diagram illustrating the wavefront after correction emitted from the estimation sample.

A case where the number selected at step S301 is 1, that is, zL=1, will be described.

As illustrated in FIG. 30A, the image $I_{est1}(r)$ of the estimation sample is calculated based on the wavefront $u_{img1}{}^{m}(r)$. As illustrated in FIGS. 30A and 31B, the wavefront $u_{img1}{}^{m}(r)$ is calculated based on the wavefront $u_1{}^{m}(r)$.

As illustrated in FIG. 31A, the amplitude transmittance $T_z(r)$ is used in calculation of the wavefront $u_1{}^{m}(r)$. The amplitude transmittance $T_z(r)$ is the estimated amplitude transmittance. When step S300 is executed for the first time, this amplitude transmittance $T_z(r)$ is different from the amplitude transmittance of the sample 140.

As the difference between the amplitude transmittance $T_z(r)$ and the amplitude transmittance of the sample 140 increases, the difference between the image $I_{estz}(r)$ of the estimation sample and the photographic image $I_{meaz}(r)$ also increases. Thus, it is possible to consider that the difference between the image $I_{estz}(r)$ of the estimation sample and the photographic image $I_{meaz}(r)$ reflects the difference between the amplitude transmittance $T_z(r)$ and the amplitude transmittance of the sample 140.

As described above, zL=1. Then, with zL=1 in Expression (38), the wavefront $u_1{}^{m}(r)$ is corrected using the image $I_{est1}(r)$ of the estimation sample and the photographic image $I_{mea1}(r)$. As a result, as illustrated in FIG. 31C, a corrected wavefront, that is, a wavefront $u'_1{}^{m}(r)$ is obtained.

By using the wavefront $u'_1{}^{m}(r)$, it is possible to calculate a new amplitude transmittance. The wavefront $u'_1{}^{m}(r)$ is different from the wavefront $u_1{}^{m}(r)$. Thus, the new amplitude transmittance is different from the amplitude transmittance when the wavefront $u_1{}^{m}(r)$ is calculated.

At step S312, a wavefront after correction $g'_{out}{}^{m,zL}(r)$ is calculated. The wavefront $g'_{out}{}^{m,zL}(r)$ is a wavefront when the wavefront $u'_{zL}{}^{m}(r)$ propagates by ΔD. The wavefront $g'_{out}{}^{m,zL}(r)$ is represented by Expression (39).

$$g'^{mzL}_{out}(r) = F^{-1}_{2D}\left[F_{2D}[u'^{m}_{ZL}(r)]\exp\left(-2\pi i\times\Delta D\sqrt{1/\lambda^2-|u|^2}\right)\right] \tag{39}$$

As described above, by using the wavefront $u'_1{}^{m}(r)$, it is possible to calculate the amplitude transmittance $T_z(r)$. However, as illustrated in FIGS. 31A to 31D, the wavefront at the position of the wavefront $g_{out}{}^{m}(r)$ is necessary in calculation of the amplitude transmittance $T_z(r)$.

As illustrated in FIGS. 31A and 31C, the position of the wavefront $u'_1{}^{m}(r)$ is different from the position of the wavefront $g_{out}{}^{m}(r)$. Thus, in order to calculate the amplitude transmittance $T_z(r)$, as illustrated in FIG. 31D, a wavefront $g'_{out}{}^{m,1}(r)$ is necessary.

The wavefront $g'_{out}{}^{m,1}(r)$ is a wavefront when the wavefront $u'_1{}^{m}(r)$ propagates by 3×Δz. By setting ΔD=3×Δz and zL=1 in Expression (39), it is possible to calculate the wavefront $g'_{out}{}^{m,1}(r)$.

At step S313, a gradient $\Delta T_z{}^{m,zL}(r)$ of the sample is calculated. $\Delta T_z{}^{m,zL}(r)$ is the gradient of the sample when illuminated by the m-th light source and corrected by the photographic image at the position of the layer indicated by the value of the variable zL and the image of the estimation sample.

The gradient $\Delta T_z{}^{m,zL}$ of the sample is represented by Expression (40). It is possible to use, for example, gradient descent to calculate the gradient $\Delta T_z{}^{m,zL}(r)$ of the sample.

$$\Delta T^{m,zL}_{z}(r) = \frac{|f^{m}_{z}(r)|f^{*m}_{z}(r)\left(g'^{m,zL}_{z}(r) - g^{m}_{z}(r)\right)}{|T_z(r)|_{max}\left(|T_z(r)|^2+\delta\right)} \tag{40}$$

where f* is the complex conjugate of f, and

δ is a normalization constant to prevent division by zero.

As described above, the estimation sample 150 has been replaced by a plurality of thin layers. Thus, it is necessary to calculate the gradient $\Delta T_z{}^{m,zL}(r)$ of the sample for each of the thin layers.

Figure 32A:
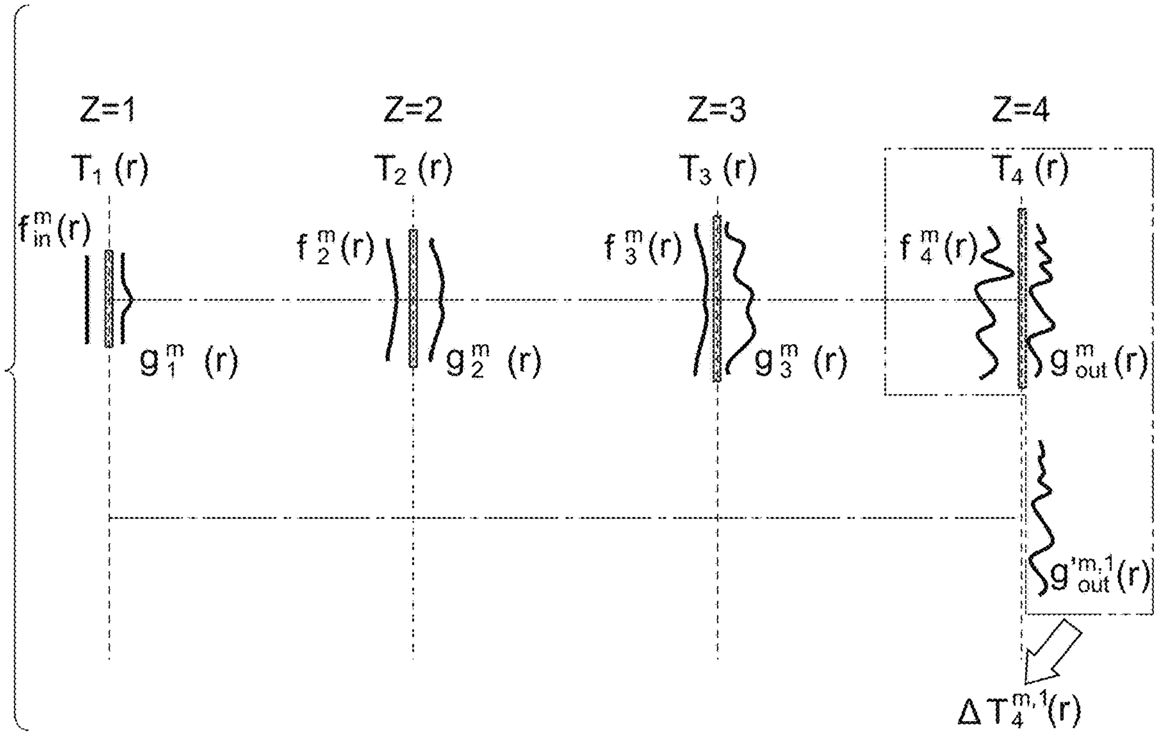
FIGS. 32A and 32B are diagrams illustrating the gradient of a sample and propagation of a wavefront.
Figure 32B:
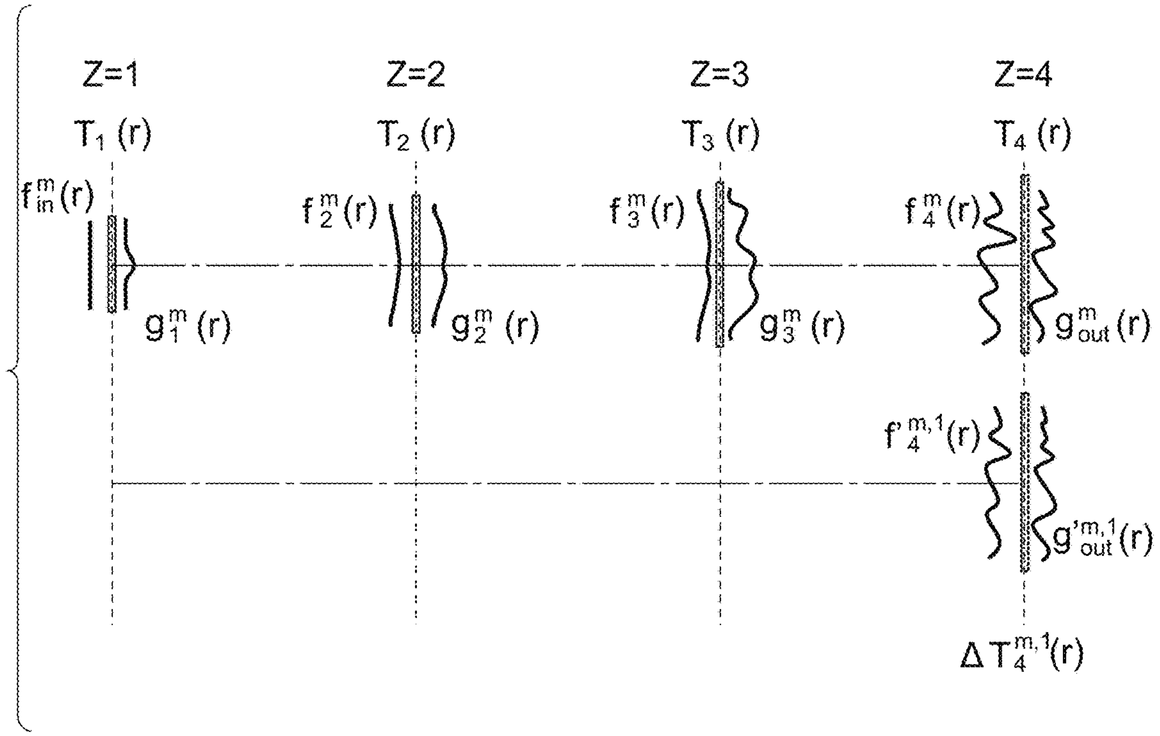

FIGS. 32A and 32B are diagrams illustrating the gradient of a sample and propagation of a wavefront. A case where the estimation sample 150 is replaced by four thin layers, that is, $N_{IM}$=4 will be described. Further, zL=1 is set. FIG. 32A is a diagram illustrating the gradient of a sample. FIG. 32B is a diagram illustrating propagation of a wavefront.

An amplitude transmittance $T_4(r)$ is used in calculation of the wavefront $g_{out}{}^{m}(r)$. The amplitude transmittance $T_4(r)$ is the estimated amplitude transmittance. Thus, this amplitude transmittance $T_4(r)$ is different from the amplitude transmittance of the sample 140.

As the difference between the amplitude transmittance $T_4(r)$ and the amplitude transmittance of the sample 140 increases, the difference between the wavefront $g_{out}^{m}(r)$ and the wavefront $g'_{out}{}^{m,1}(r)$ also increases. Thus, it is possible to consider that the difference between the wavefront $g_{out}^{m}(r)$ and the wavefront $g'_{out}{}^{m,1}(r)$ reflects the difference between the amplitude transmittance $T_4(r)$ and the amplitude transmittance of the sample 140.

The wavefront $f_4^{m}(r)$, the amplitude transmittance $T_4(r)$, the wavefront $g_{out}^{m}(r)$, and the wavefront $g'_{out}{}^{m,1}(r)$ are known. Then, by setting z=4 and zL=1 in Expression (40), as illustrated in FIG. 32A, it is possible to calculate the gradient $\Delta T_4^{m,1}(r)$ of the sample.

Since $g_4^{m}(r)$ and the wavefront $g_{out}^{m}(r)$ are the same, the wavefront $g_{out}^{m}(r)$ can be used instead of $g_4^{m}(r)$. Since $g'_4{}^{m,1}(r)$ is the same as $g'_{out}{}^{m,1}(r)$, $g'_{out}{}^{m,1}(r)$ can be used instead of $g'_4{}^{m,1}(r)$.

Next, a gradient $\Delta T_3^{m,1}(r)$ of the sample is calculated. The wavefront at the position of the wavefront $g_3^{m}(r)$ is necessary in calculation of the gradient $\Delta T_3^{m,1}(r)$ of the sample. In order to calculate this wavefront, as illustrated in FIG. 32B, a wavefront $f'_4{}^{m,1}(r)$ is necessary.

It is possible to calculate the wavefront $f'_4{}^{m,1}(r)$ by setting z=4 and zL=1 in Expression (41).

$$f_z'^{m,zL}(r) = f_z^m(r) + \frac{|T_z(r)|T_z^*(r)\left(g_z'^{m,zL}(r) - g_m^m(r)\right)}{|f_z^m(r)|_{max}\left(|f_z^m(r)|^2 + \delta\right)} \tag{41}$$

Next, the wavefront at the position of a wavefront $g_3^{m,1}(r)$ is calculated using the calculated wavefront $f'_4{}^{m,1}(r)$.

Figure 33A:
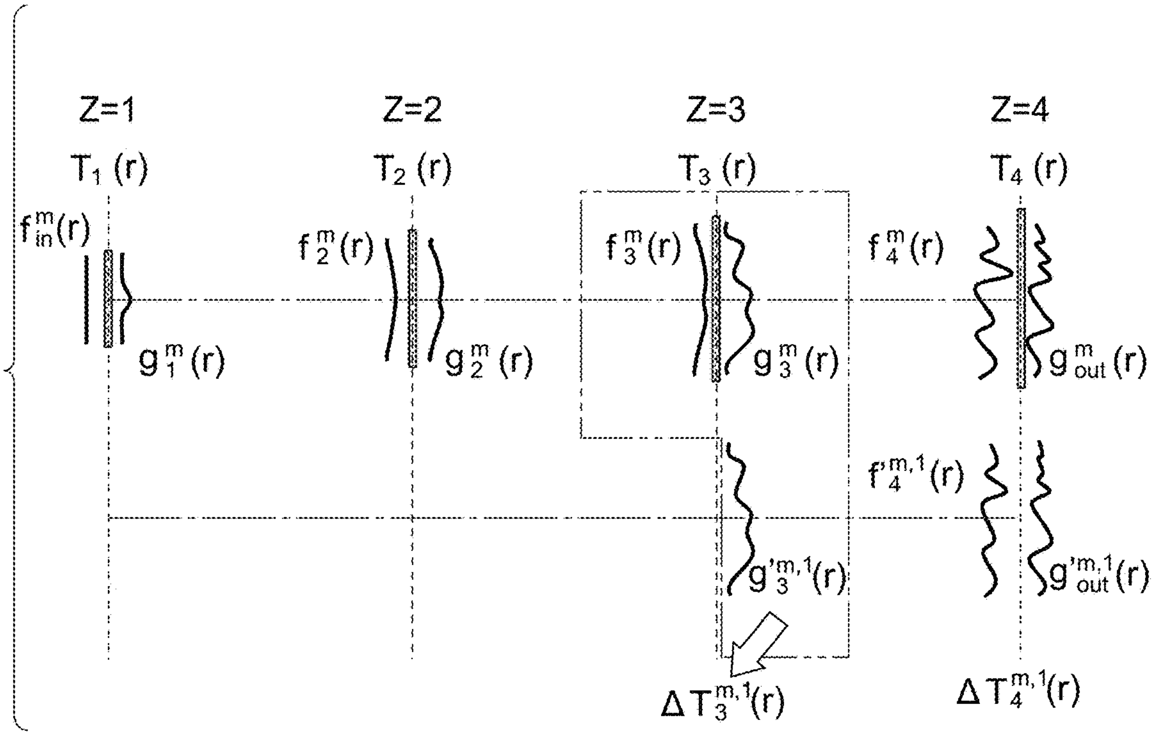
FIGS. 33A and 33B are diagrams illustrating the gradient of a sample and propagation of a wavefront.
Figure 33B:
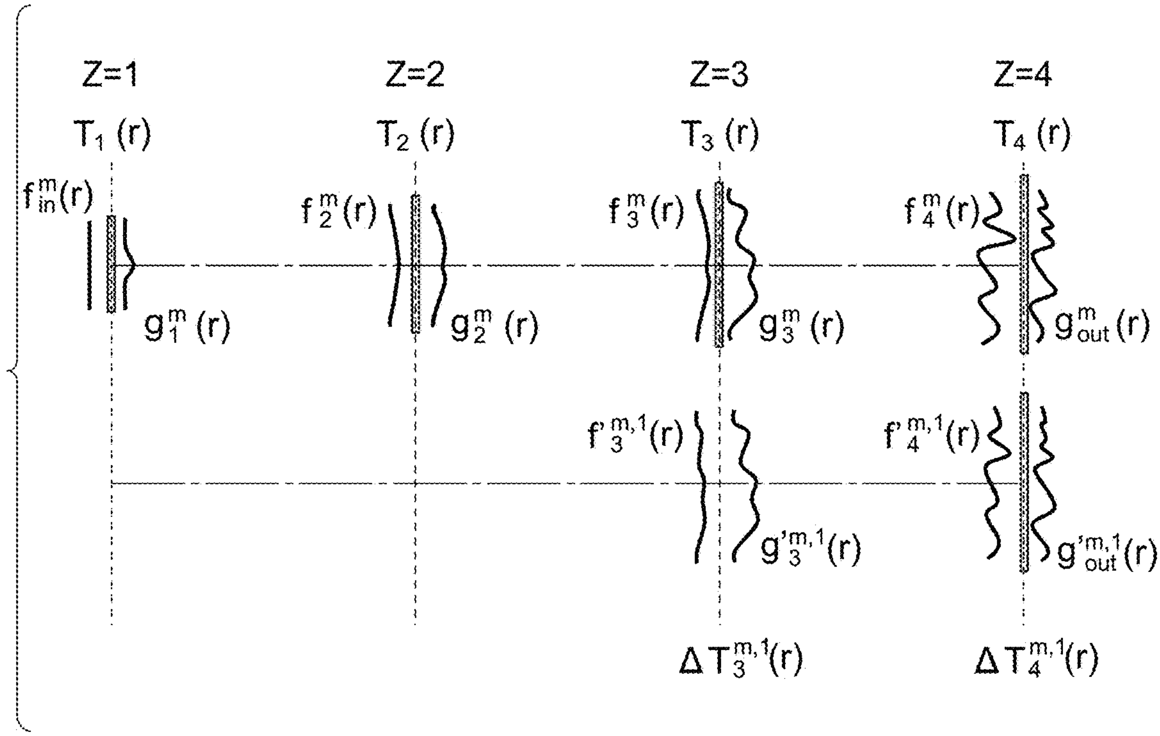

FIGS. 33A and 33B are diagrams illustrating the gradient of a sample and propagation of a wavefront. FIG. 33A is a diagram illustrating propagation of a wavefront and the gradient of a sample. FIG. 33B is a diagram illustrating propagation of a wavefront.

As illustrated in FIG. 33A, the wavefront $g'_3{}^{m,1}(r)$ is a wavefront when the wavefront $f'_4{}^{m,1}(r)$ propagates by $\Delta z$. This is the propagation of a wavefront from the fourth layer to the third layer.

As described above, the propagation of a wavefront from the third layer to the fourth layer is represented by Expression (32). Thus, it is possible to calculate the wavefront $g'_3{}^{m,1}(r)$ by setting as follows in Expression (32).

The wavefront $f_4^{m}(r)$ is replaced by the wavefront $g'_3{}^{m,1}(r)$.

The wavefront $g_3^{m}(r)$ is replaced by the wavefront $f'_4{}^{m,1}(r)$.

$\Delta D=-\Delta z$ is set.

The wavefront $f_3^{m}(r)$, the amplitude transmittance $T_3(r)$, the wavefront $g_3^{m}(r)$, and the wavefront $g'_3{}^{m,1}(r)$ are known. Then, by setting z=3 and zL=1 in Expression (40), as illustrated in FIG. 33B, it is possible to calculate the gradient $\Delta T_3^{m,1}(r)$ of the sample.

It is possible to calculate the wavefront $f'_3{}^{m,1}(r)$ by setting z=3 and zL=1 in Expression (41).

For the second layer and the first layer, calculation of the gradient of the sample can be performed in the same way as for the third layer.

Figure 34:
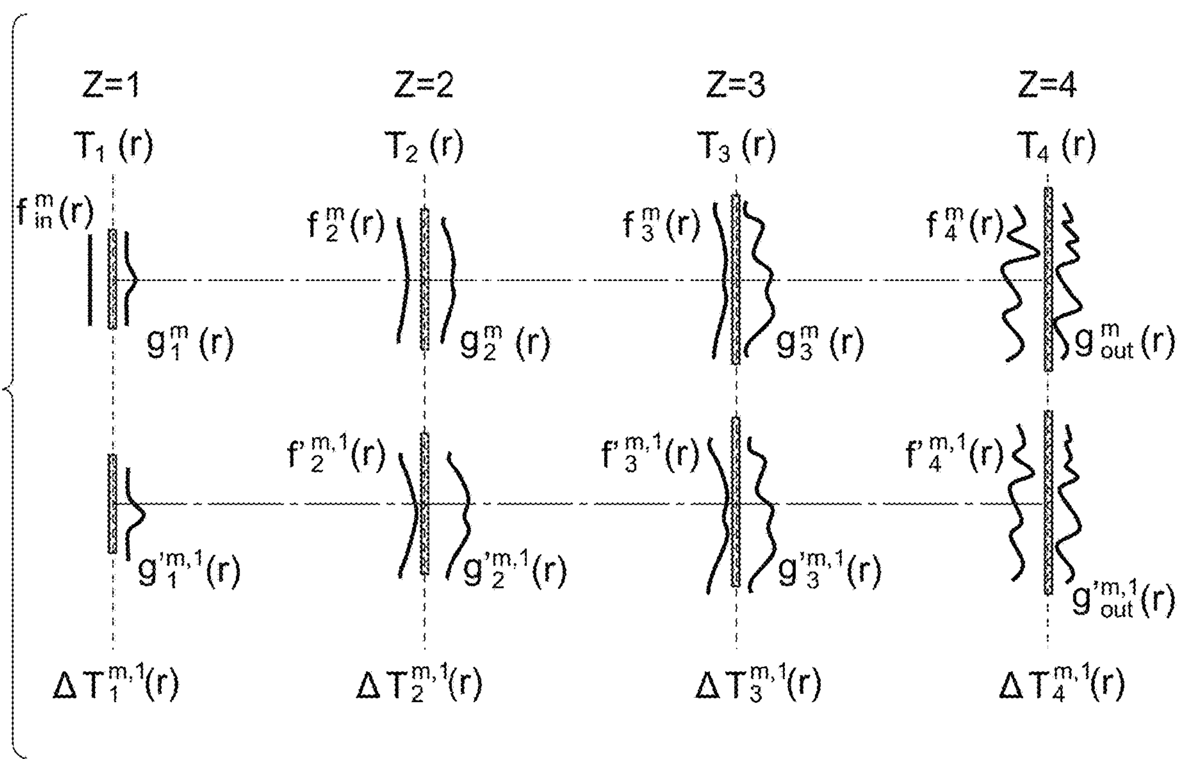
FIG. 34 is a diagram illustrating the gradient of a sample.

FIG. 34 is a diagram illustrating the gradient of a sample. In FIG. 34, the gradient $\Delta T_1^{m,1}(r)$ of the sample in the first layer, the gradient $\Delta T_2^{m,1}(r)$ of the sample in the second layer, the gradient $\Delta T_3^{m,1}(r)$ of the sample in the third layer, and the gradient $\Delta T_4^{m,1}(r)$ of the sample in the fourth layer are calculated.

The gradient $\Delta T_2^{m,1}(r)$ of the sample obtained at step S313 is the gradient of the sample when illuminated by the m-th light source and corrected with the photographic image at the position of the first layer and the image of the estimation sample at the position of the first layer. The gradient $\Delta T_z^{m,1}(r)$ of the sample is determined by illumination light emitted from all of the light sources. Thus, the gradient $\Delta T_z^{m,1}(r)$ of the sample needs to be obtained for all of the light sources.

At step S314, it is determined whether the value of the variable m matches the number of light sources $N_{LS}$. If the determination result is NO, step S315 is executed. If the determination result is YES, step S304 is executed.

(If the determination result is NO: $m \neq N_{LS}$)

If the determination result is NO, 1 is added to the value of the variable m at step S315. When step S315 is finished, the process returns to step S311.

At step S315, the value of the variable m is increased by one. Therefore, for another light source, the wavefront $u_z'^{m,1}(r)$ is calculated at step S311, the wavefront $g_{out}'^{m,1}(r)$ is calculated at step S312, and the gradient $\Delta T_z^{m,1}(r)$ of the sample is calculated at step S313.

Steps S311, S312, and S313 are repeatedly performed until the gradient $\Delta T_z^{m,1}(r)$ of the sample is obtained for all of the light sources.

FIG. 35 is a diagram illustrating the gradient of the sample. In FIG. 35, the gradient $\Delta T_z^{m,1}(r)$ of the sample is obtained for all of the light sources.

(If the determination result is YES: $m=N_{LS}$) If the determination result is YES, the amplitude transmittance $T_z(r)$ is updated at step S304. Step S304 is the step of updating the estimation sample.

The updated amplitude transmittance $T_z(r)$ is represented by Expression (42).

$$T_z(r) = T_z(r) + a\sum_m T_z^{m,zL}(r) \tag{42}$$

where $\alpha$ is a correction coefficient for the gradient of the sample.

At step S305, it is determined whether the value of the variable L matches the number of times of correction $N_{CR}$. If the determination result is NO, step S306 is executed. If the determination result is YES, step S30 is executed.

(If the determination result is NO: $m \neq N_{CR}$)

If the determination result is NO, 1 is added to the value of the variable L at step S306. When step S306 is finished, the process returns to step S301.

At step S301, one is selected at random from 1 to $N_{IM}$. Based on the selected number, the image of the estimation sample and the acquisition position to be used in correction are determined.

Then, the wavefront $u_z'^{m,1}(r)$ is calculated at step S311, the wavefront $g_{out}'^{m,1}(r)$ is calculated at step S312, the gradient $\Delta T_z^{m,1}(r)$ of the sample is calculated at step S313, and the amplitude transmittance $T_z(r)$ is updated at step S304.

Steps S301, S302, S303, S304, and S310 are repeatedly performed until the set number of times of correction is finished.

(If the determination result is YES: $m=N_{CR}$)

If the determination result is YES, the process returns to step S30. With the updated amplitude transmittance $T_z(r)$, steps S30 to S300 are executed.

Steps S30 to S300 are repeatedly executed, whereby the updated amplitude transmittance $T_s(r)$ gradually approaches the amplitude transmittance of the sample 140. In other words, the residual becomes smaller. Eventually, the residual becomes smaller than the threshold.

(If the determination result is YES: residual<threshold)

At step S110, the refractive index distribution of the estimation sample is calculated. The obtained amplitude transmittance $T_z(r)$ is the same or substantially the same as the amplitude transmittance of the sample 140. The refractive index distribution $n_z(r)$ is found from the obtained amplitude transmittance $T_z(r)$ and Expression (1).

By using the refractive index distribution $n_z(r)$ obtained at step S110, it is possible to reconstruct the structure of the estimation sample. It is possible to output the reconstructed structure of the estimation sample, for example, to a display device. The estimation sample 150 is a thick sample. In the second simulation, it is possible to reconstruct a three-dimensional configuration of an estimation sample for the structure of a thick sample.

As described above, the amplitude transmittance $T_z(r)$ obtained at step S110 is the same or substantially the same as the amplitude transmittance of the sample 140. In this case, it is possible to consider that the refractive index distribution $n_z(r)$ is also the same or substantially the same as the refractive index distribution of the sample 140. Thus, it is possible to consider that the reconstructed structure of the estimation sample 150 is the same or substantially the same as the structure of the sample 6.

In the second simulation, steps S250, S270, and S310 are repeatedly executed. As a result, the amplitude transmittance $T_z(r)$ is updated. As described above, steps S250 and S270 are the steps of calculating an image of the estimation sample. Step S310 is the step of optimizing the refractive index distribution of the estimation sample.

The amplitude transmittance $T_z(r)$ represents the estimation sample. Thus, the step of calculating an image of the estimation sample and the step of optimizing the refractive index distribution of the estimation sample are repeatedly executed to update the estimation sample.

FIGS. 36A to 36D are diagrams illustrating the result of simulation in the first example. FIG. 36A illustrates a sample. FIG. 36B illustrates an aperture member. FIG. 36C illustrates an image of the sample. FIG. 36D illustrates a reconstructed estimation sample.

The sample is a photonic crystal fiber (hereinafter referred to as "PCF"). In the PCF, a plurality of through holes are formed in the cladding. The through holes are referred to as cores. The PCF is immersed in a liquid. Thus, the cores are filled with the liquid.

The numerical values of various parameters are as follows.

| | |
|---|---|
| Outer diameter of sample | 230 μm |
| Core diameter | 6 μm |
| Refractive index of core | 1.466 |
| Refractive index of cladding | 1.462 |
| Refractive index of liquid | 1.466 |
| Numerical aperture of objective lens | 1.4 |
| Magnification of objective lens | 60× |
| Focal length of objective lens | 3 mm |
| Numerical aperture of second region | 0.3, 1.25 |
| Focal length of condenser lens | 7 mm |
| Diameter of transmission region of aperture member | 0.2 mm |
| Wavelength of illumination light | 0.7 μm |

The numerical aperture of the second region is represented by the numerical aperture of the condenser lens. As illustrated in FIG. 36B, the second regions are located on the circumferences of two circles. The light beam emitted from the second region located on the inner circumference can be regarded as a light beam equivalent to a numerical aperture of 0.3. The light beam emitted from the second region located on the outer circumference can be regarded as a light beam equivalent to a numerical aperture of 1.25.

The values of the parameters in each conditional expression are as follows.

| | |
|---|---|
| Area of pupil of detection optical system (PS') | 55.4 $mm^2$ |
| Area of second region (LS') | 0.0058 $mm^2$ |
| LS'/PS ' | $1.0 \times 10^{-4}$ |
| Pupil diameter of detection optical system (T') | 8.4 mm |
| Distance between the two adjacent second regions (d' ) | 0.47 mm |
| d'/T' | 0.056 |
| Area of pupil of detection optical system | $(8.4/2)^2 \times 3.14 = 55.4$ |
| Area of second region | $(0.086/2)^2 \times 3.14 = 0.0058$ |
| Diameter of second region | 0.2/7 × 3 = 0.086 |
| Pupil diameter of detection optical system | 2 × 1.4 × 3 = 8.4 |
| Radius to the second region on the inside | 0.3 × 3 = 0.9 |
| Distance between the two adjacent second regions | 0.9 × sin30/cos15 = 0.47 |

As illustrated in FIG. 36B, the second regions are located on the circumferences of two circles. The radius to the second region located on the inside is the radius of the inner circle.

FIGS. 37A to 37H are diagrams illustrating aperture members and reconstructed estimation samples. FIGS. 37A, 37B, 37C, and 37D illustrate aperture members. FIGS. 37E, 37F, 37G, and 37H illustrate the reconstructed estimation samples.

The estimation sample is reconstructed with a numerical aperture of the objective lens of 1.4 and a wavelength of illumination light of 0.7 μm.

The correspondence between the aperture member and the reconstructed estimation sample in the drawings is as follows.

| Aperture member | Reconstructed estimation sample |
|---|---|
| FIG. 37A | FIG. 37E |
| FIG. 37B | FIG. 37F |
| FIG. 37C | FIG. 37G |
| FIG. 37D | FIG. 37G |

In the aperture member illustrated in FIG. 37A, the numerical apertures of the second regions are 0.3 and 0.5. As illustrated in FIG. 37E, in the reconstructed estimation sample, the cores extend in the Z-axis direction. In the aperture member illustrated in FIG. 37A, it is difficult to estimate a fine structure.

In the aperture member illustrated in FIG. 37B, the numerical apertures of the second regions are 1.05 and 1.25. As illustrated in FIG. 37F, artifacts are present in the reconstructed estimation sample. Faint images of the cores are present on both sides.

In the aperture member illustrated in FIG. 37C, the numerical apertures of the second regions are 0.3, 0.5, 1.05, and 1.25. As illustrated in FIG. 37G, artifacts are present in the reconstructed estimation sample. However, the artifacts are reduced compared to FIG. 37F.

In the aperture members illustrated in FIG. 37D, the numerical apertures of the second regions are 0.3, 0.5, 1.05, and 1.25. However, two aperture members are used. As illustrated in FIG. 37H, artifacts are present in the reconstructed estimation sample. The degree of artifacts is the same as that in FIG. 37G.

From the comparison between FIG. 37E and FIG. 37F, the larger the value of the numerical aperture of the second region is, the finer structure is reconstructed. Further, from the comparison between FIG. 37F and FIG. 37G, the larger the number of the second regions is, the less the artifacts are. However, when the number of second regions is large, the operations in reconstruction are less likely to converge.

As illustrated in FIG. 37D, by using two aperture members, it is possible to adjust the ratio between estimation of a relatively coarse structure and estimation of a relatively fine structure. By performing such adjustment, it is possible to shorten the time taken for reconstruction.

By using the aperture members illustrated in FIG. 37D, it is possible to perform only estimation of a relatively coarse structure or perform only estimation of a relatively fine structure, compared to using the aperture member illustrated in FIG. 37C.

Figure 38A:
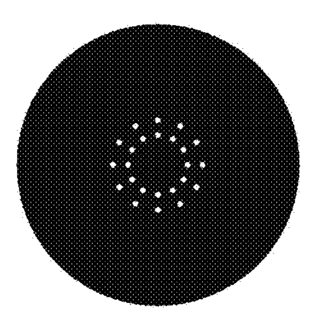
FIGS. 38A to 38C are diagrams illustrating an aperture member and images of a sample in measurement in the second example.
Figure 38B:
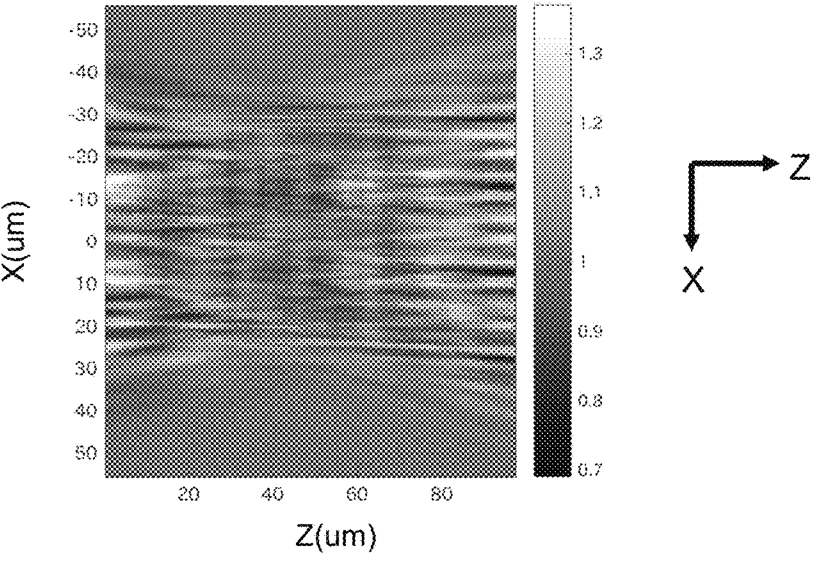
Figure 38C:
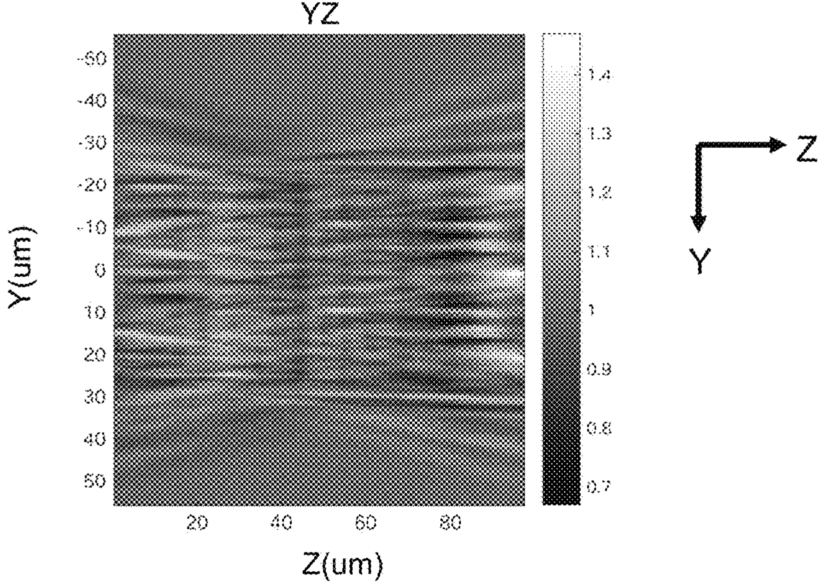

FIGS. 38A to 38C are diagrams illustrating an aperture member and images of a sample in measurement in the second example. FIG. 38A illustrates an aperture member. FIGS. 38B and 38C illustrate the images of a sample.

The sample is a lattice-like structure. The sample is immersed in oil with a refractive index of 1.518. Thus, the space enclosed by the lattice is filled with the oil.

The numerical values of various parameters are as follows.

| | |
|---|---|
| Numerical aperture of objective lens | 1.42 |
| Magnification of objective lens | 60× |
| Focal length of objective lens | 3 mm |
| Numerical aperture of second region | 0.3, 0.45 |
| Focal length of condenser lens | 7.1 mm |
| Diameter of transmission region of aperture member | 0.2 mm |

The numerical aperture of the second region is represented by the numerical aperture of the condenser lens. As illustrated in FIG. 37A, the second regions are located on the circumferences of two circles. The light beam emitted from the second region located on the inner circumference can be regarded as a light beam equivalent to a numerical aperture of 0.3. The light beam emitted from the second region located on the outer circumference can be regarded as a light beam equivalent to a numerical aperture of 0.45.

The values of the parameters in each conditional expression are as follows.

| | |
|---|---|
| Area of pupil of detection optical system (PS') | 57.0 $mm^2$ |
| Area of second region (LS') | 0.0056 $mm^2$ |
| LS'/PS' | $9.8 \times 10^{-5}$ |
| Pupil diameter of detection optical system (T') | 8.52 mm |
| Distance between the two adjacent second regions (d') | 0.47 mm |
| d'/T' | 0.055 |
| Pupil area of detection optical system | $(8.52/2)^2 \times 3.14 = 57.0$ |
| Area of second region | $(0.0845/2)^2 \times 3.14 = 0.0056$ |
| Diameter of second region | $0.2/7.1 \times 3 = 0.0845$ |
| Pupil diameter of detection optical system | $2 \times 1.42 \times 3 = 8.52$ |
| Radius to the second region on the inside | $0.3 \times 3 = 0.9$ |
| Distance between the two adjacent second regions | $0.9 \times \sin30/\cos15 = 0.47$ |

As illustrated in FIG. 37A, the second regions are located on the circumferences of two circles. The radius to the second region located on the inside is the radius of the inner circle.

FIGS. 39A to 39E are diagrams illustrating the result of the second example. FIGS. 39A and 39B illustrate an estimation sample with initial values set. FIGS. 39C, 39D, and 39E illustrate the reconstructed estimation sample.

The correspondence between the aperture member with initial values and the reconstructed estimation sample in each drawing is as follows.

| Estimation sample with initial values | Reconstructed estimation sample |
|---|---|
| FIG. 39A | FIG. 39C |
| FIG. 39B | FIG. 39D |
| None | FIG. 39E |

In FIG. 39A, the initial values are set so that the contour of the estimation sample can be determined. In FIG. 39B, the initial values are set using the transport-of-intensity equation.

From the comparison between FIGS. 37C and 37E and the comparison between FIGS. 37D and 37E, it is possible to reconstruct the estimation sample more accurately by setting the initial values.

It is possible that the microscope system 1 illustrated in FIG. 1A includes an illumination optical system. In this case, it is preferable that the microscope system 1 satisfy Conditions (6) and (7). Further, it is possible that the microscope system 1 includes an aperture member.

As described above, the present disclosure is suitable for a microscope system in which the time from starting image acquisition to completing estimation of an object model is short.

The present disclosure can provide a microscope system in which the time from starting image acquisition to completing estimation of an object model is short.

BRIEF DESCRIPTION OF DRAWINGS

The present disclosure can provide a microscope system in which the time from starting image acquisition to completing estimation of an object model is short.

What is claimed is:

1. A microscope system comprising:

an incoherent light source;

a detection optical system;

an imager; and a processor, wherein the incoherent light source is a light source configured to emit light that is temporally not coherent, the detection optical system is an optical system configured to form an optical image of a sample, the imager receives the optical image of the sample formed by the detection optical system, in the sample, a plurality of coherent illuminations are simultaneously performed by light emitted from the incoherent light source, the coherent illuminations are illumination by light that is spatially coherent, a direction in which the sample is irradiated with a light beam is different for each of the coherent illuminations, in a pupil plane of the detection optical system, the respective light beams of the coherent illuminations pass through first regions different from each other, the processor:

obtains a wavefront passing through an estimation sample modeling the sample, by feedforward operation for each of the light beams, calculates an intensity distribution at an imaging position of the detection optical system corresponding to the wavefront, for each of the light beams, generates a computational image by summing the intensity distributions of the light beams, and reconstructs the estimation sample by performing an optimization process to reduce a difference between the computational image and a measurement image output from the imager, each of the first regions satisfies the following Condition (1), and at least one distance among distances between the two adjacent first regions satisfies the following Condition (2):

$$LS < PS \times 10^{-3} \quad (1)$$

$$0.05 \times T < d \quad (2)$$

where

LS is an area of the first region (in $mm^2$),

PS is an area of a pupil of the detection optical system (in $mm^2$), d is a distance between the two adjacent first regions (in mm), and T is a diameter of the pupil of the detection optical system (in mm).

2. The microscope system according to claim 1, wherein half of the first regions satisfy Condition (2).

3. The microscope system according to claim 1, wherein the following Condition (3) is satisfied:

$$\sum_{i=1}^{n} LSi < PS \times 10^{-2} \quad (3)$$

where

LSi is an area of an i-th first region (in $mm^2$), and n is the number of the first regions.

4. The microscope system according to claim 1, wherein some of the first regions are located within a first annular region, and the first annular region is a region with a radius of 50% or more in a pupil region of the detection optical system.

5. The microscope system according to claim 4, wherein some of the first regions are aligned to form a double circle within the first annular region.

6. The microscope system according to claim 4, wherein some of the first regions are located within a second annular region, and the second annular region is a region with a radius of 70% to 90% in a pupil region of the detection optical system.

7. The microscope system according to claim 6, wherein some of the first regions are located within a third annular region, and the third annular region is a region with a radius of 50% to 70% in a pupil region of the detection optical system.

8. The microscope system according to claim 4, wherein some of the first regions are located within a first circular region, and the first circular region is a region closer to a center than the first annular region in a pupil region of the detection optical system.

9. The microscope system according to claim 8, wherein some of the first regions are aligned to form a circle within the first circular region.

10. The microscope system according to claim 1, wherein some of the first regions are located within a second circular region, and the second circular region is a region with a radius of 50% or less in a pupil region of the detection optical system.

11. The microscope system according to claim 10, wherein some of the first regions are aligned to form a circle within the second circular region.

12. The microscope system according to claim 10, wherein some of the first regions are located within a fourth annular region, and the fourth annular region is a region with a radius of 30% or more to 50% in a pupil region of the detection optical system.

13. The microscope system according to claim 12, wherein some of the first regions are located within a third circular region, and the third circular region is a region with a radius of 30% or less in a pupil region of the detection optical system.

14. The microscope system according to claim 1, wherein when the pupil of the detection optical system is divided into four sector shapes with an equal central angle, any of the first regions is located in each of the four sector shapes.

15. The microscope system according to claim 1, wherein some of the first regions are paired across a center of the pupil of the detection optical system.

16. The microscope system according to claim 1, wherein each of the first regions satisfies the following Condition (4):

$$PS \times 10^{-6} < LS \quad (4)$$

17. The microscope system according to claim 1, wherein at least one distance among distances between the two adjacent first regions satisfies the Condition (2) and the following Condition (5):

$$d < 0.5 \times T \quad (5)$$

18. The microscope system according to claim 1, further comprising an illumination optical system, wherein in a pupil plane of the illumination optical system, the respective light beams of the coherent illuminations are located in second regions different from each other, each of the second regions satisfies the following Condition (6), and at least one distance among distances between the two adjacent second regions satisfies the Condition (2) and the following Condition (7):

$$LS' < PS' \times 10^{-3} \quad (6)$$

$$0.05 \times T' < d' \quad (7)$$

where

LS' is an area of the second region (in $mm^2$),

PS' is an area of a pupil of the illumination optical system (in $mm^2$), d' is a distance between the two adjacent second regions (in mm), and T' is a diameter of the pupil of the illumination optical system (in mm).

19. The microscope system according to claim 1, further comprising an aperture member, wherein the respective light beams of the coherent illuminations are emitted from a plurality of independent regions on a predetermined plane, the predetermined plane is a plane orthogonal to an optical axis of the detection optical system and at a position opposite the detection optical system with respect to the sample, the aperture member is disposed on the predetermined plane and includes a plurality of independent transmission regions, the transmission regions each being a region that allows light to pass through, and each of the transmission regions corresponds to one of the first regions.

20. The microscope system according to claim 1, wherein the respective light beams of the coherent illuminations are emitted from a plurality of independent regions on a predetermined plane, the predetermined plane is a plane orthogonal to an optical axis of the detection optical system and at a position opposite the detection optical system with respect to the sample, a plurality of the incoherent light sources are disposed on the predetermined plane, and each of the incoherent light sources corresponds to one of the first regions.

21. A microscope system comprising:

an incoherent light source;

an illumination optical system;

a detection optical system;

a processor; and an imager, wherein:

the incoherent light source is a light source configured to emit light that is temporally not coherent, the detection optical system is an optical system configured to form an optical image of a sample, the imager receives the optical image of the sample formed by the detection optical system, in the sample, a plurality of coherent illuminations are simultaneously performed by light emitted from the incoherent light source, the coherent illuminations are illumination by light that is spatially coherent, a direction in which the sample is irradiated with a light beam is different for each of the coherent illuminations, in a pupil plane of the illumination optical system, the respective light beams of the coherent illuminations are located in second regions different from each other, the processor:

obtains a wavefront passing through an estimation sample modeling the sample, by feedforward operation for each of the light beams, calculates an intensity distribution at an imaging position of the detection optical system corresponding to the wavefront, for each of the light beams, generates a computational image by summing the intensity distributions of the light beams, and reconstructs the estimation sample by performing an optimization process to reduce a difference between the computational image and a measurement image output from the imager, each of the second regions satisfies the following Condition (6), and at least one distance among distances between the two adjacent second regions satisfies the following Condition (7):

$$LS' < PS' \times 10^{-3} \quad (6)$$

$$0.05 \times T' < d' \quad (7)$$

where

LS' is an area of the second region (in $mm^2$),

PS' is an area of a pupil of the illumination optical system (in $mm^2$), d' is a distance between the two adjacent second regions (in mm), and T' is a diameter of the pupil of the illumination optical system (in mm).

22. The microscope system according to claim 21, wherein the detection optical system includes an objective lens and an imaging lens, the illumination optical system includes a condenser lens, the area of the second region is represented by the following Expression (8), and the diameter of the pupil of the illumination optical system is represented by the following Expression (9):

$$PS' = (FLcd \times NA)^2 \times \pi \quad (8)$$

$$T' = FLcd \times NA \quad (9)$$

where

FLcd is a focal length of the condenser lens (in mm), and

NA is a numerical aperture of the objective lens.

23. The microscope system according to claim 21, further comprising an aperture member, wherein the respective light beams are emitted from a plurality of independent regions on a predetermined plane, the predetermined plane is a plane orthogonal to an optical axis of the detection optical system and at a position opposite the detection optical system with respect to the sample, the aperture member is disposed on the predetermined plane and includes a plurality of independent transmission regions, the transmission regions each being a region that allows light to pass through, and each of the transmission regions corresponds to one of the second regions.

24. The microscope system according to claim 21, wherein the respective light beams are emitted from a plurality of independent regions on a predetermined plane, the predetermined plane is a plane orthogonal to an optical axis of the detection optical system and at a position opposite the detection optical system with respect to the sample, a plurality of the incoherent light sources are disposed on the predetermined plane, and each of the incoherent light sources corresponds to one of the second regions.

* * * * *